(12) United States Patent
Puetz et al.

(10) Patent No.: US 7,139,461 B2
(45) Date of Patent: *Nov. 21, 2006

(54) OPTICAL FIBER DISTRIBUTION FRAME WITH OUTSIDE PLANT ENCLOSURE

(75) Inventors: Curtis Lee Puetz, Apple Valley, MN (US); Gary E. Dusterhoft, Eden Prairie, MN (US); David E. Rapp, Eden Prairie, MN (US); Troy Anthony Veitenheimer, Bloomington, MN (US); Thomas C. Tinucci, Eden Prairie, MN (US); Matthew J. Holmberg, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/942,734

(22) Filed: Sep. 15, 2004

(65) Prior Publication Data

US 2005/0100301 A1    May 12, 2005

Related U.S. Application Data

(63) Continuation of application No. 10/759,680, filed on Jan. 19, 2004, which is a continuation of application No. 09/716,627, filed on Nov. 20, 2000, now Pat. No. 6,760,531, which is a continuation-in-part of application No. 09/577,779, filed on May 24, 2000, now Pat. No. 6,556,763, which is a continuation-in-part of application No. 09/563,210, filed on May 2, 2000, now Pat. No. 6,535,682, which is a continuation-in-part of application No. 09/412,674, filed on Oct. 5, 1999, now Pat. No. 6,424,781, which is a continuation-in-part of application No. 09/325,584, filed on Jun. 3, 1999, now abandoned, which is a continuation-in-part of application No. 09/259,860, filed on Mar. 1, 1999, now abandoned.

(51) Int. Cl.
*G02B 6/00* (2006.01)

(52) U.S. Cl. ..................................... 385/135

(58) Field of Classification Search .................. 385/24, 385/27, 134–137, 139, 89, 53
See application file for complete search history.

(56) References Cited

U.S. PATENT DOCUMENTS 4,630,886 A    12/1986   Lauriello et al.

(Continued)

FOREIGN PATENT DOCUMENTS

DE        42 29 510 A1    3/1994

(Continued)

OTHER PUBLICATIONS

ADC Telecommunication brochure entitled "Next Generation Frame (NGF) Product Family Ordering Guide," 21 pages, dated Oct. 1998.

(Continued)

*Primary Examiner*—J. F. Duverne
(74) *Attorney, Agent, or Firm*—Merchant & Gould P.C.

(57) ABSTRACT

A fiber optic telecommunications frame is provided including panels having front and rear termination locations, the panels positioned on left and right sides of the frame. The frame includes vertical access for the rear cables. The frame further includes left and right vertical cable guides for the front patch cables. The frame further includes cable storage spools for the patch cables. The frame includes a horizontal passage linking the left and right panels and the cable guides. A portion of the frame defines splice tray holders and a central passage from the splice tray holders to the rear sides of the left and right panels. From a front of each panel, access to a rear of the panel is provided by the hinged panels. Alternatively, the panels can form connector modules with front termination locations and rear connection locations for connecting to the rear cables. The modules can house couplers, such as splitters, combiners, and wave division multiplexers. The termination locations can be located on the same side of the frame as the splice tray holders, or on an opposite side. An enclosure of the frame included hinged or otherwise moveable panels to allow access to the terminations or the splice trays.

29 Claims, 77 Drawing Sheets

U.S. PATENT DOCUMENTS

| | | |
|---|---|---|
| 4,747,020 A | 5/1988 | Brickley et al. |
| 4,765,710 A | 8/1988 | Burneister et al. |
| 4,995,688 A | 2/1991 | Anton et al. |
| 5,129,030 A | 7/1992 | Petrunia |
| 5,179,618 A | 1/1993 | Anton |
| 5,289,558 A | 2/1994 | Teichler et al. |
| 5,317,663 A | 5/1994 | Beard et al. |
| 5,363,465 A | 11/1994 | Korkowski et al. |
| 5,402,515 A | 3/1995 | Vidacovich |
| RE34,955 E | 5/1995 | Anton et al. |
| 5,432,875 A | 7/1995 | Korkowski et al. |
| 5,497,444 A | 3/1996 | Wheeler |
| 5,689,604 A | 11/1997 | Janus et al. |
| 5,717,810 A | 2/1998 | Wheeler |
| 5,734,776 A | 3/1998 | Puetz |
| 5,758,002 A | 5/1998 | Walters |
| 5,758,003 A | 5/1998 | Wheeler et al. |
| 5,774,245 A | 6/1998 | Baker |
| 5,903,698 A | 5/1999 | Poremba et al. |
| 6,044,193 A | 3/2000 | Szentesi et al. |
| 6,556,763 B1 * | 4/2003 | Puetz et al. ............... 385/135 |
| 6,760,531 B1 * | 7/2004 | Solheid et al. ............. 385/135 |

FOREIGN PATENT DOCUMENTS

| | | |
|---|---|---|
| EP | 0 697 610 A1 | 2/1996 |
| EP | 0 871 047 A1 | 10/1998 |
| WO | WO 00/05611 | 2/2000 |
| WO | WO 00/52504 | 9/2000 |

OTHER PUBLICATIONS

ADC Telecommunications brochure entitled "FL2000 Products," 48 pages, dated Nov. 1996.

ADC Telecommunications brochure entitled "Fiber Cable Management Products, Second Edition," 144 pages, dated Oct. 1995.

"ADC OMX 600 Optical Distribution Frame Solution," *ADC Telecommunications. Inc.*, Publication No. 856, 8 pgs. (Feb. 2000).

"OMX™ 600 Optical Distribution Frame," *ADC Telecommunications, Inc.*, Publication No. 854, front cover, table of contents, pp. 1-13, rear cover (Apr. 2000).

* cited by examiner

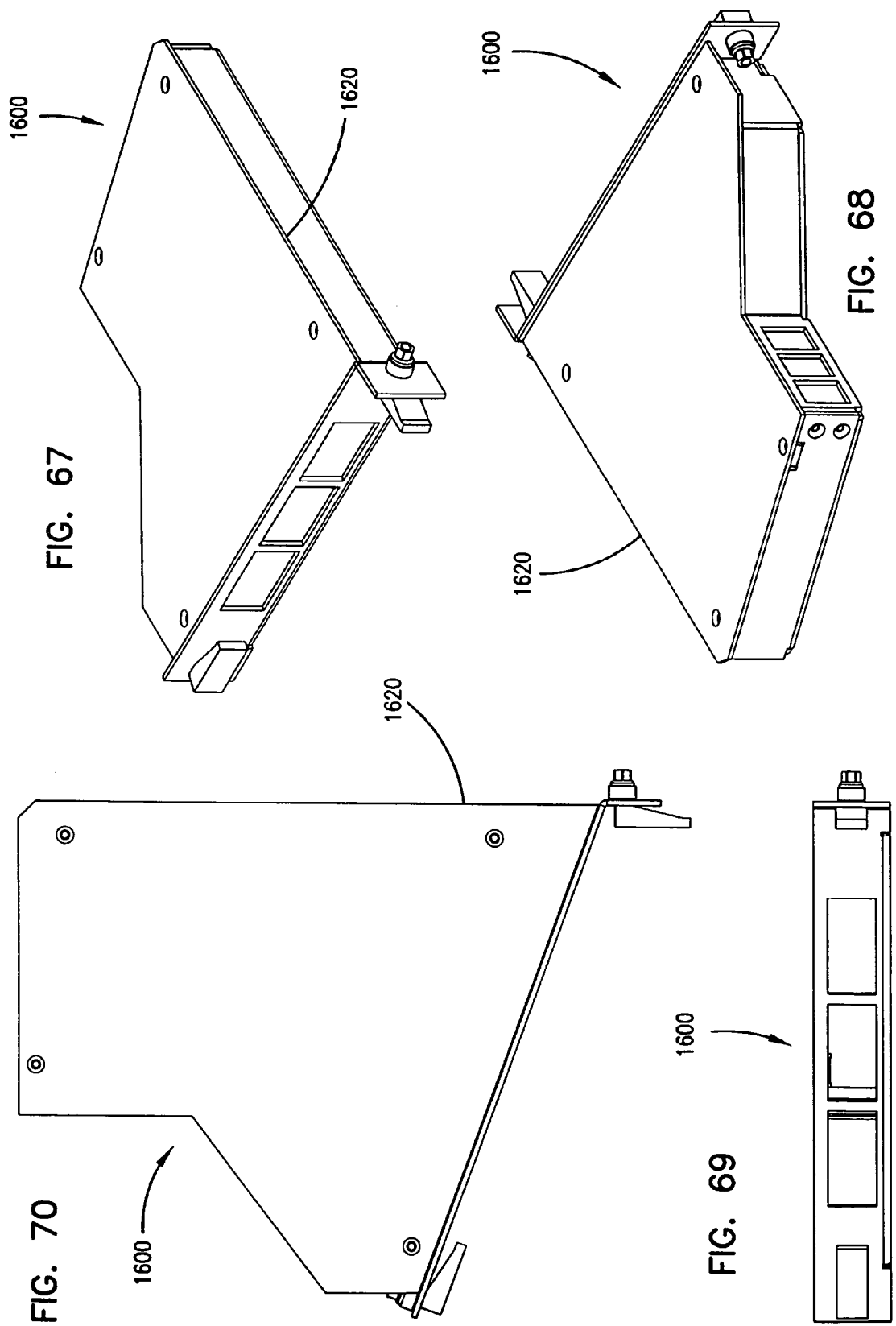

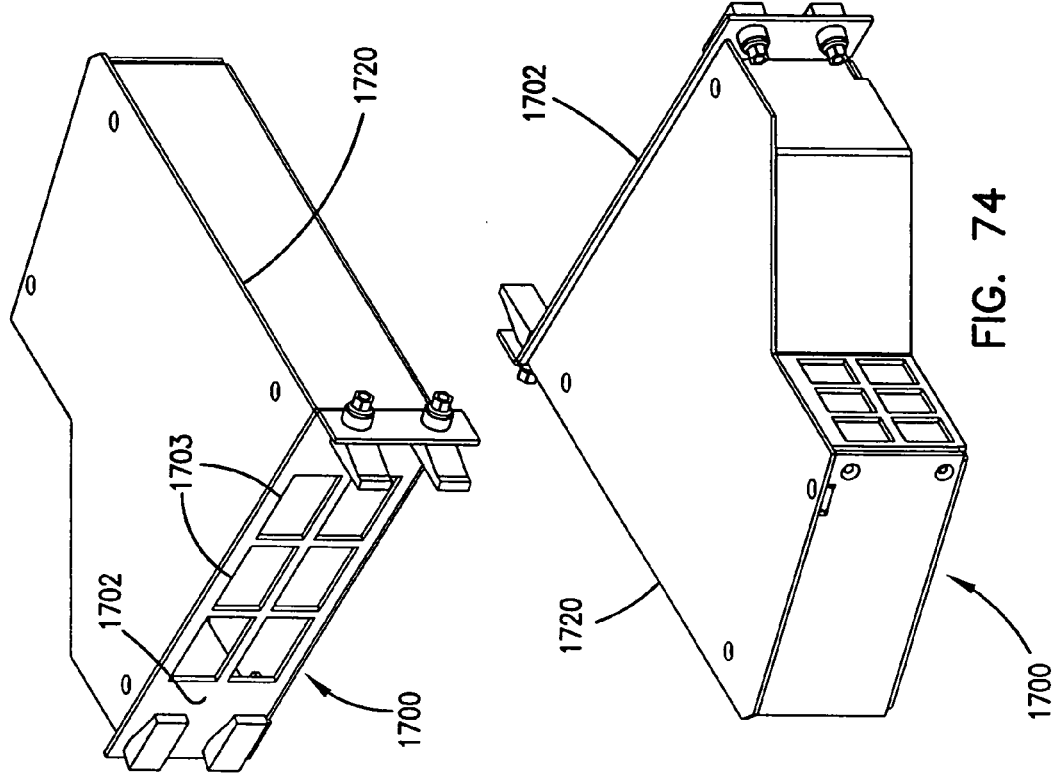
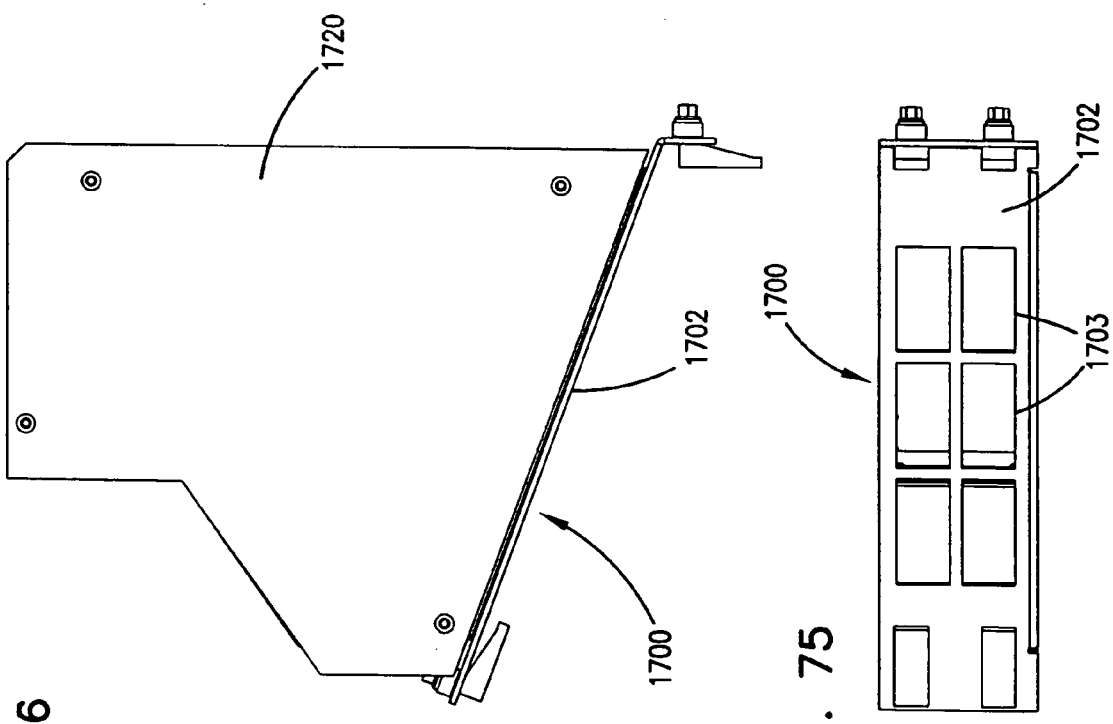

OPTICAL FIBER DISTRIBUTION FRAME WITH OUTSIDE PLANT ENCLOSURE

RELATED APPLICATIONS

This application is a continuation of Ser. No. 10/759,680, filed Jan. 19, 2004, which is a continuation of Ser. No. 09/716,627, filed Nov. 20, 2000 now U.S. Pat. No. 6,760,531, which is a continuation-in-part of Ser. No. 09/577,779, filed May 24, 2000 now U.S. Pat. No. 6,556,763, which is a continuation-in-part of Ser. No. 09/563,210, filed May 2, 2000 now U.S. Pat. No. 6,535,682, which is a continuation-in-part of Ser. No. 09/412,674, filed Oct. 5, 1999 now U.S. Pat. No. 6,424,781, which is a continuation-in-part of Ser. No. 09/325,584, filed Jun. 3, 1999 abandoned, which is a continuation-in-part of Ser. No. 09/259,860, filed on Mar. 1, 1999 abandoned; the disclosures of which are hereby incorporated by reference.

BACKGROUND OF THE INVENTION

1. Field of the Invention

This invention pertains to the telecommunications industry. More particularly, this invention pertains to a high-density fiber distribution frame for use in the telecommunications industry.

2. Description of the Prior Art

In the telecommunications industry, use of fiber optic cables for carrying transmission signals is rapidly growing. To connect fiber optic equipment, fiber distribution frames have been developed. Examples of prior art fiber distribution frames are shown in commonly assigned U.S. Pat. Nos. 4,995,688; 5,497,444; and 5,758,003. In each of the fiber distribution frames of the prior patents, a plurality of adapters are provided which permit attachment of fiber optic connectors to both sides of each adapter in order to optically couple two fiber optic cables. Cables from the adapters are connected to various pieces of fiber optic equipment. Using patch cords or cables between the adapters, the pieces of optical equipment are then cross-connected through the frame. The frame defines a demarcation point between the equipment.

The use of modular fiber optic connector modules is known for performing so-called cross-connect applications. U.S. Pat. Nos. 5,432,875 and 5,363,465, and PCT Publication WO00/05611 to ADC Telecommunications, Inc. concern fiber optic connector modules and chassis designs for receiving the modules in cross-connect applications.

Outside plant enclosures provide support and enclosure structure for cross-connecting outside plant cables. Cables enter the enclosure from the ground. The cables are then cross-connected through patch cords and connector arrays arranged on a frame within the enclosure.

Notwithstanding advances previously made in the art, there is a continuous need for further advances to maintain a high-density of connector terminals. There are further needs for ready access to the fiber optic connectors and couplers, enhanced fiber management, and avoidance of excessive bending and stresses on the fiber optic cables.

SUMMARY OF THE INVENTION

One aspect of the present invention relates to a fiber distribution frame comprising a rack extending vertically from a bottom to a top, the rack defining a left side, a right side, a front, and a rear. The frame includes a left vertical cable guide with a side access on the left side of the rack, and a right vertical cable guide with a side access on the right side of the rack. At least a portion of the frame defines a cable termination area. The termination area includes: (1) a first panel defining an array of termination locations on a front portion, the first panel positioned on the left side of the rack adjacent to the left vertical cable guide, and (2) a second panel defining an array of termination locations on a front portion, the second panel positioned on the right side of the rack adjacent to the right vertical cable guide. A central cable passageway extends between the first and second panels. The frame also includes a horizontal passageway for patch cables positioned on the front side of the rack extending between the right vertical cable guide, and the left vertical cable guide. The first and second panels may receive individual adapters, being sized for mounting to cable connectors. Alternatively, the panels may be defined by adapters associated with modular units for housing fiber couplers, such as splitters, combiners, and wave division multiplexers. Cables from the central cable passageway are optically linked through the panels to the termination locations.

In some preferred embodiments the frame also includes a cable splice area positioned on the rack with the cable splice area defining a plurality of splice tray holders. In this embodiment, the frame further includes a cable passageway from the splice tray holders to the central cable passageway.

The splice tray holders may be on the same side of the rack or on an opposite side. Cable storage features may also be provided on the rack, in some preferred embodiments. The frame may include an enclosure with pivoting doors to protect internal components.

In one example environment of fiber distribution within a building, the frame may be located in a telecommunications equipment room adjacent to other frames. The termination area may be conveniently located in an upper area of the frame, and the splice area may be conveniently located in a lower area of the frame. In an example outside plant environment, the frame with enclosure is located over the outside plant cables. The termination area may be conveniently located on one side of the frame, and the splice area may be located on an opposite side.

The present invention also relates to a fiber optic termination module comprising a housing having first and second spaced-apart ends, and first and second spaced-apart sides extending between the ends. The housing includes a rear extending between the first and second ends, and the first and second sides to define an interior. The housing defines an open front, with the first and second ends extending generally horizontally when the termination module is mounted to a telecommunications rack, and the first and second sides extending generally vertically when the termination module is mounted to the telecommunications rack. A main panel closes the open front and includes an array of openings arranged and sized for holding adapters, with the adapters being sized for mounting to cable connectors. The main panel may be made of sub-panels, including panels associated with modular units received in the termination module. The termination module which receives the modular units preferably includes shelves, slides, guides, or other structure for holding each unit. Preferably, the main panel is at a non-perpendicular angle relative to a plane defined by the rear. In some embodiments, the termination module can be reversed in vertical orientation between left and right sides of the rack.

A further aspect of the present invention relates to a fiber optic module including a housing having two spaced-apart major sides interconnected by two spaced-apart minor sides, and a rear notch. On a front of the housing, a plurality of front adapters are provided for use in connecting to cable connectors. The rear notch of the module includes a side segment presenting a plurality of rear adapters for connecting to further cable connectors. Cables are disposed within the housing for connecting the rear adapters with the front adapters. Preferably, the front is at a non-perpendicular angle relative to a plane defined by the minor sides. The module preferably includes at least one side flange extending from one of the major sides, and two front flanges extending from the front for mounting to a fiber optic termination module or other rack structure.

BRIEF DESCRIPTION OF THE DRAWINGS

FIG. 67 is a front, top and right side perspective view of the connector module used in the termination module of FIG. 66, shown without adapters or retainers;

FIG. 68 is a rear, top and left side perspective view of the connector module of FIG. 67;

FIG. 69 is a front view of the connector module of FIG. 67;

FIG. 70 is a top view of the connector module of FIG. 67;

FIG. 73 is a front, top and right side perspective view of an alternative connector module to the connector module of FIG. 67, including two rows of openings;

FIG. 74 is a rear, top and left side perspective view of the connector module of FIG. 73;

FIG. 75 is a front view of the connector module of FIG. 73;

FIG. 76 is a top view of the connector module of FIG. 73;

DETAILED DESCRIPTION OF THE PREFERRED EMBODIMENTS

Figure 1:
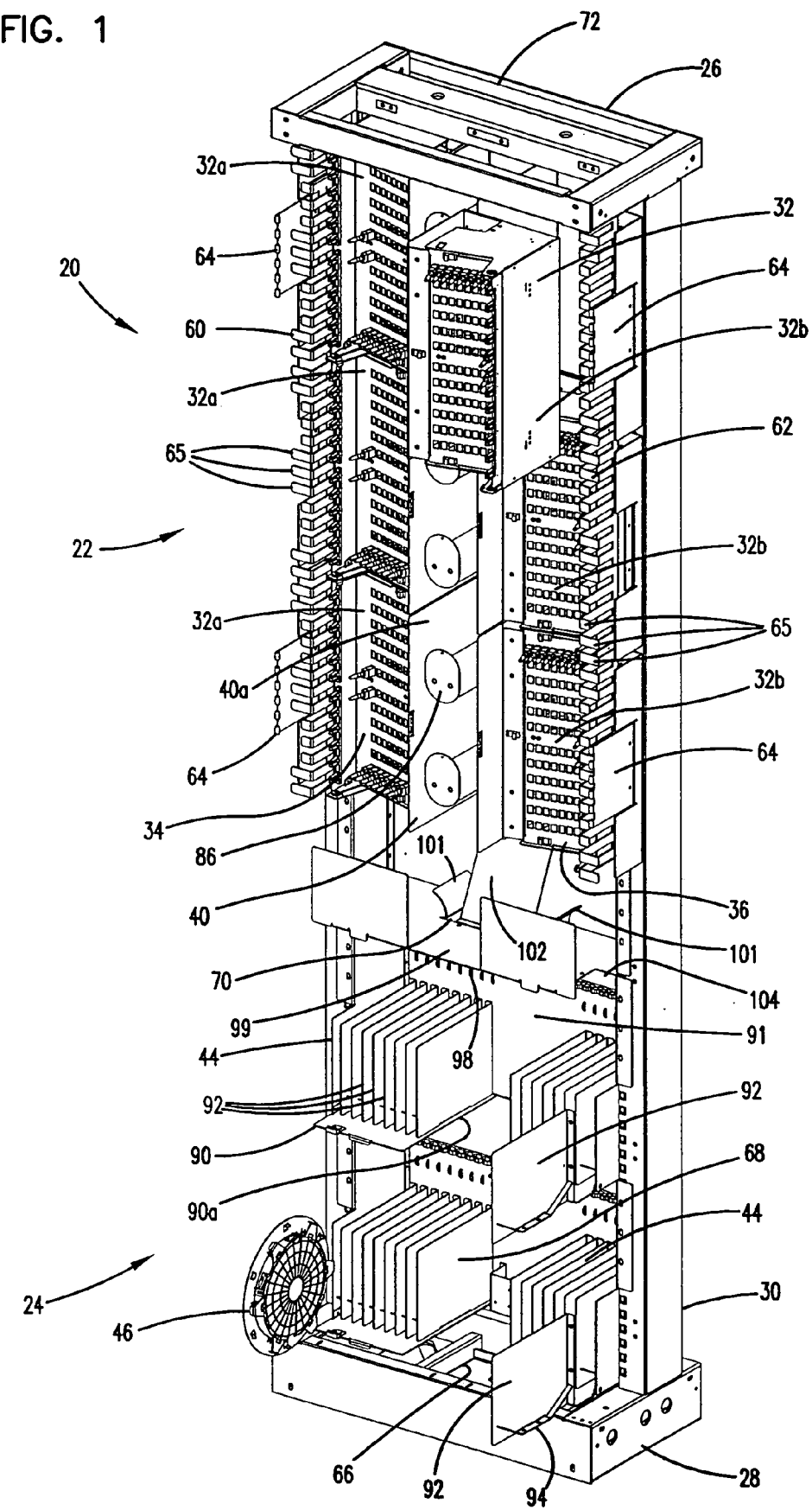
FIG. 1 is a front, top and right side perspective view of a first embodiment of a fiber distribution frame according to the present invention, with portions shown in exploded view, and with the front doors removed.
Figure 2:
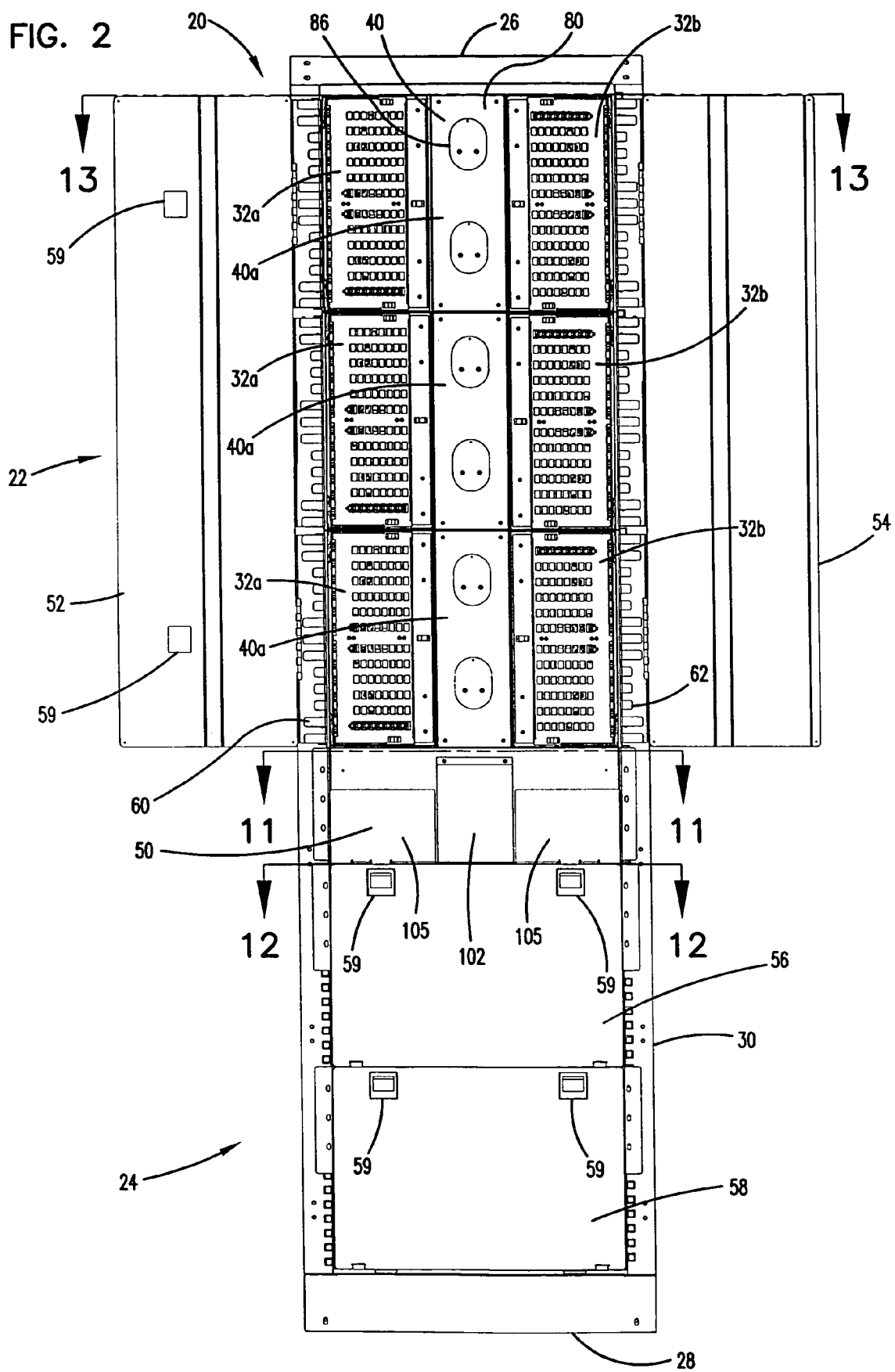
FIG. 2 is a front view of the frame of FIG. 1, showing the upper front doors in the open positions, and the lower front doors in the closed positions.
Figure 3:
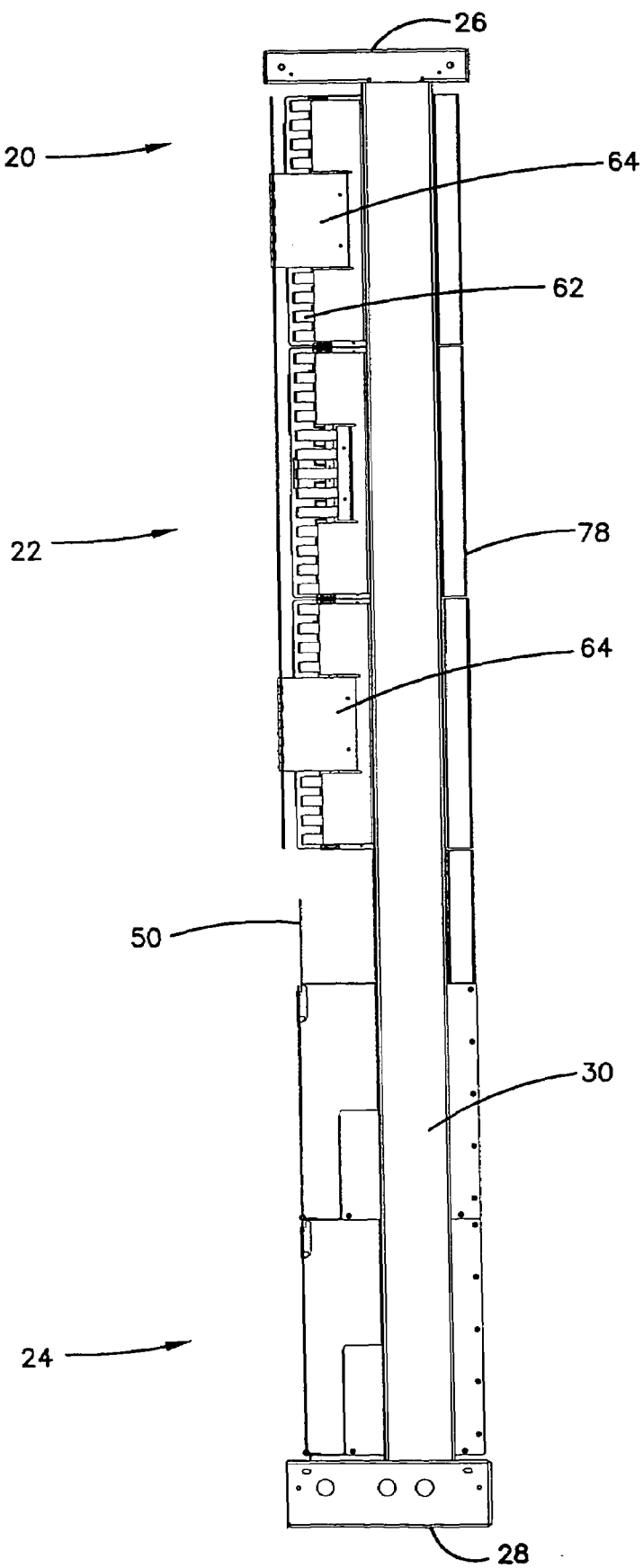
FIG. 3 is a right side view of the frame of FIG. 1, showing the upper and lower doors in the closed positions.
Figure 4:
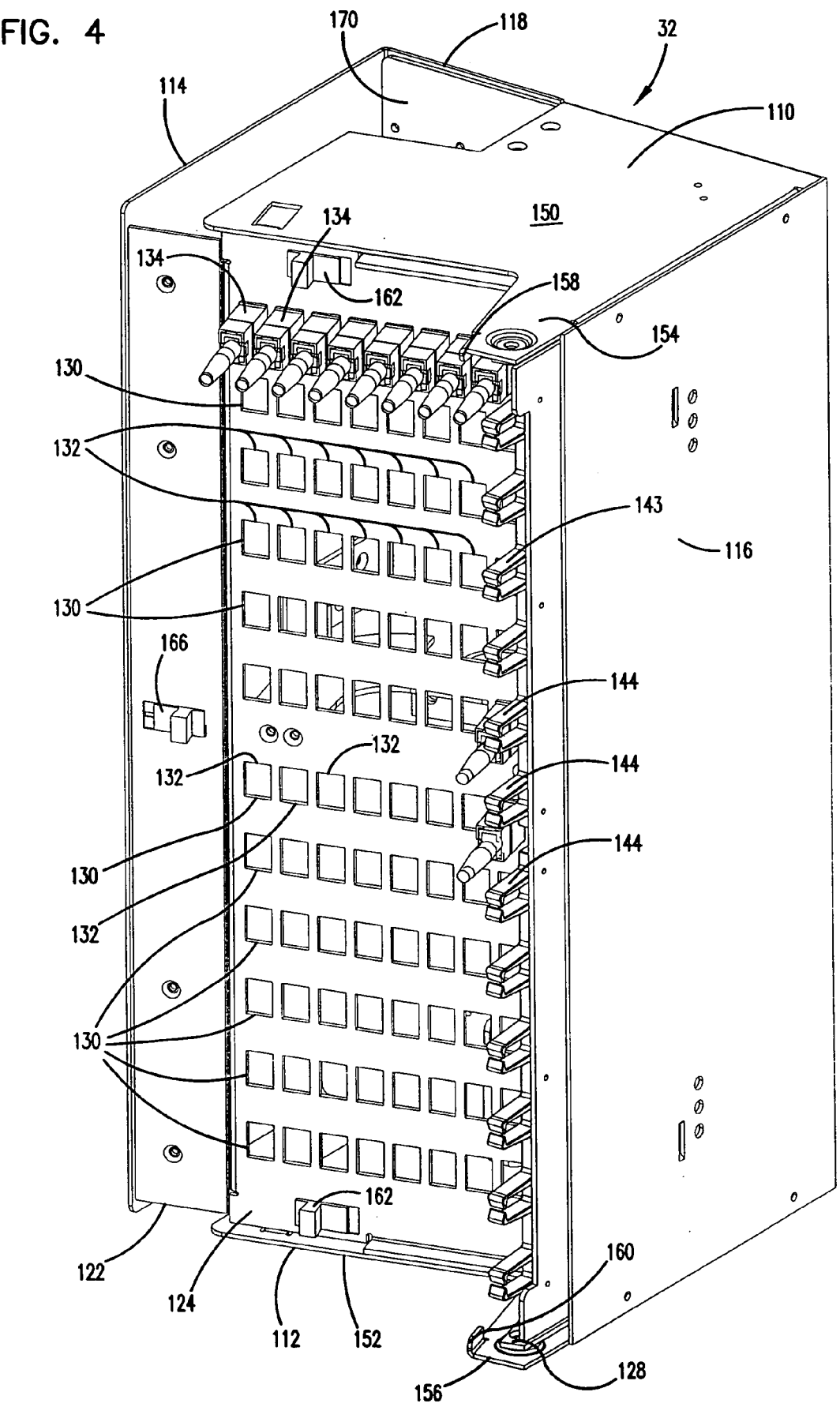
FIG. 4 is a front, top and right side perspective view of one of the termination modules in the frame of FIG. 1.
Figure 5:
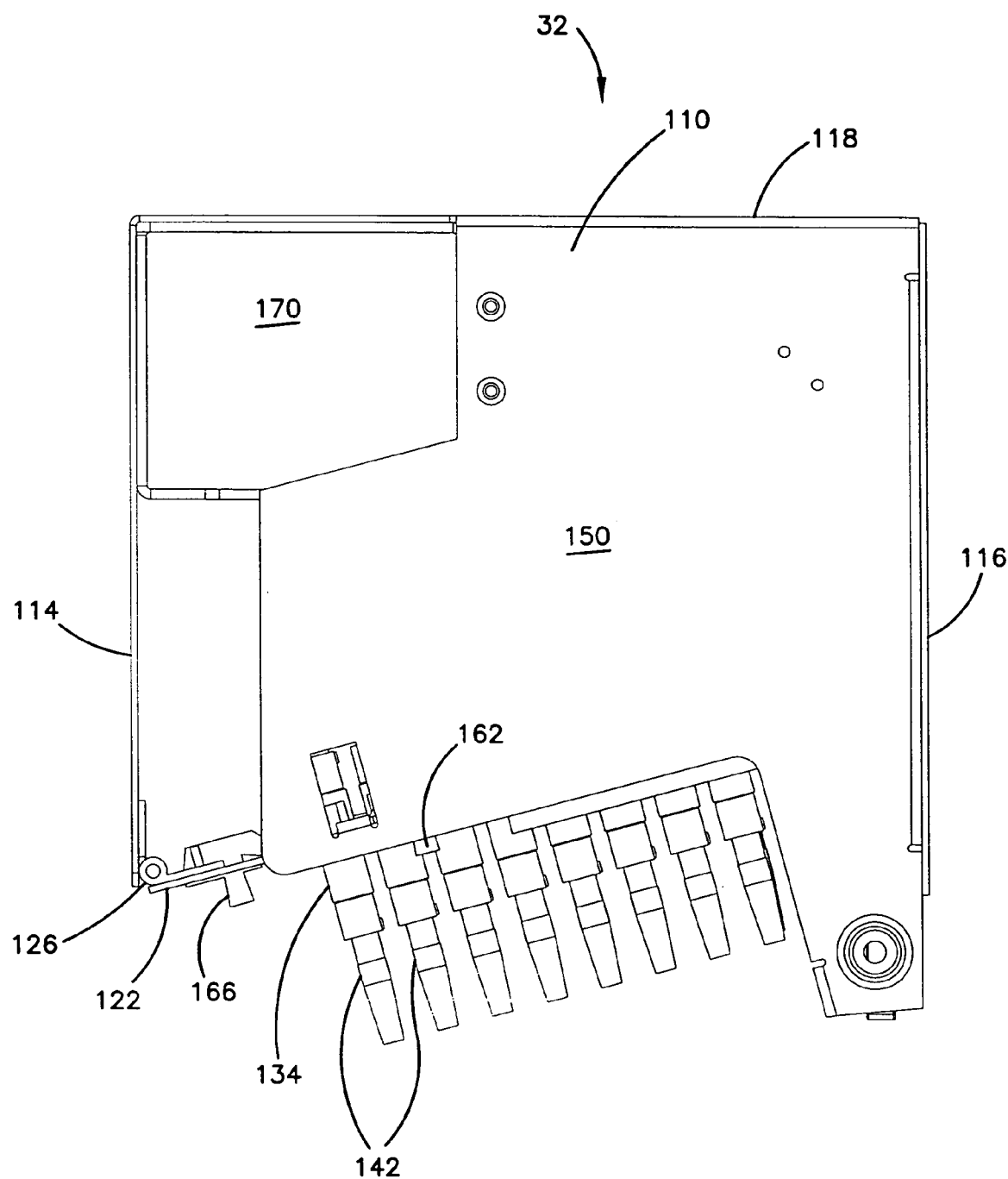
FIG. 5 is a top view of the termination module of FIG. 4.
Figure 6:
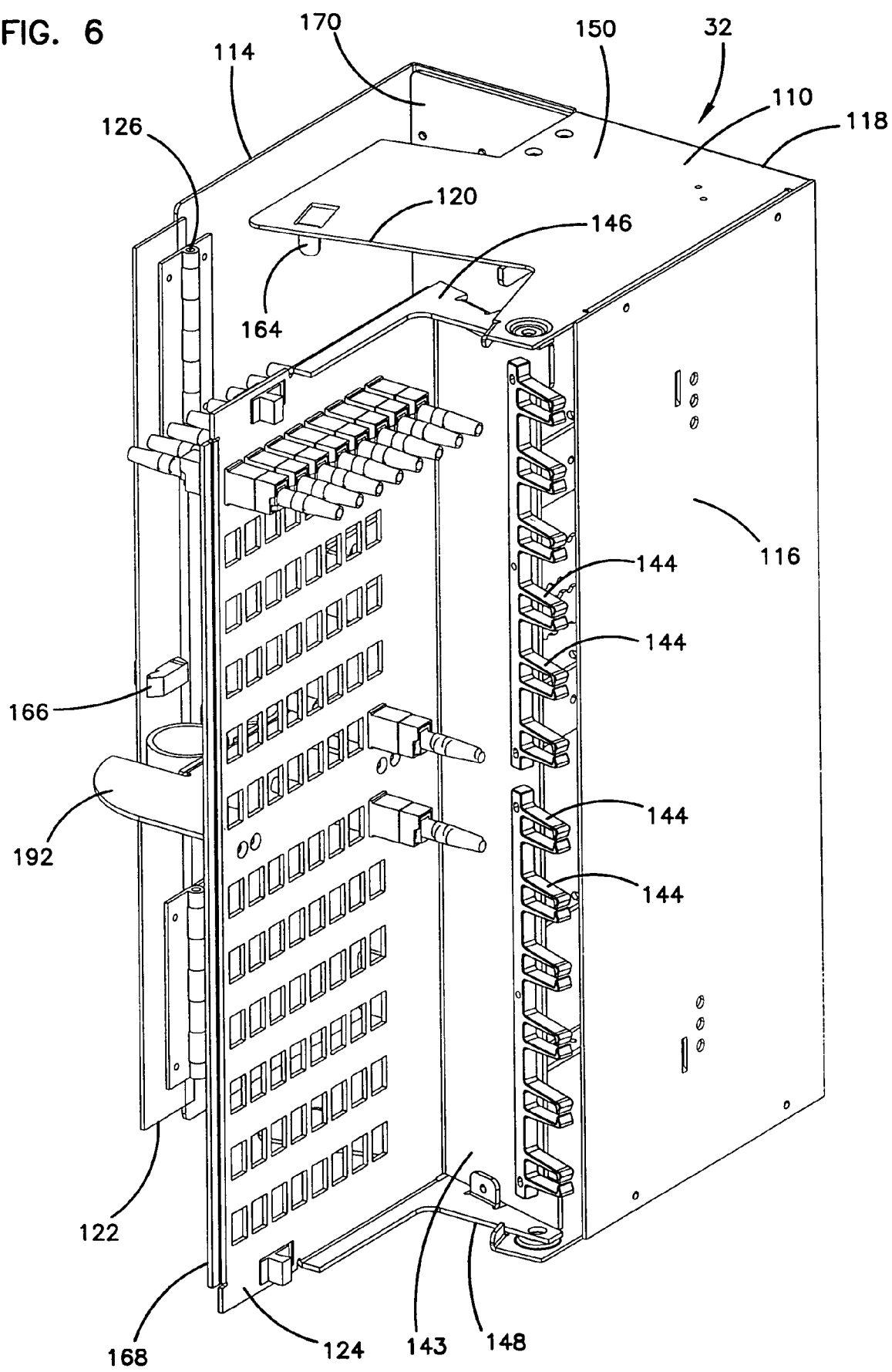
FIG. 6 is a front, top and right side perspective view of the termination module of FIG. 4, shown with the main panel and the cable access door pivoted to open positions.
Figure 7:
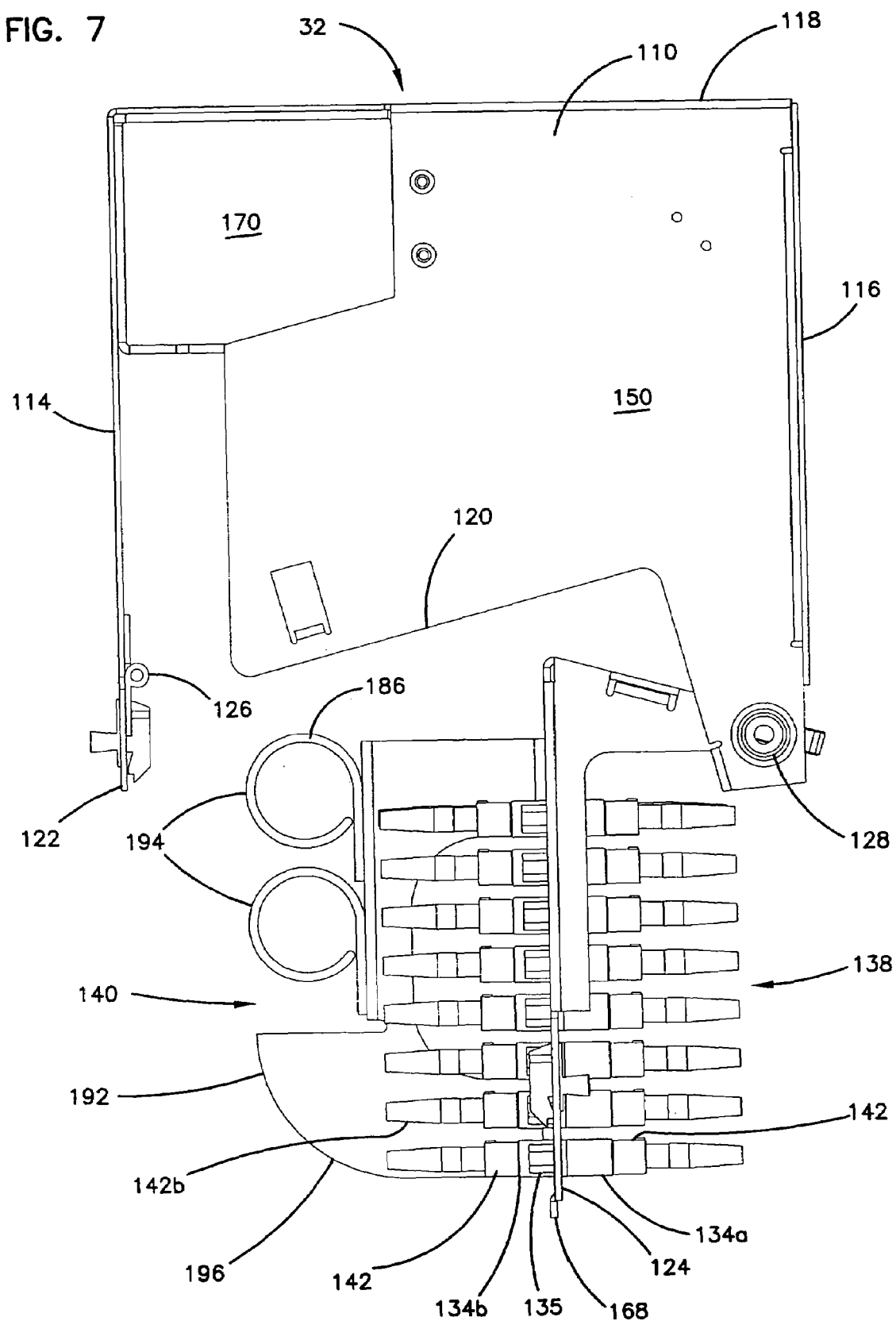
FIG. 7 is a top view of the termination module of FIG. 6 with the main panel and the cable access door in the open positions.

Referring to FIGS. 1–3, one preferred embodiment of a bay or frame 20 is shown for splicing, terminating, and managing fiber optic cables within the frame. Further features of frame 20 are shown in FIGS. 4–13. An upper portion 22 of frame 20 defines a termination and storage area. A lower portion 24 of frame 20 defines a splice area. Cables containing one or more individual optical fibers enter frame 20 typically from an overhead cable environment through a top 26 of frame 20, or from a raised floor environment at a bottom 28 of frame 20. If the cables are pre-terminated, the cables extend directly to termination and storage area 22. If the cables entering frame 20 are not pre-terminated, the cables extend to splice area 24 for splicing to terminated cables. From splice area 24, the cables then extend to termination and storage area 22. In termination and storage area 22, a plurality of accessible termination locations are provided for the terminated cables and for connecting other cables to the terminated cables, such as patch cords or cables. Utilizing patch cables, telecommunications equipment can be cross-connected between the termination locations through frame 20.

Frame 20 includes a rack 30 which supports a plurality of termination modules 32. In the preferred embodiment, left and right arrays 34, 36 of termination modules 32 are provided. Each array 34, 36 in the illustrated embodiment includes three individual termination modules 32a (left side), 32b (right side).

Rack 30 also supports an inner bay management panel 40 positioned between arrays 34, 36 of termination modules 32 for organizing and storing excess lengths of patch cables. Preferably, inner bay management panel 40 includes a vertical array of individual modules or sections 40a. By providing individual termination modules 32a, 32b and individual sections 40a of inner bay management panel 40 all of which are separately mountable to rack 30, these modules can be added at different times to rack 30, and replaced, if desired. Also, customized frames 20 can be provided where other fiber optic management equipment may be utilized in one or more of the areas in rack 30 instead of the six termination modules 32a, 32b and the three sections 40a of inner bay management panel 40 of the illustrated embodiment.

Rack 30 further supports a splice tray assembly 44, for holding a plurality of splice trays 46. In the preferred embodiment, frame 20 includes two vertically stacked splice tray assemblies 44. Each splice tray 46 includes structure for holding the ends of a plurality of fiber optic cables, and for holding individual splices between the ends of the cables. A variety of splice trays 46 may be used. Example splice trays are shown in commonly assigned U.S. application Ser. No. 09/158,182, filed Sep. 21, 1998, the disclosure of which is hereby incorporated by reference.

Rack 30 further supports a horizontal cable tray 50 positioned between termination and storage area 22 and splice area 24. Horizontal tray 50 supports patch cables on a front of frame 20 extending between the left and right arrays 34, 36 of termination modules 32 and inner bay management panel 40. Tray 50 also supports patch cables extending between frame 20 and further frames 20 or other telecommunications equipment in an adjacent area.

Frame 20 preferably includes hingedly mounted upper front doors 52, 54, and hingedly mounted lower front doors 56, 58 for protection of the cables, connectors, adapters and splice trays. Upper front doors 52, 54 pivot about vertical axes. Lower front doors 56, 58 pivot about horizontal axes. The doors preferably include one or more latches 59 to retain them in the closed positions.

Rack 30 further supports two vertical cable guides 60, 62, one on each side of rack 30, for use in managing and protecting patch cables adjacent to a front of frame 20. Cable guides 60, 62 include a plurality of spaced-apart fingers 65 which permit cable access to an interior of each of cable guides 60, 62 through a vertical side of each guide. In the illustrated embodiment, each cable guide 60, 62 also includes hinge plates 64 for forming a portion of the hinge for upper front doors 52, 54. Each cable guide 60, 62 is preferably made in segments, as part of the modular design of frame 20.

For ease of assembly, and versatility in use, components making up frame 20 are preferably separate components held together by fasteners. For example, in the illustrated embodiment, termination modules 32, inner bay management panel 40, splice tray assemblies 44, cable tray 50, and cable guides 60, 62 are separate from rack 30.

Frame 20 defines various access openings to permit cables to enter frame 20. At bottom 28 of frame 20, a center opening 66 allows cables to enter frame 20 from a raised floor environment. Central passage 68 allows the cables to pass to the individual splice trays 46. Ties 69 (FIGS. 11 and 12) are provided to securely tie the incoming cables to frame 20. A central opening 70 in cable tray 50 links splice area 24 to termination and storage area 22. Adjacent to top 26 of frame 20, access openings are provided by a rear central opening 72 or two top openings 74, 76, one in each top termination module 32. For pre-terminated cables, the cables can be passed directly through top openings 74, 76 for termination in the termination modules 32. For cables which are spliced to terminated cables, rear opening 72 opens into a rear vertical passage 78 which extends down to splice area 24, and ties 69, for splicing to the termination cables at splice trays 46.

Figure 13:
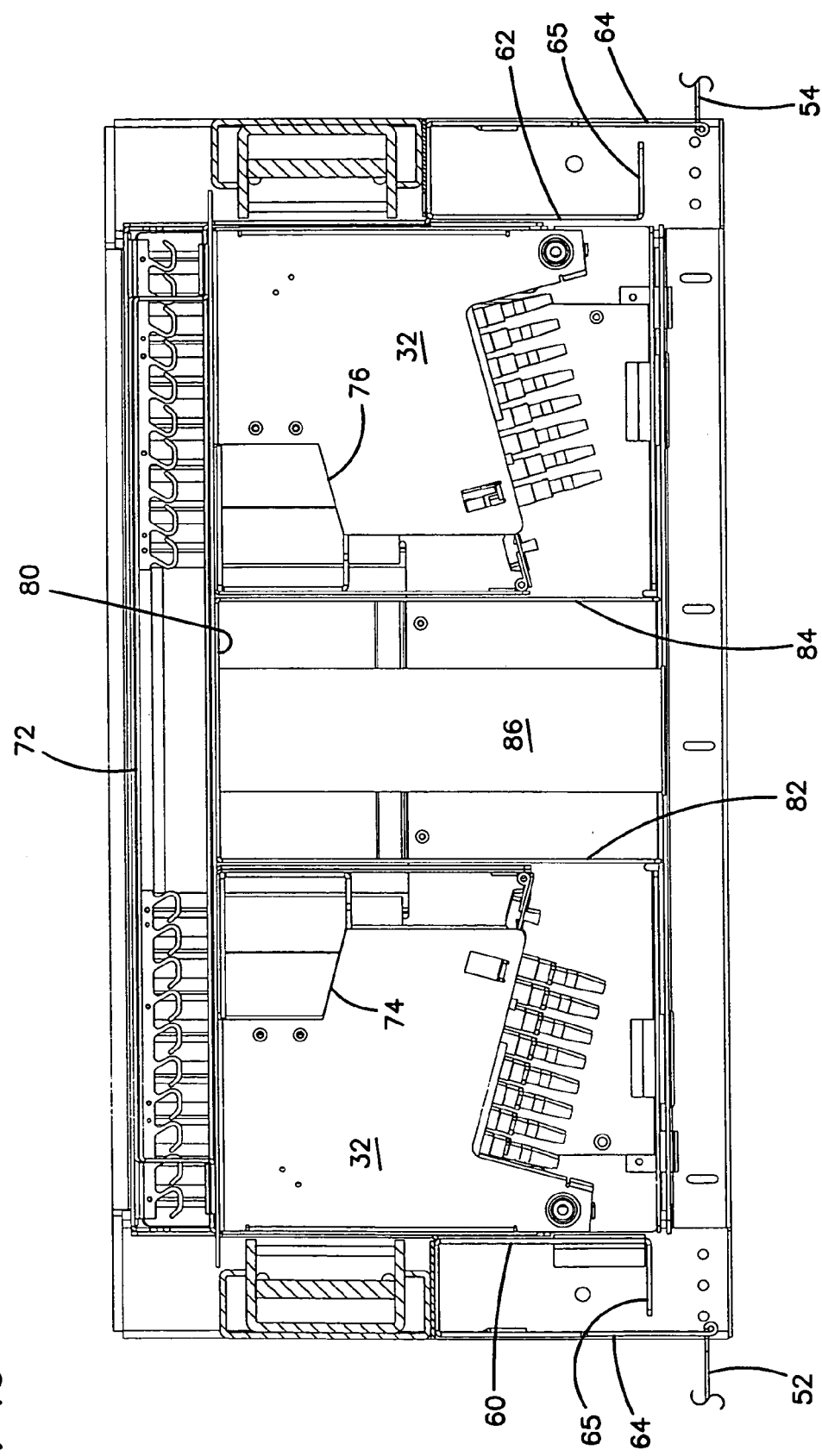
FIG. 13 is a cross-sectional top view of the frame taken along the lines 13—13 of FIG. 2.
Figure 14:
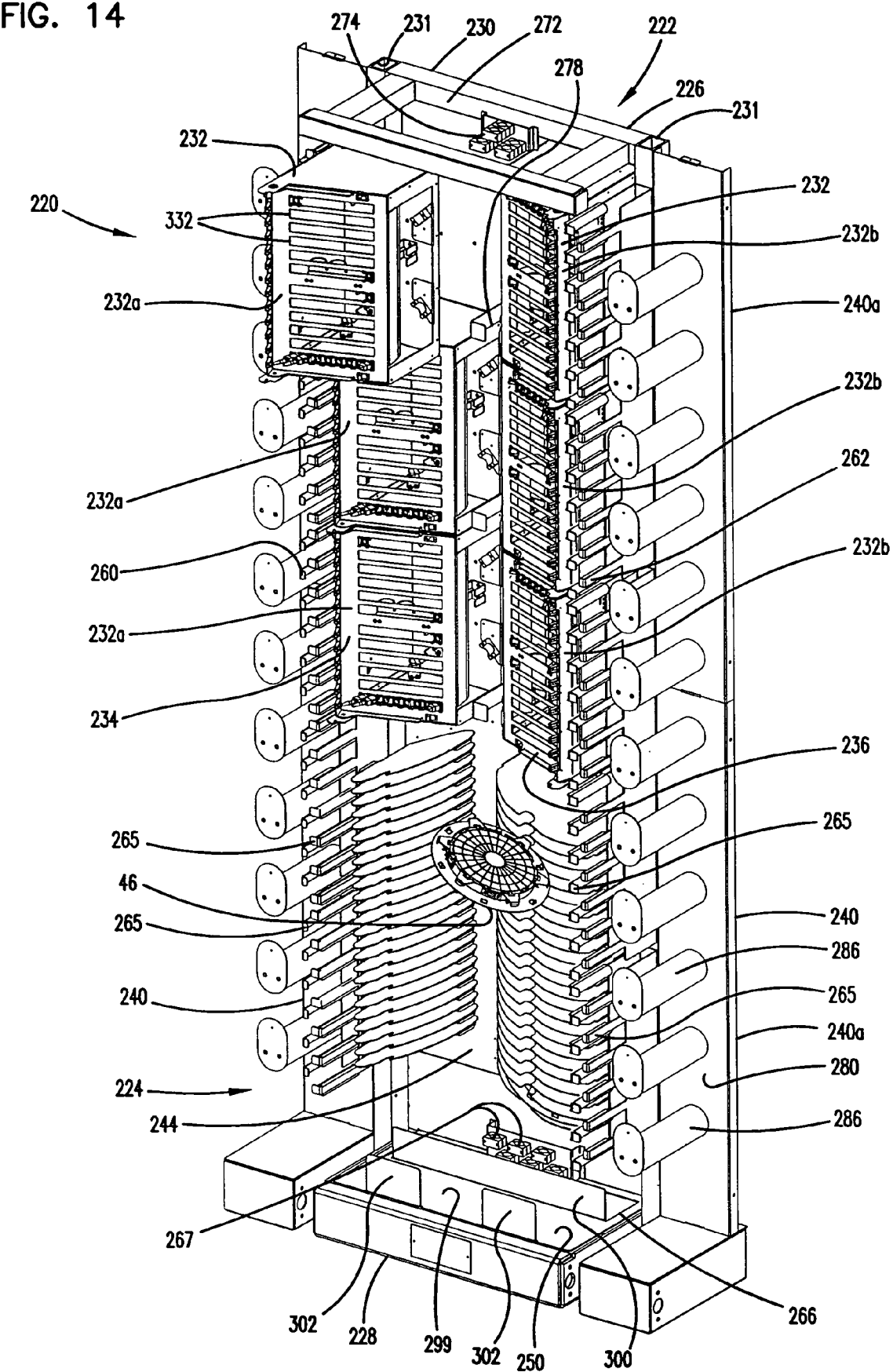
FIG. 14 is a front, top and right side perspective view of a second embodiment of a fiber distribution frame according to the present invention, with portions shown in exploded view.
Figure 15:
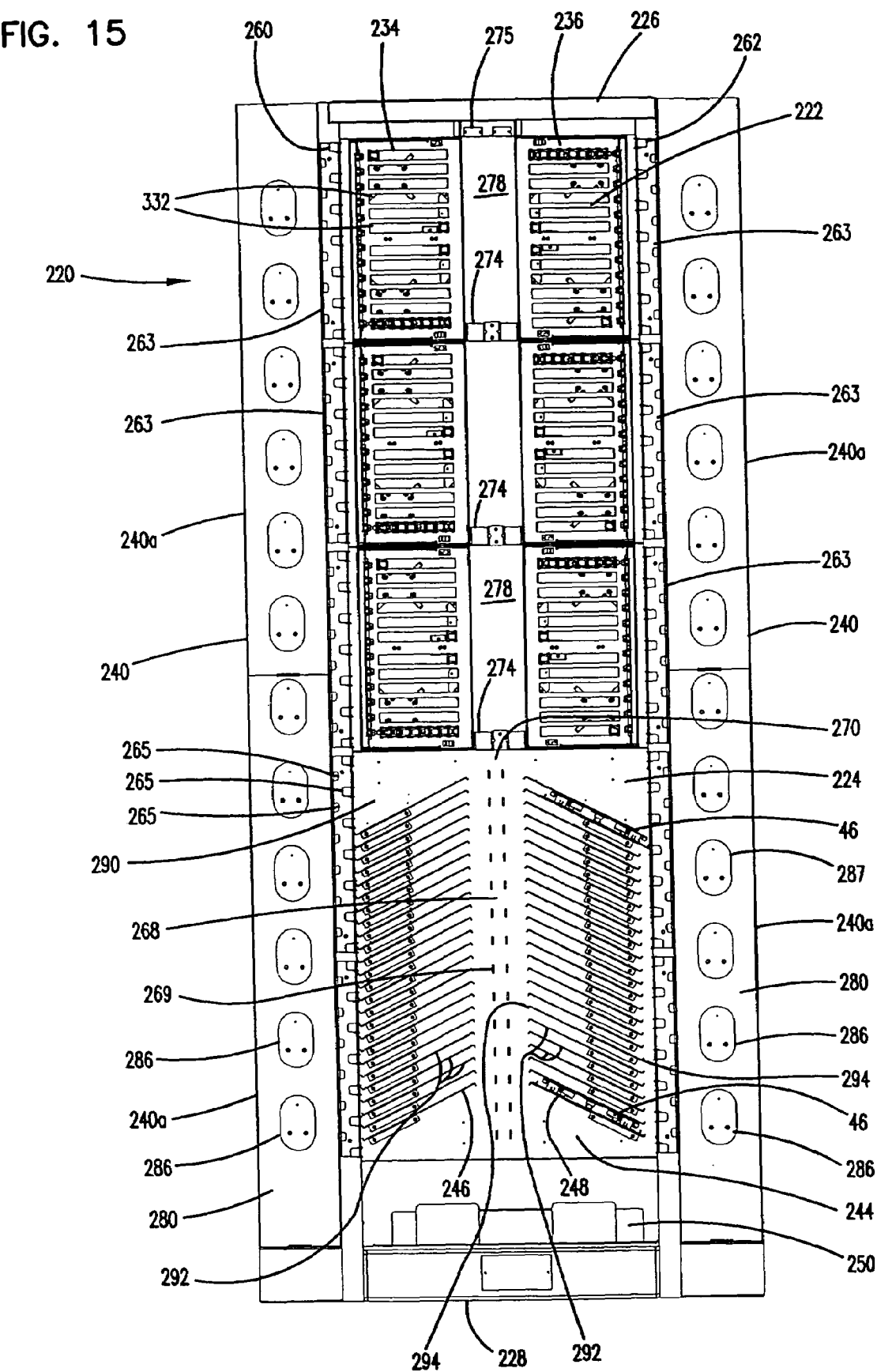
FIG. 15 is a front view of the frame of FIG. 14.
Figure 16:
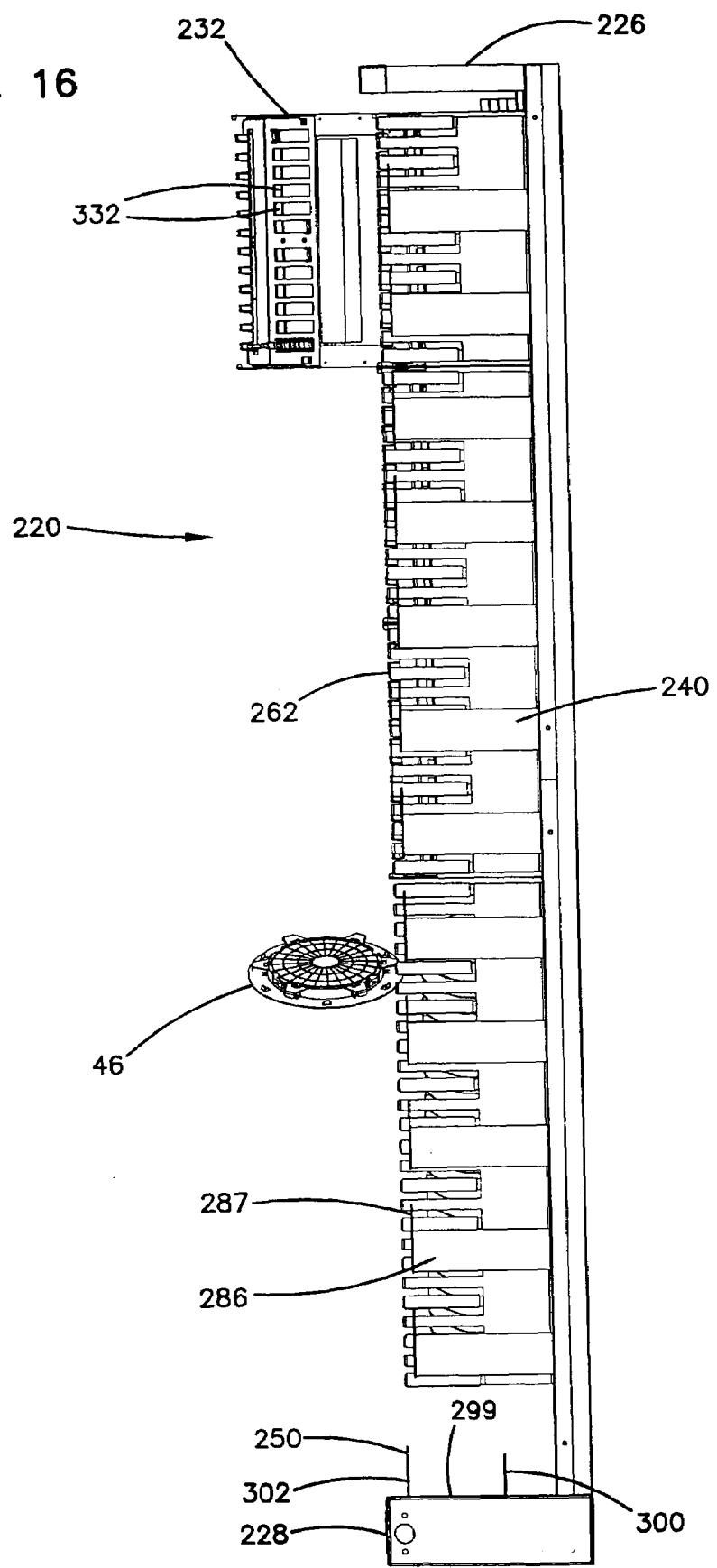
FIG. 16 is a right side view of the frame of FIG. 14.
Figure 17:
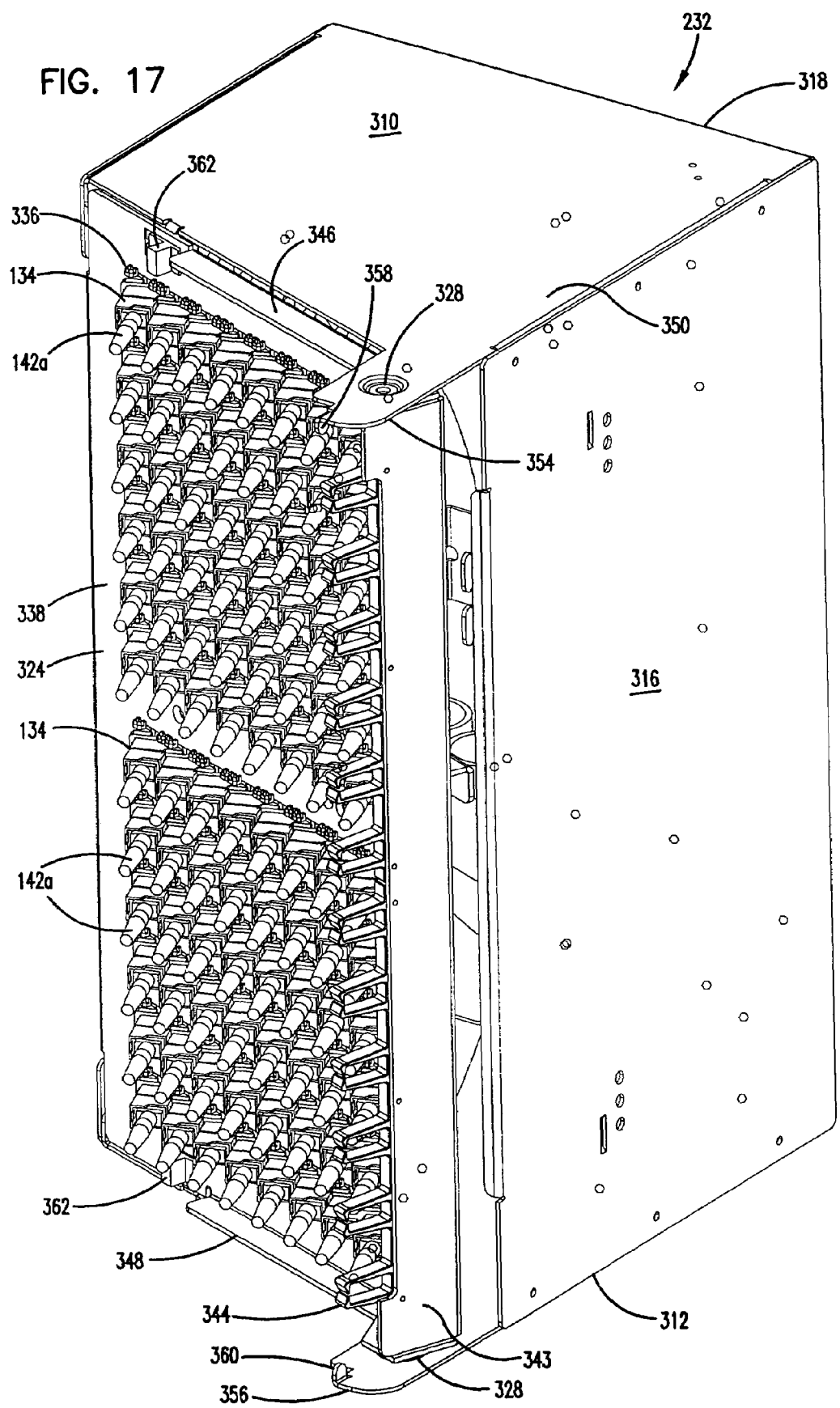
FIG. 17 is a front, top and right side perspective view of one of the termination modules in the frame of FIG. 14.
Figure 18:
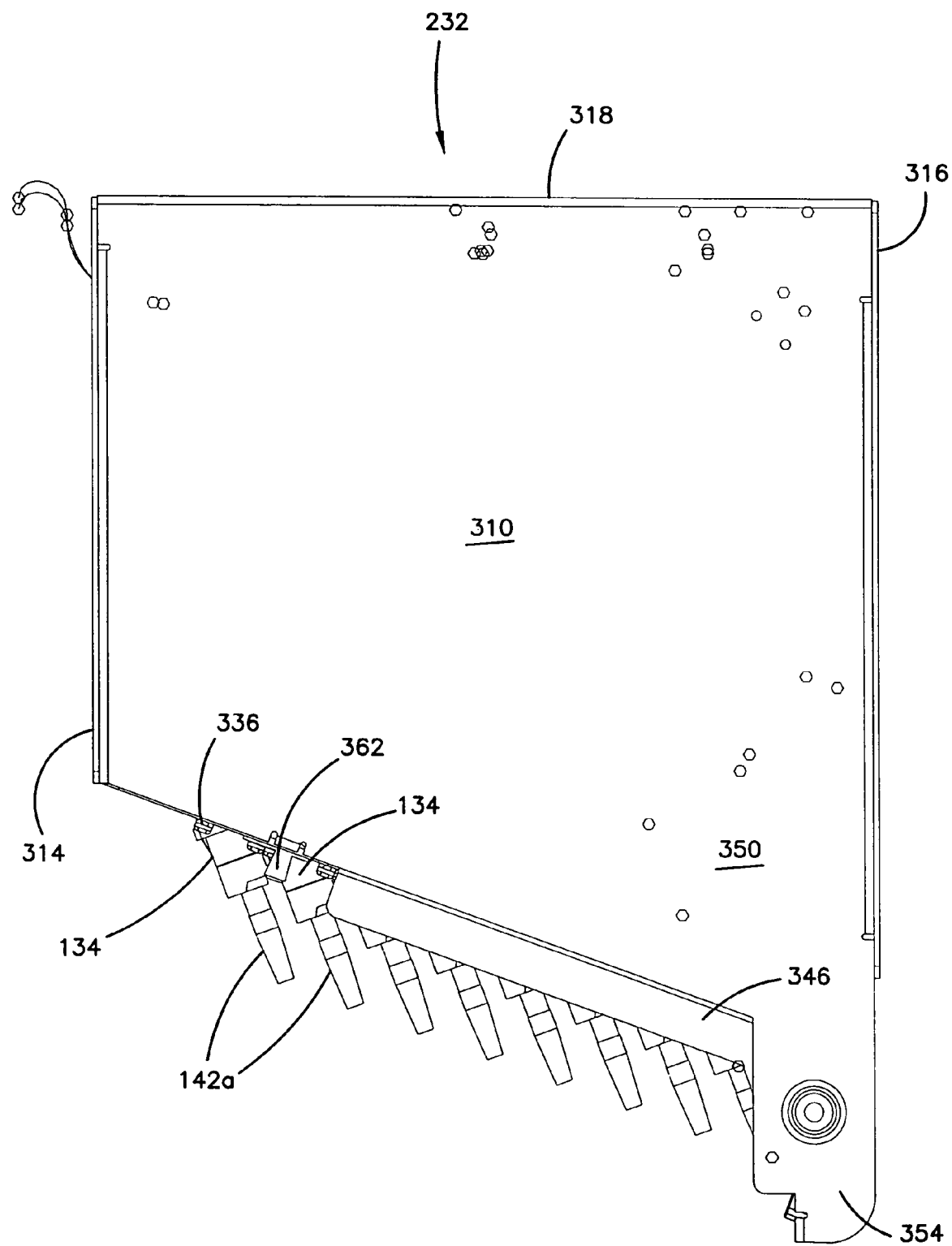
FIG. 18 is a top view of the termination module of FIG. 17.
Figure 19:
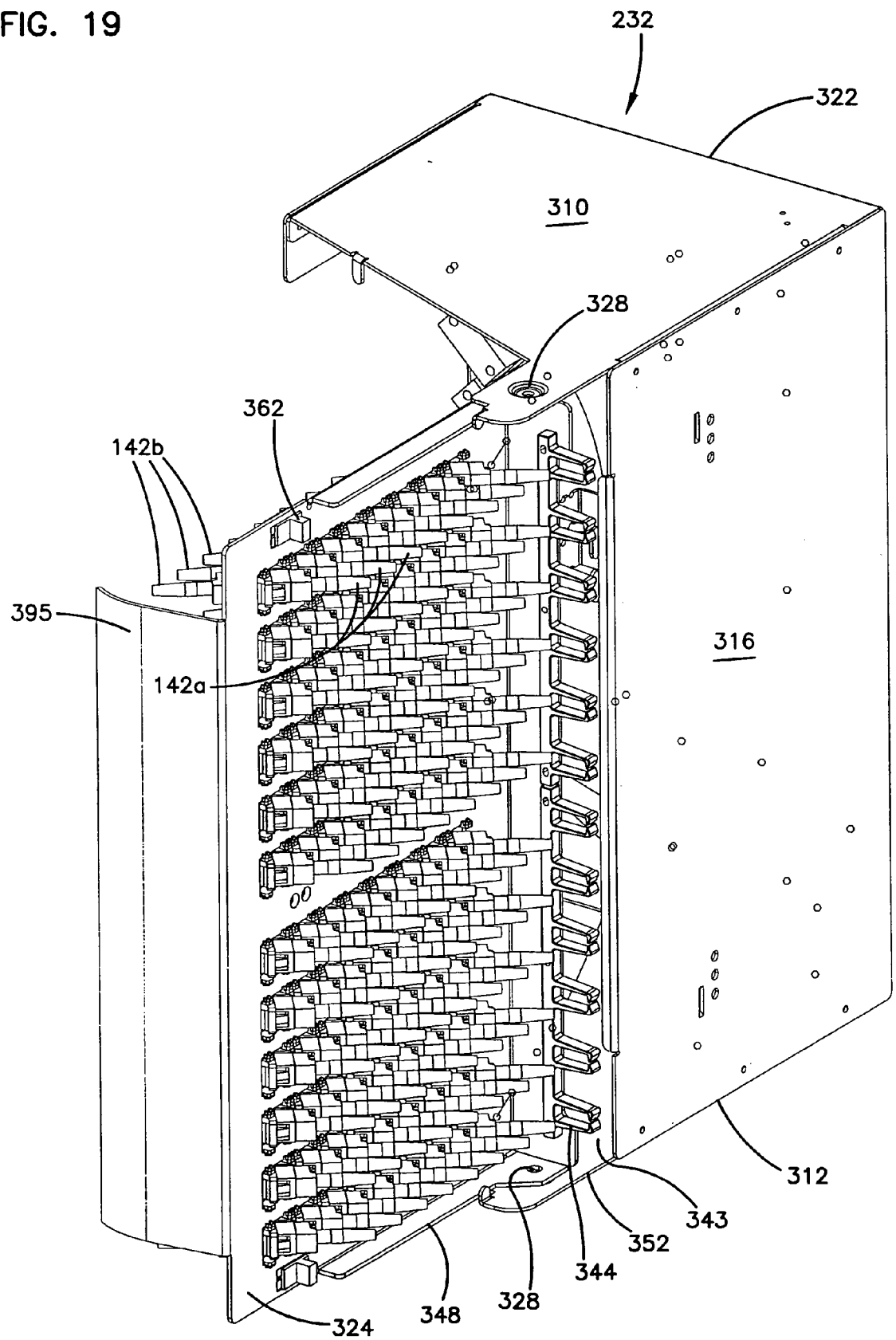
FIG. 19 is a front, top and right side perspective view of the termination module of FIG. 17, shown with the main panel pivoted to the open position.
Figure 20:
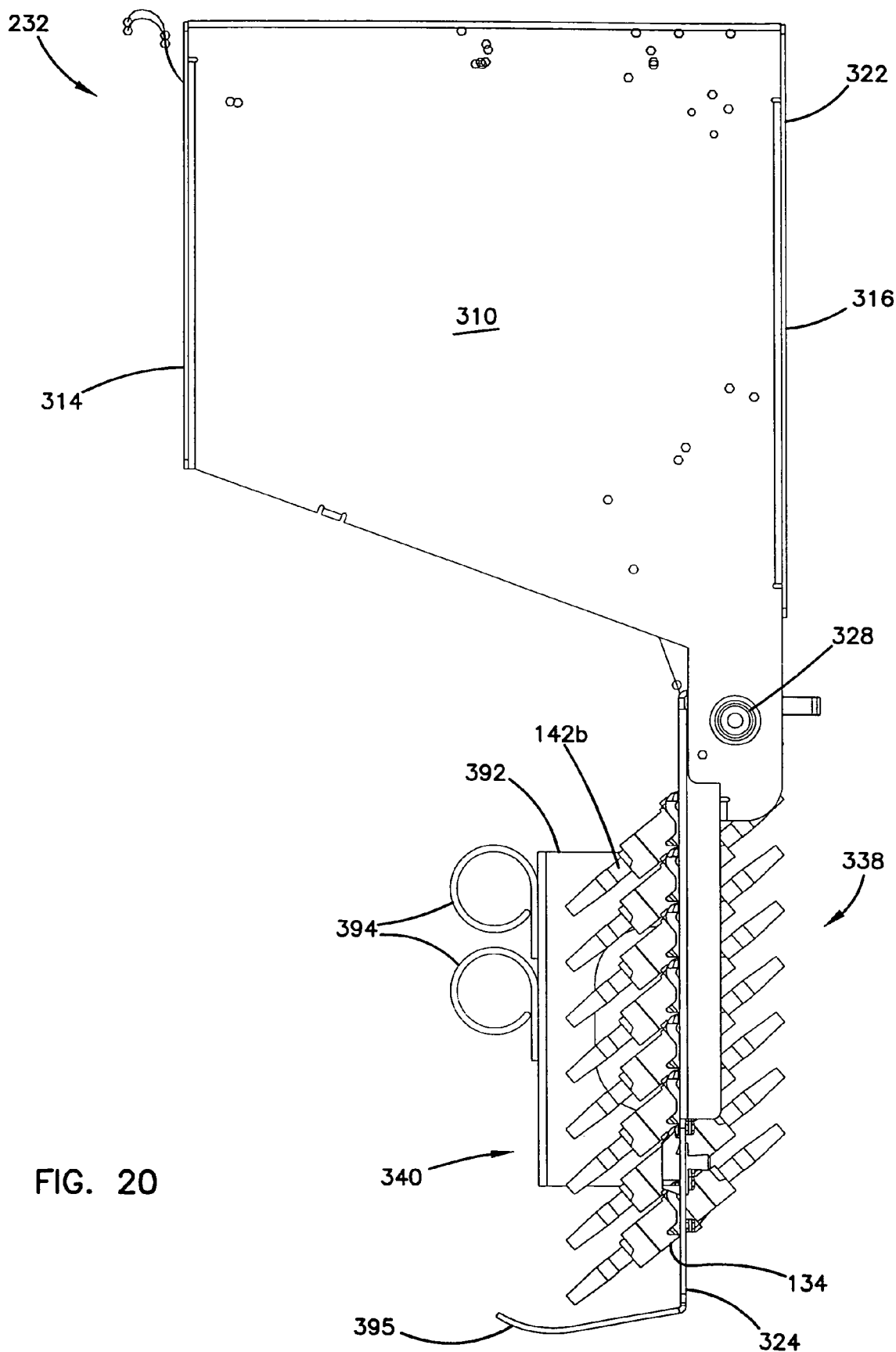
FIG. 20 is a top view of the termination module of FIG. 19 with the main panel in the open position.

Referring to FIGS. 1, 2 and 13, each section 40a of inner bay management panel 40 includes a center section 80, two forwardly extending opposed sides 82, 84, and one or more vertically spaced central spools 86 forwardly extending from center section 80. Spools 86 provide for storage of excess cable lengths for patch cables, such as the patch cables extending between left and right arrays 34, 36 of termination modules 32. Preferably, each section 40a includes two spools 86, such that when only one section is provided, cable storage capability is provided.

Figure 12:
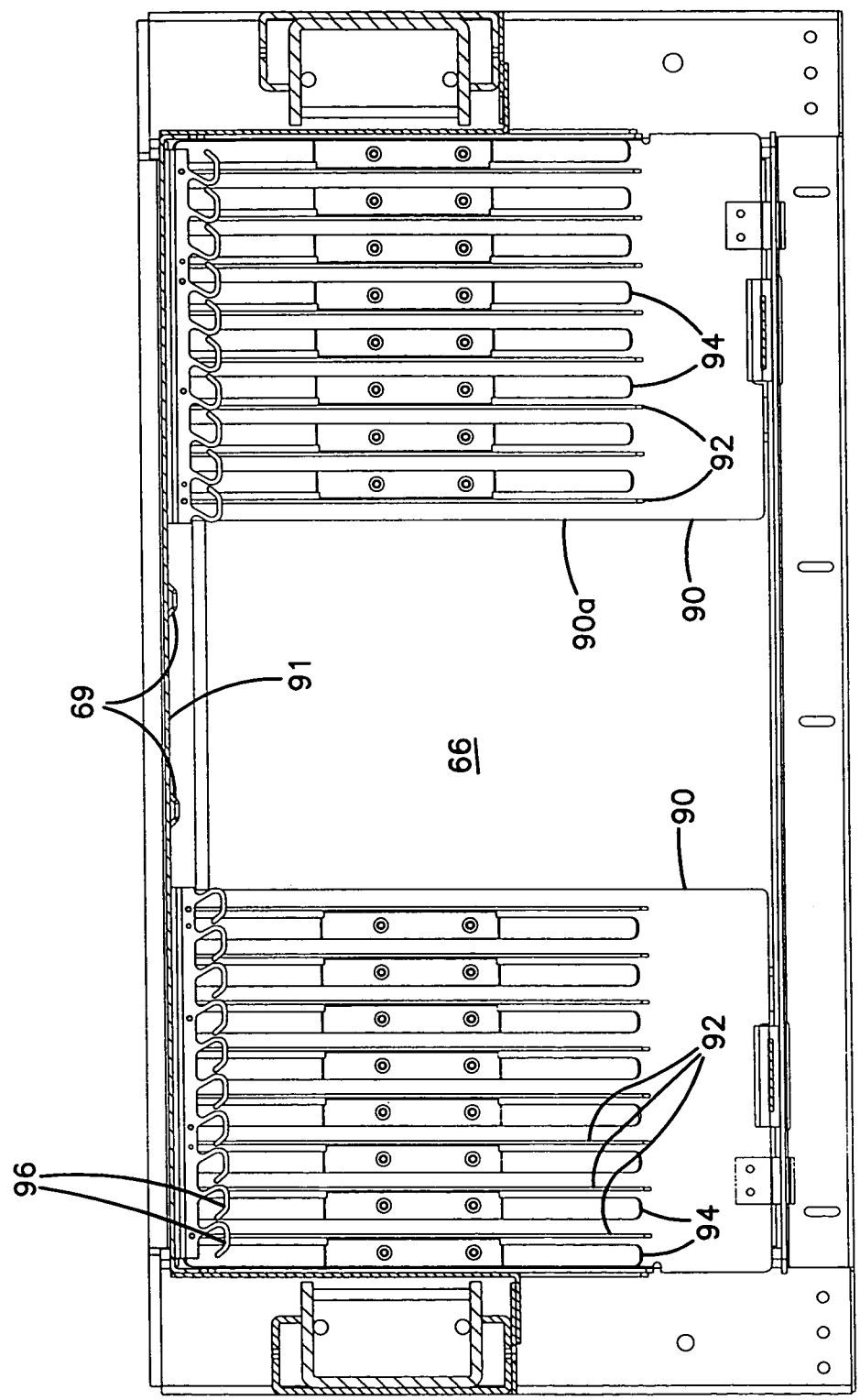
FIG. 12 is a cross-sectional top view of the frame taken along lines 12—12 of FIG. 2.

Referring now to FIGS. 1, 2, and 12, each splice tray assembly 44 includes a main horizontal support 90, a main back support 91, a plurality of divider walls 92, and plurality of spool cradles or supports 94, for supporting each of splice trays 46 having a round outer perimeter. Divider walls 92 extend vertically in the illustrated embodiment. Main horizontal support 90 has an open middle 90a for cable passage. A cable guide finger 96, and a cable tie 98 are provided to securely retain the cables to frame 20. Such permits removal of splice trays 46 from splice tray assembly 44, and the unwinding of the ends of the cable from splice tray 46 without excessive stresses or movements of the cables. In the illustrated embodiment, divider walls 92 extend vertically. In other embodiments, the divider walls can be angled with respect to the vertical, or even horizontal. While each splice tray assembly 44 is shown as part of frame 20, the splice trays could be stored separate from frame 20, if desired.

Referring now to FIGS. 1–3, and 11, horizontal cable tray 50 includes a main horizontal portion 99 including central opening 70, two opposed and upwardly extending curved cable guides 101 on each side of central opening 70, and a center cover 102 over central opening 70. Curved guides 101 protect cables extending from splice area 24 to termination and storage area 22. Center cover 102 prevents stored patch cables from hanging down from inner bay management panel 40 into splice area 24. Cut outs 104 on each end of horizontal tray 50 can be filled in with horizontal supports for supporting cables extending horizontally, or downwardly curved supports, if cables are directed downwardly from frame 20. Horizontal cable tray 50 also includes a front wall 105, and a rear wall 106 extending from main horizontal portion 99.

Referring now to FIGS. 4–10, each termination module 32 includes a top 110, a bottom 112, opposed sides 114, 116, and a rear 118. The illustrated module 32 is from right array 36. Preferably, each of termination modules 32a, 32b are identical, but positioned in a flipped orientation. Therefore, top 110 and bottom 112 would be in the reversed orientation for the left array 34 of modules 32.

Each termination module 32 defines an open front 120 preferably closed off by a first smaller door 122 and a second larger door 124, both of which are hingedly mounted to a remainder of termination module 32 about vertical axes. First door 122 defines a cable access door, especially useful for allowing cables to enter the termination module 32 and for positioning cables passing between locations on frame 20, such as cable extending between splice area 24, and an upper termination module 32 positioned above the particular termination module 32. Cable access door 122 is rotatably mounted to side 114 by a hinge 126.

Second door 124 defines a main panel 124 and is rotatably mounted to side 116 by a second hinge 128. Main panel 124 includes a plurality of rows 130 of openings 132 each sized for holding an adapter 134. Adapters 134 each include at least two aligned openings, one on a front side 134a, and the other on a rear side 134b for holding two connectors 142 to optically connect the connectors and the cables connected to the connectors. Various adapters 134 can be utilized including an adapter of the type shown in U.S. Pat. No. 5,317,663, constructed so as to have the commonly known SC configuration for receiving an SC connector on each end. Other adapters/connectors styles can be utilized including ST, FC, E-2000, and other styles. Preferably, main panel 124 includes six upper rows 130 of eight openings each, and six lower rows 130 of eight openings each. If desired, less than eight of the openings can be utilized for a given application. In the illustrated embodiment, adapters 134 snap mount to main panel 124 with a clip 135. Designation strips (not shown) can be provided to label each of openings 132.

Rear connectors 142b are connected to the cables entering frame 20 from the telecommunications equipment. A rear 140 of main panel 124 is primarily utilized as a semi-permanent connection between the connectors 142b and adapters 134. A front 138 of main panel 124 defines a plurality of accessible termination locations which can be connected between each other with patch cables and connectors 142a, so as to cross-connect the telecommunications equipment.

Main panel 124 includes an angled side panel 143. Side panel 143 includes a vertical array of clips 144 adjacent each row 130 of openings 132. Clips 144 rotate with main panel 124 and side panel 143. Each clip 144 holds the cables from each connector 142 disposed in each row. From clips 144, the cables extend through a side access of each cable guide 60, 62. Clips 144 help retain and protect the cables as main panel 124 is rotated. Without clips 144, rotation of main panel 124 may excessively pull or push on the portions of the cables positioned within cable guides 60, 62.

Main panel 124 further includes upper and lower hinge plates 146, 148. A top plate 150 and a bottom plate 152 define top 110 and bottom 112 of termination module 32 and each includes a hinge plate portion 154, 156 which cooperate with hinge plates 146, 148 to rotatably mount main panel 124 to top and bottom plates 150, 152. Each of hinge plate portions 154, 156 include a stop 158, 160 to limit rotation of main panel 124.

Main panel 124 is disposed at an angle to a vertical plane extending parallel to a front and a rear of frame 20. Such angling permits increased density over adapters 134 arranged with the longitudinal axes transverse to the front and rear planes. Also, cable management is facilitated by the angling of the cables toward cable guides 60, 62. For right array 36 of modules 32, main panels 124 are angled toward the right side of rack 30. For left array 34 of modules 32, main panels 124 are angled toward the left side of rack 30.

To maintain main panel 124 in the closed position, such as shown in FIGS. 1–5, two latches 162 are provided. Each latch 162 engages a tab 164 extending from top and bottom plates 150, 152. Cable access door 122 is also maintained in the closed position shown in FIGS. 4 and 5 by a second latch 166 which engages an edge 168 of main panel 124. Cable access door 122 also overlaps edge 168. Both top and bottom plates 150, 152 include cable passages 170, to permit vertical passing of cables into, and through termination module 32, if desired.

Referring now to FIGS. 6–10, internal cable management features are provided within termination module 32. A cable clamp 182 securely holds a cable entering termination module 32. A lower tab 181a helps maintain the cable in passage 170. Tab 181a also maintains other cables passing through module 32 in passage 170. An intermediate tab 181c and an upper tab 181b are also provided to position desired cables in passage 170. From clamp 182, the individual fibers are routed through a cable transitional area 171 including various cable guides 186 including tabs, spools, clips, or rings. A tie bracket 190 can be utilized with or instead of clamp 182 (see FIGS. 9 and 10) to tie down cable entering termination module 32. On rear 140 of main panel 124, a rear tray 192 is positioned in a central location on main panel 124 projecting horizontally and rearwardly. Rear tray 192 includes a plurality of horizontal cable rings 194. A curved edge 196 helps prevent rear tray 192 from catching on cables positioned within an interior of termination module 132, either in vertical cable passage 170, or in cable transitional area 171.

Figure 8:
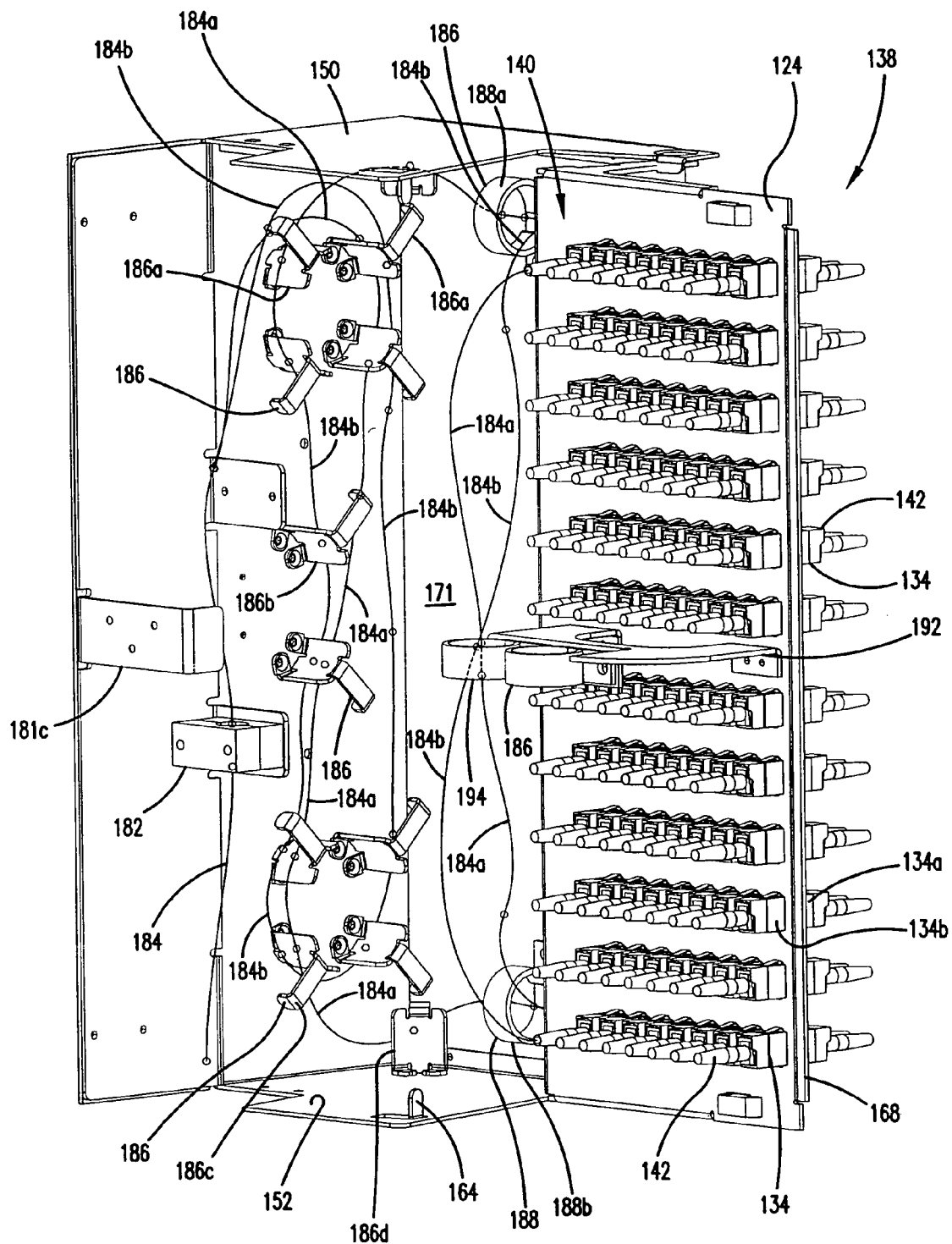
FIG. 8 is a front, top and left side perspective view of the termination module, with portions removed, and with the main panel in the open position, showing exemplary cable pathways.
Figure 9:
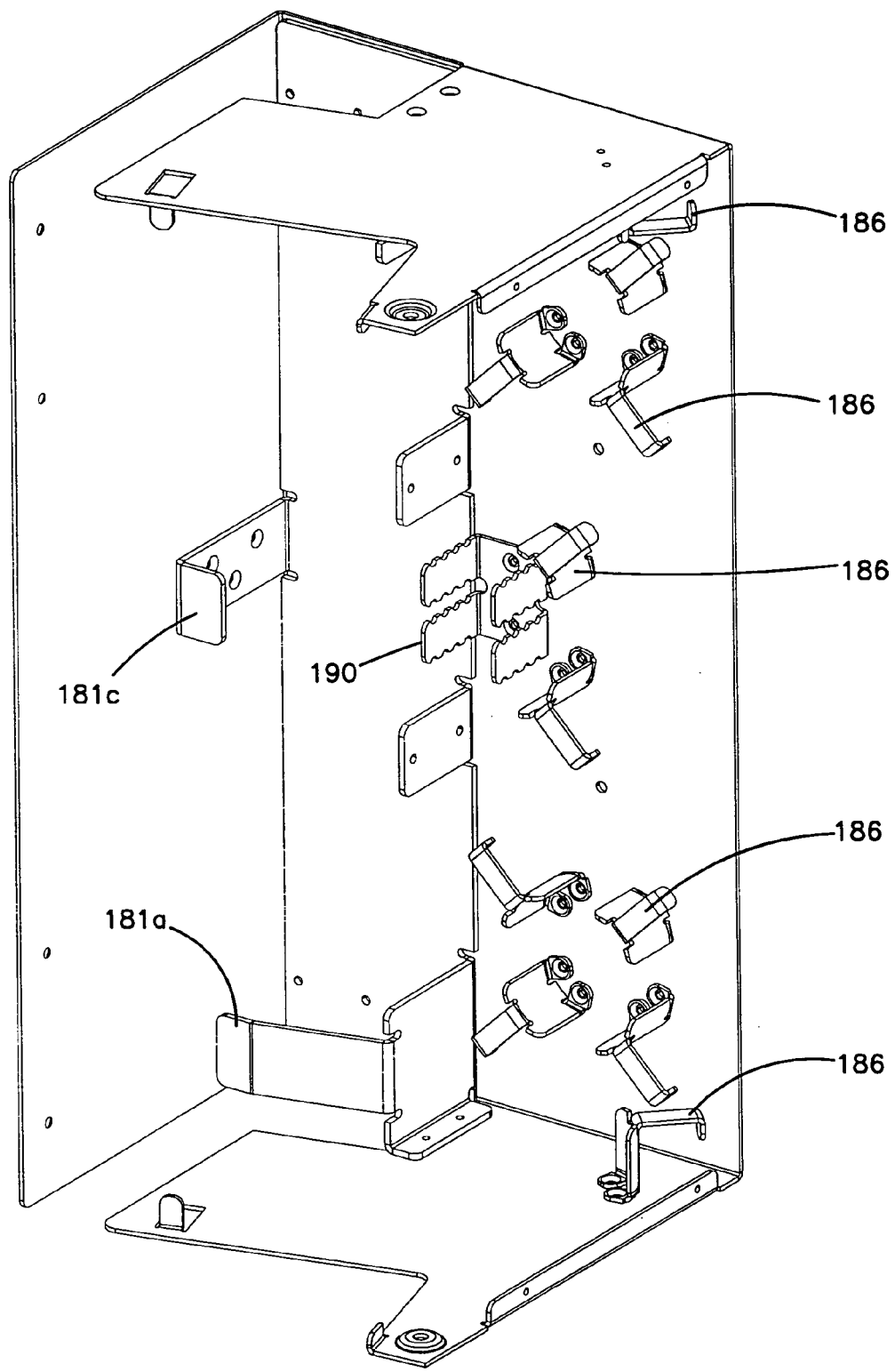
FIG. 9 is a front, top and right side perspective view of the main housing of the termination module.
Figure 10:
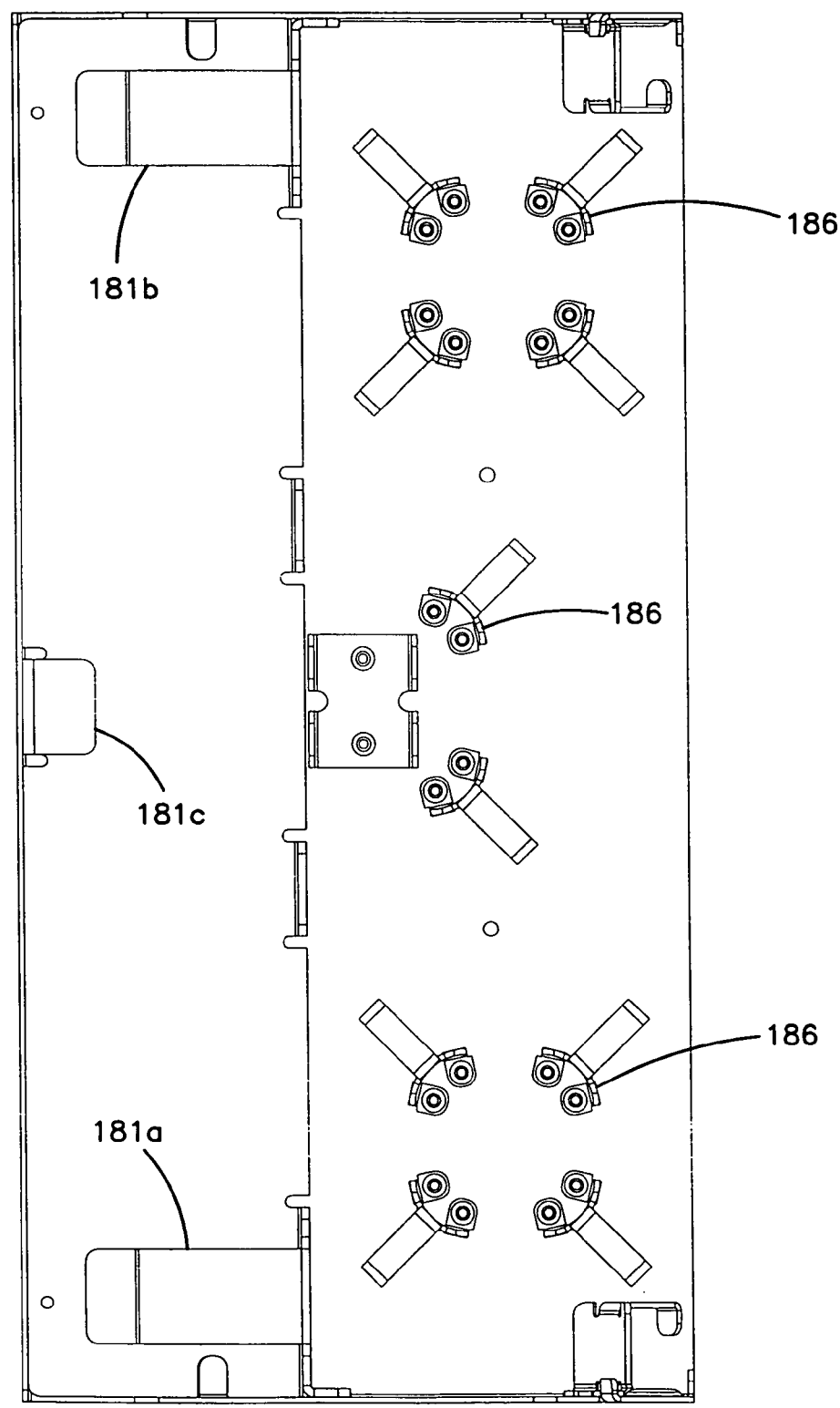
FIG. 10 is a front view of the main housing of FIG. 9.
Figure 11:
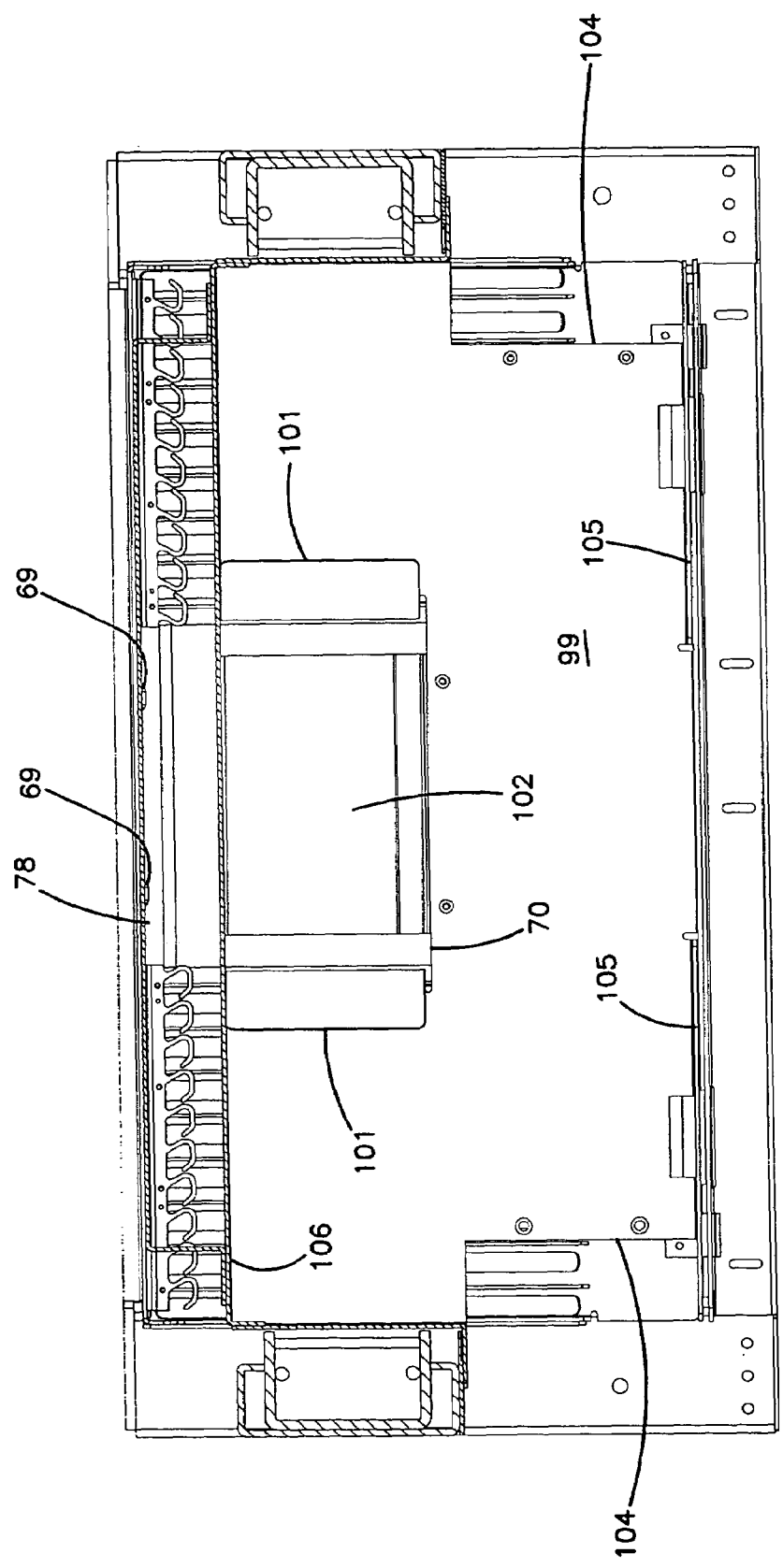
FIG. 11 is a cross-sectional top view of the frame taken along lines 11—11 of FIG. 2.

As shown in FIG. 8, an example cable 184 containing multiple fibers enters termination module 32 through bottom plate 152 in passage 170. Clamp 182 holds cable 184. A first fiber 184a extends around upper spool or guides 186a, past intermediate guides 186b, and around lower spool or guides 186c, around lower corner guide 186d to lower ring 188b, through horizontal ring 194 to one of the upper locations on main panel 124. Second example fiber 184b extends around upper guides 186a, past intermediate guides 186b, around lower guides 186c, back upward past intermediate guides 186b, around upper guides 186a, around upper corner guide 186e and through upper ring 188a. From upper ring 188a, second fiber 184b passes through horizontal ring 194 to a lower location on main panel 124. All of adapters 134 on main panel 124 can be connected to individual fibers entering termination module 32. For additional termination modules mounted to frame 20, mounted above termination module 32, the cables will pass through the lower termination modules to reach the upper termination modules in passage 170. In use, left array 34 of frame 20 may be utilized to terminate cables entering the building. Right array 36 may be utilized to terminate cables connected to various telecommunications equipment within the building. The fronts of each termination module 32 are utilized to run patch cables from the left side to the right side to cross-connect the various rear termination locations. The patch cables pass beneath inner bay management panel 40. From each front connector location, the patch cables enter one of cable guide 60, 62 for vertical management of the patch cables. From a lower end of cable guides 60, 62 the cables pass horizontally to the other side of frame 20, the inner bay management panel 40, or to another frame or other equipment. Excess lengths of cable in the patch cables can be wound around appropriate spools 86 to conveniently store the excess lengths, and to avoid tangling the patch cables together. Alternatively, the patch cables may run from either the left or the right array 34, 36 to an adjacent frame, or to other equipment.

Referring now to FIGS. 14–24, a second preferred embodiment of a frame 220 is shown for splicing, terminating, and managing fiber optic cables within the frame. An upper portion 222 of frame 220 defines a termination area. A lower portion 224 of frame 220 defines a splice area. Cables containing one or more individual optical fibers enter frame 220 typically from an overhead cable environment through a top 226 of frame 220, or from a raised floor environment at a bottom 228 of frame 220. If the cables are pre-terminated, the cables extend directly to termination area 222. If the cables entering frame 220 are not pre-terminated, the cables extend to splice area 224 for splicing to terminated cables. From splice area 224, the cables extend to termination area 222. In termination area 222, a plurality of accessible termination locations are provided for the terminated cables and for connecting other cables to the terminated cables, such as patch cords or cables. Telecommunications equipment can be cross-connected between the termination locations through frame 220.

Frame 220 includes a rack 230 which supports a plurality of termination modules 232. In the illustrated embodiment, left and right arrays 234, 236 of termination modules 232 are provided. Each array 234, 236 in the illustrated embodiment includes three individual termination modules 232a (left side), 232b (right side).

Rack 230 also supports a cable management panel 240 positioned vertically along one or both arrays 234, 236 of termination modules 232 for organizing and storing excess lengths of patch cables. In the illustrated embodiment, two cable management panels 240 are provided. Panels 240 are joined to ends 231 of rack 230. Additional racks 230 can be mounted to panels 240 as desired, with panels 240 serving as spacers between adjacent racks 230.

Each panel 240 includes two sections 240a. As noted above with respect to frame 20, by providing individual termination modules 232a, 232b and individual sections 240a of cable management panel 240 all of which are separately mountable to rack 230, these modules can be added at different times to rack 230, and replaced, if desired. Also, customized frames 220 can be provided where other fiber optic management equipment can be utilized in one or more of the areas in rack 230 instead of the six termination modules 232a, 232b and the two sections 240a of each cable management panel 240 of the illustrated embodiment.

Rack 230 further supports a splice tray assembly 244, for holding a plurality of splice trays 46. Frame 220 includes two vertical stacks 246, 248 of splice tray holders. Splice tray 46 as noted above for frame 20 is usable for frame 220. Alternatively, other splice trays may be used.

Rack 230 further supports a horizontal cable tray 250 positioned below splice area 224. Horizontal cable tray 250 supports patch cables on a front of frame 220 extending between the left and right arrays 234, 236 of termination modules 232. Tray 250 also supports patch cables extending between frame 220 and further frames 220 or other telecommunications equipment in an adjacent area.

Rack 230 further supports two vertical cable guides 260, 262, one on each side of rack 230, for use in managing and protecting patch cables adjacent to a front of frame 220. Cable guides 260, 262 include a plurality of spaced-apart fingers 265 which permit cable access to an interior of each cable guide 260, 262 through a vertical side of each guide. Each of cable guides 260, 262 is preferably made in segments 263, as part of the modular design of frame 220.

As above with respect to frame 20, components making up frame 220 are preferably separate components held together by fasteners, to aid in assembly, and versatility in use. In the illustrated embodiment, termination modules 232, cable management panels 240, splice tray assembly 244, cable tray 250, and cable guides 260, 262 are separate from rack 230.

Frame 220 defines various access openings to permit cables to enter frame 220. At bottom 228 of frame 220, a center opening 266 allows cables to enter frame 220 from a raised floor environment. Central passage 268 allows the cables to pass to the individual splice trays 46. Clamps 267 and ties 269 are provided to secure the incoming cables to frame 220. A central passageway 270 links splice area 224 to termination area 222. Adjacent to top 226 of frame 220, an access opening 272 and cable clamps 275 are provided. For pre-terminated cables, the cables can be passed directly through top opening 272 for termination in the termination modules 232. For cables which are spliced to terminated cables, opening 272 opens into a vertical passage 278 which extends down to central passageway 270 to splice area 224, and ties 269 for splicing to the termination cables at splices trays 46. Cable rings 274 are provided to manage the passage of cables in termination area 222.

Each cable management panel 240 includes a center section 280, and one or more vertically spaced spools 286 forwardly extending from center section 280. Spools 286 provide for storage of excess cable lengths for patch cables, such as the patch cables extending between left and right arrays 234, 236 of termination modules 232. Each spool 286 preferably includes a front flange 287 to aid in cable retention on the spools 286.

Figure 27:
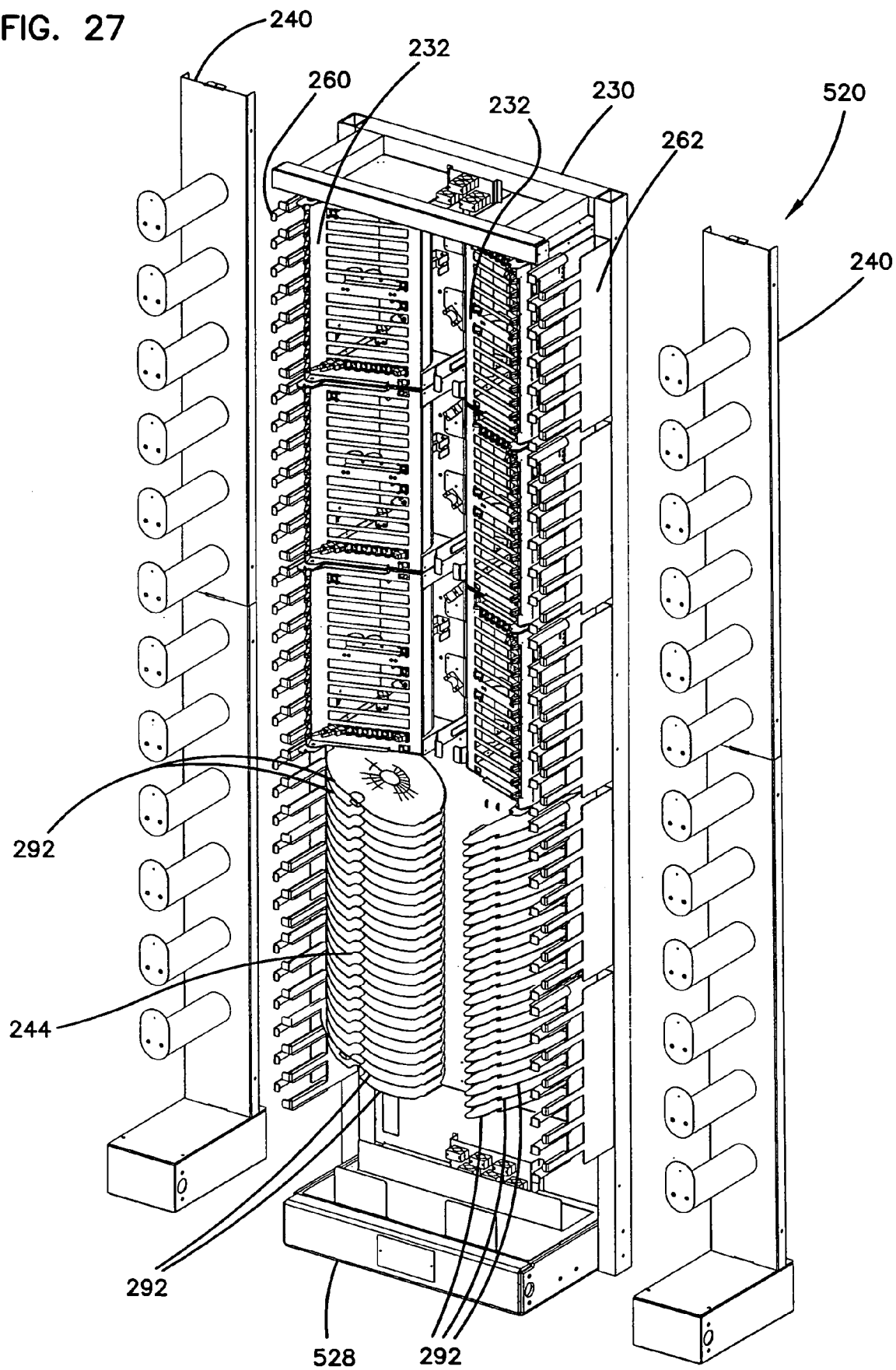
FIG. 27 is a front, top and right side perspective view of the frame of FIG. 25, showing the splice tray assembly in a reversed orientation to the frame of FIG. 25.

Splice tray assembly 244 includes a main vertical support 290 and a plurality of divider walls 292 extending forwardly. The divider walls 292 are preferably arranged in two vertical stacks 246, 248. Further, the divider walls 292 are preferably angled. Splice tray assembly 244 is shown for use with cables entering adjacent to top 226 of frame 220. If cables enter from bottom 228, it may be advantageous to angle divider walls 292 in an opposite direction, as shown in FIG. 27 for modified frame 520. To facilitate retention of splice trays 46 within the individual compartments defined by divider walls 292, side lips 294 are provided on opposite sides of each divider wall 292. Also, front notches 295 are provided to facilitate ease of access to a stored splice tray 46.

The angling of dividers 292 aids in reducing the horizontal space taken up by splice tray assembly, and allows for sufficient cable pathway spacing to upper pathway 278.

Horizontal cable tray 250 includes a main horizontal portion 299, a rear wall 300, and one or more front walls 302. The front and rear walls 302, 299 help protect and retain patch cables passing through horizontal cable tray 250.

Referring now to FIGS. 17–23, each termination module 232 includes a top 310, a bottom 312, opposed sides 314, 316, and a rear 318. Side 314 defines a side opening 315 bounded on three sides. Side opening 315 permits cable access to an interior of module 232. The illustrated module 232 is from right array 236. Preferably each of termination modules 232a, 232b are identical but positioned in a flipped orientation. Therefore, top 310 and bottom 312 would be in a reversed orientation for the left array 234 of modules 232.

Each termination module 232 defines an open front 320 preferably closed off by door or main panel 324 which is hingedly mounted to a main housing 322. Main panel 324 is rotatably mounted adjacent to side 316 by a hinge 328. Main panel 324 includes a plurality of openings 332 (see FIGS. 14–16) each sized for holding one or more adapters 134. Openings 332 are configured as elongated slots. To facilitate mounting of adapters 134, angled retainers 336 are provided. As noted above, various adapters 134 can be utilized including an SC type. Preferably, main panel 324 includes six upper openings 332, and six lower openings 332, each holding eight angled retainers 336 and adapters 134. Alternatively, individual openings can be provided for each adapter as noted above in the embodiment of FIGS. 1–13.

As noted above with respect to frame 20, rear connectors 142b are connected to the cables entering frame 220 from the telecommunications equipment. A rear 340 of main panel 324 is primarily utilized as a semi-permanent connection between the connectors 142b and adapters 134. A front 338 of main panel 324 defines a plurality of accessible termination locations which can be connected between each other with patch cables and connectors 142a so as to cross-connect the telecommunications equipment. Main panel 324 includes an angled side panel 343 including a vertical array of clips 344 adjacent each row of adapters 134. Clips 344 rotate with main panel 324 and side panel 343. Each clip 344 holds the cables from each connector 142a disposed in each row. From clips 344, the cables extend through a side access of each cable guide 260, 262. Clips 344 help retain and protect the cables as main panel 324 is rotated. Without clips 344, rotation of main panel 324 may excessively pull or push on the portions of the cables positioned within cable guides 260, 262.

Main panel 324 further includes upper and lower hinge plates 346, 348. A top plate 350 and a bottom plate 352 define top 310 and bottom 312 of termination module 232 and each includes a hinge plate portion 354, 356 which cooperate with hinge plates 346, 348 to rotatably mount main panel 324 to top and bottom plates 350, 352. Each of hinge plate portions 354, 356 includes a stop 358, 360 to limit rotation of main panel 324.

Main panel 324 is disposed at an angle to a vertical plane extending parallel to a front and a rear of frame 220. Such angling permits increased density over adapters arranged with the longitudinal axes transverse to the front and rear planes. Also, cable management is facilitated by the angling of the cables toward cable guides 260, 262. For right array 236 of modules 232, main panels 324 are angled toward the opposite side of rack 230. Similarly, for left array 234 of modules 232, main panels 324 are angled toward the right side of rack 230. Use of the angled retainers 362 permits angling back of the cables toward the respective right and left sides of rack 230. The angled retainers 362 hold each adapter 134 so its longitudinal axis is at a non-transverse angle to the planar portion of main panel 324. Commonly owned U.S. Pat. No. 5,214,735 shows example retainers usable with main panel 324. The disclosure of U.S. Pat. No. 5,214,735 is incorporated by reference.

To maintain main panel 324 in the closed position, two latches 362 are provided, similar to latches 162 noted above. Each latch 362 engages a tab 364 extending from top and bottom plates 350, 352.

Referring now to FIGS. 20–23, internal cable management features are provided within termination module 232. Cable clamps 382 securely hold the cable or cables entering termination module 232 at side opening 315 through side 314. Lower clamps 382a are used for cables entering termination module 232 from above. Upper clamps 382b are used for cable entering termination module 232 from below. Preferably, all of the clamps 382 are positioned at an angle. Clamps 382 are preferably positioned on mounting flanges 383. From clamps 382, the individual fibers are routed through various cable guides 386 including tabs, spools, clips, or rings. A tie bracket 390 can be utilized with or instead of clamps 382 to tie down cable entering termination module 332. On rear 340 of main panel 324, a rear tray 392 is positioned in a central location on main panel 324 projecting horizontally and rearwardly. Rear tray 392 includes one or more horizontal cable rings 394. A vertical lip 395 extends rearwardly from the free edge of main panel 324 to protect the cables and the connectors.

Figure 21:
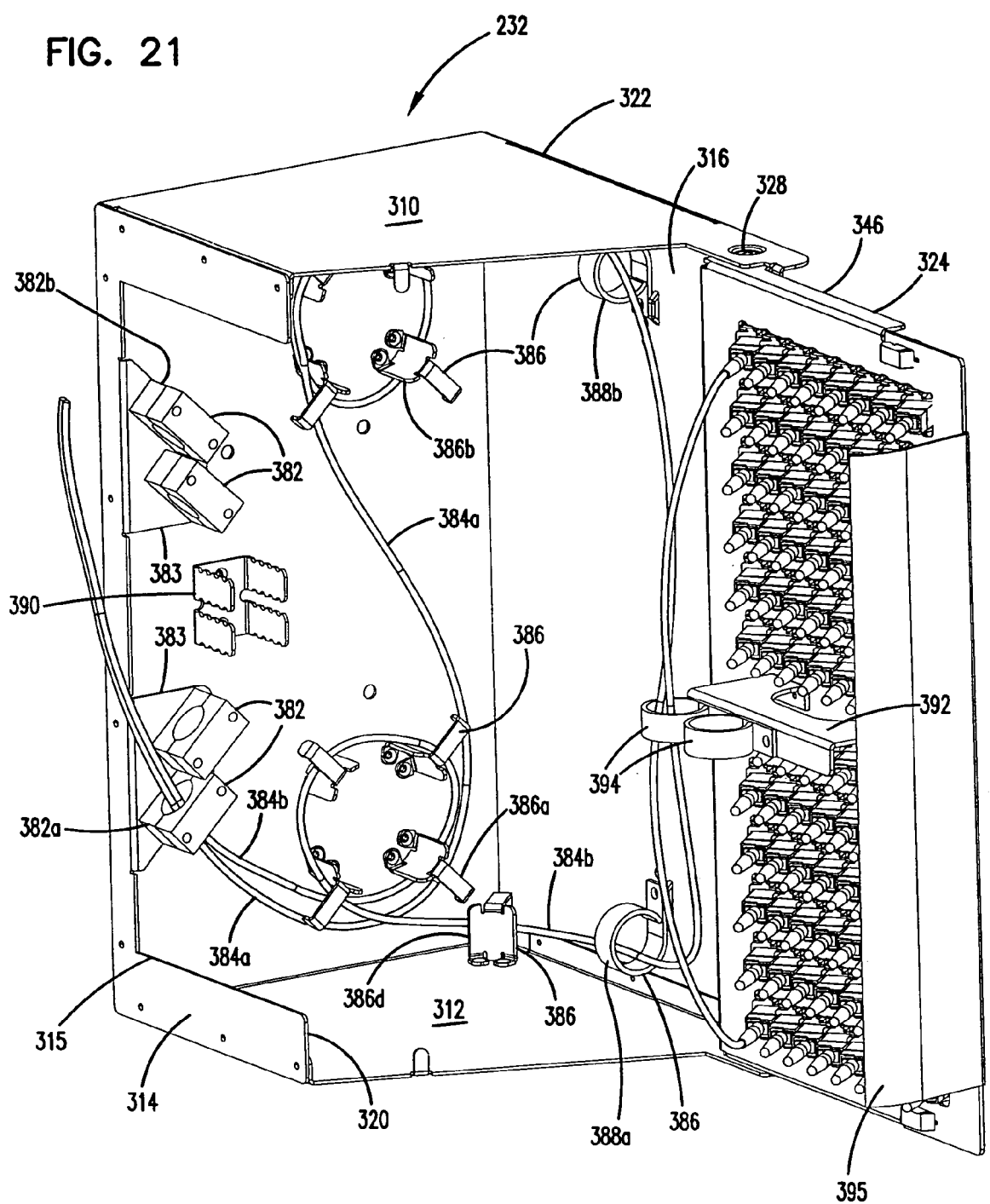
FIG. 21 is a front, top and left side perspective view of the termination module of FIG. 17, with the main panel in the open position, showing exemplary cable pathways.
Figure 22:
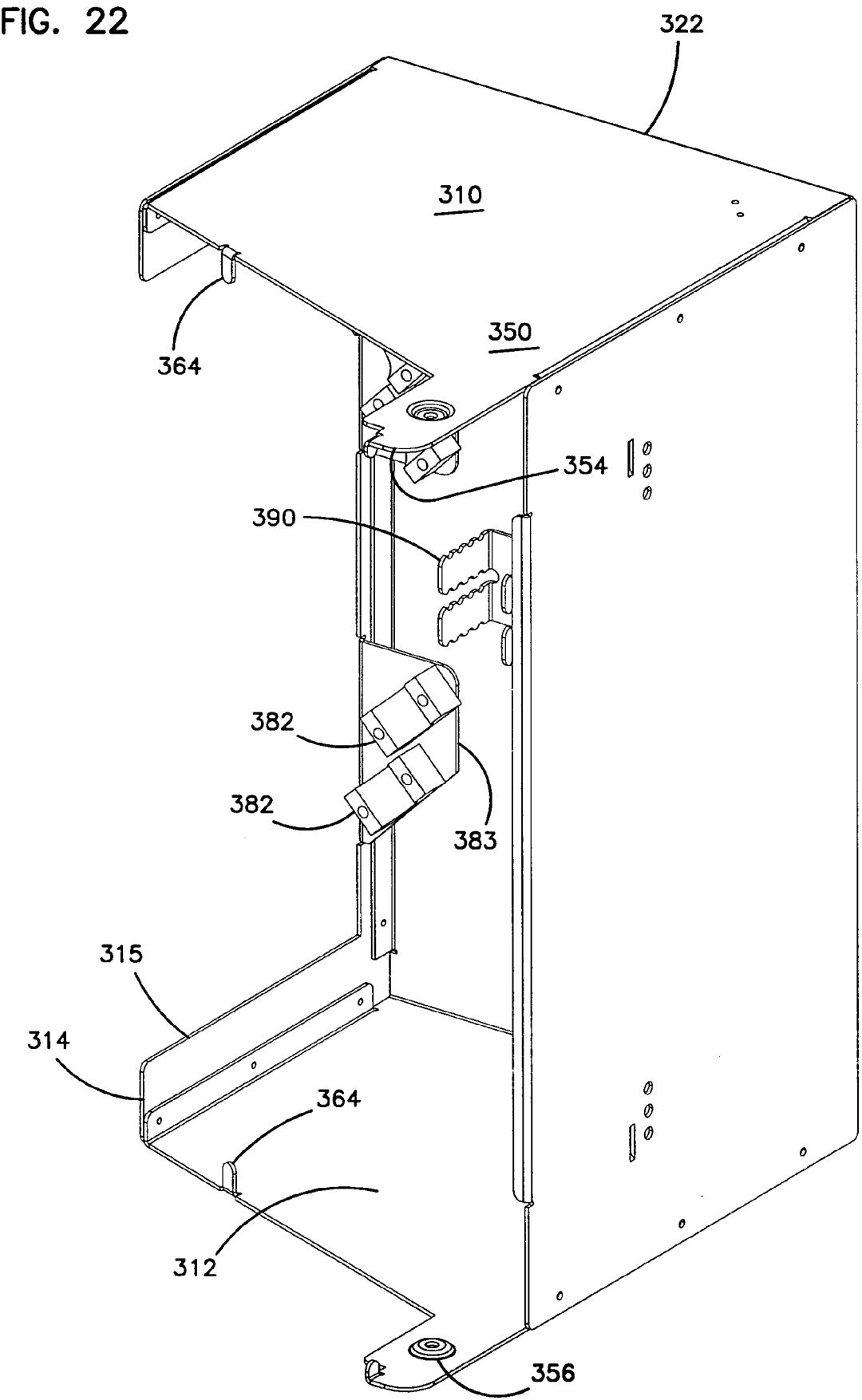
FIG. 22 is a front, top and right side perspective view of the main housing of the termination module of FIG. 17.
Figure 23:
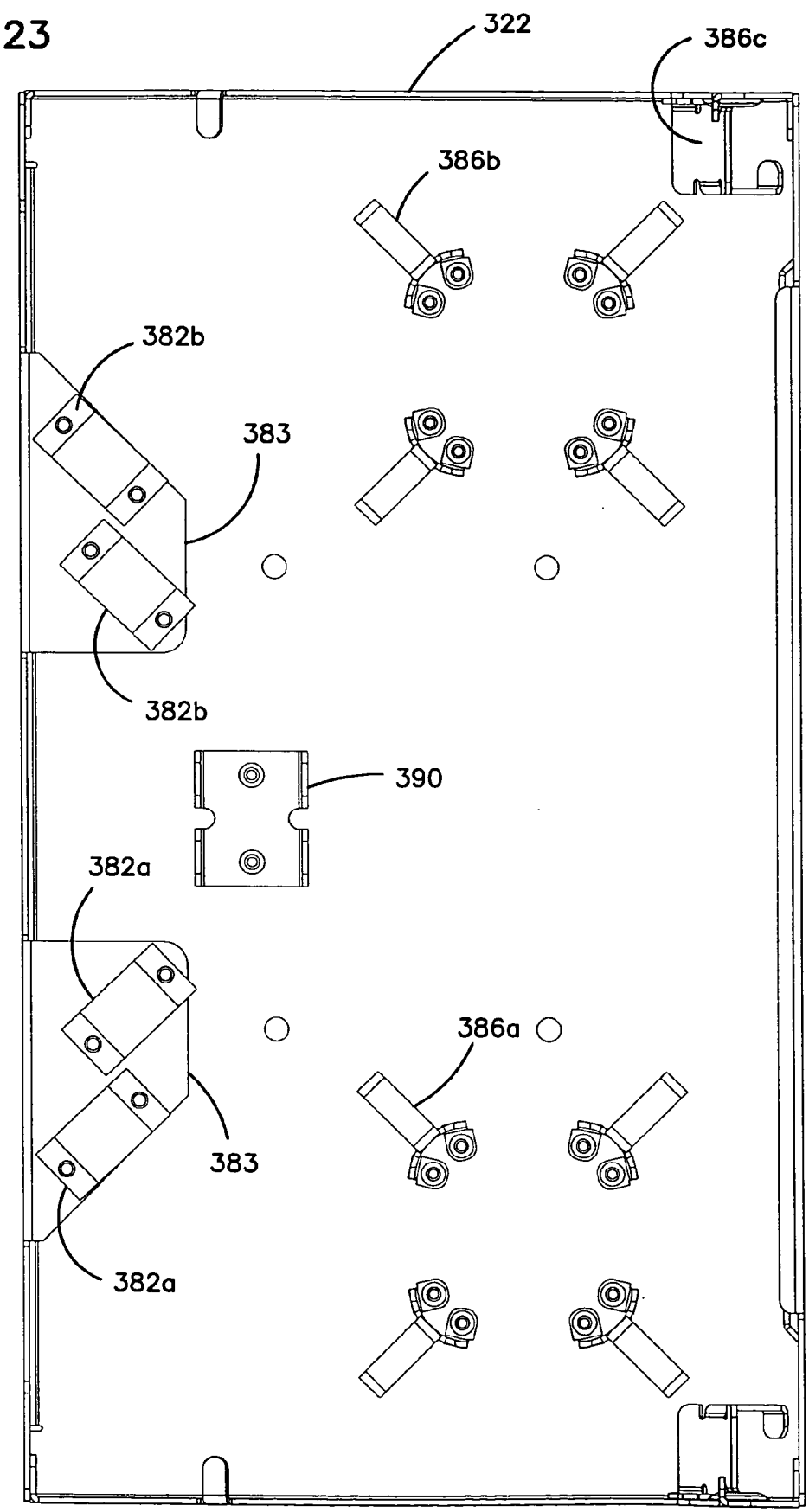
FIG. 23 is a front view of the main housing of FIG. 22.
Figure 24:
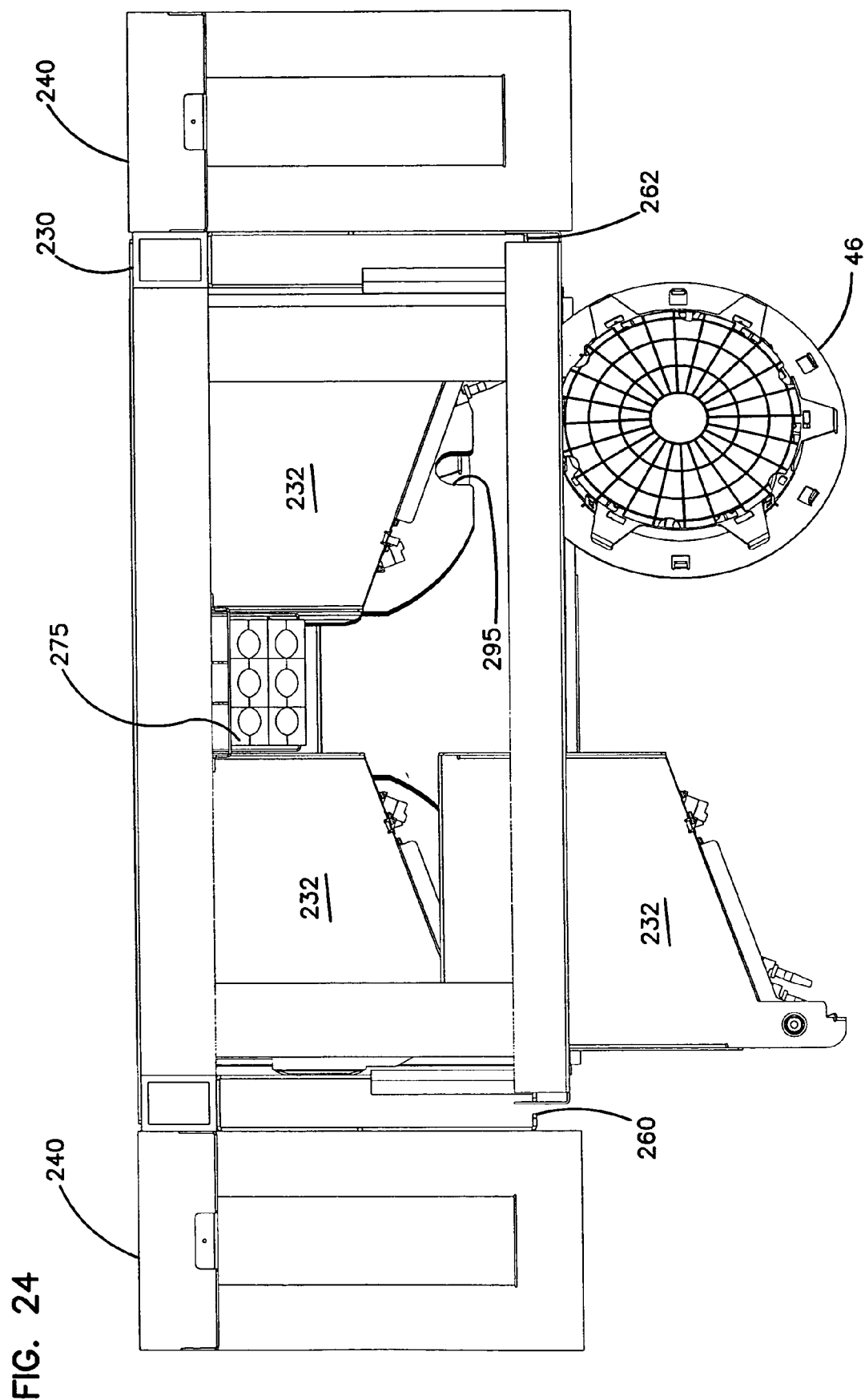
FIG. 24 is a top view of the frame of FIG. 14.

As shown in FIG. 21, example cables (fibers) enter termination module 232 through side opening 315. Clamp 382 holds example first and second fibers 384a, 384b. First fiber 384a extends around lower spool or guide 386a to an upper spool or guide 386b around an upper corner guide 386c to upper ring 388b, through horizontal ring 394 to one of the lower locations on main panel 324. Second example fiber 384b extends from lower guide 386a, to lower corner guide 386d, and through lower ring 388a. From lower ring 388a, second fiber 384b passes through horizontal ring 394 to an upper location on main panel 324.

Frame 220 is used in a similar manner as frame 20 where the left and right arrays 234, 236 may be utilized to terminate cables entering the building, and cables connected to various telecommunications within the building. Frame 220 may be utilized to run patch cables in order to cross-connect the various rear termination locations. The patch cables pass beneath splice area 224. From each front connection location, the patch cables enter one of cable guides 260, 262 for vertical management of the patch cables. From a lower end of cable guides 260, 262, the cables pass horizontally to the other side of frame 220, or to another frame or other equipment. Excess lengths of patch cables can be wound around appropriate spools 286 in one of cable management panels 240 to conveniently store the excess lengths, and to avoid tangling the patch cables together. Alternatively, the patch cables may run from either the left or the right array 234, 236 to an adjacent frame, or to other equipment.

Figure 25:
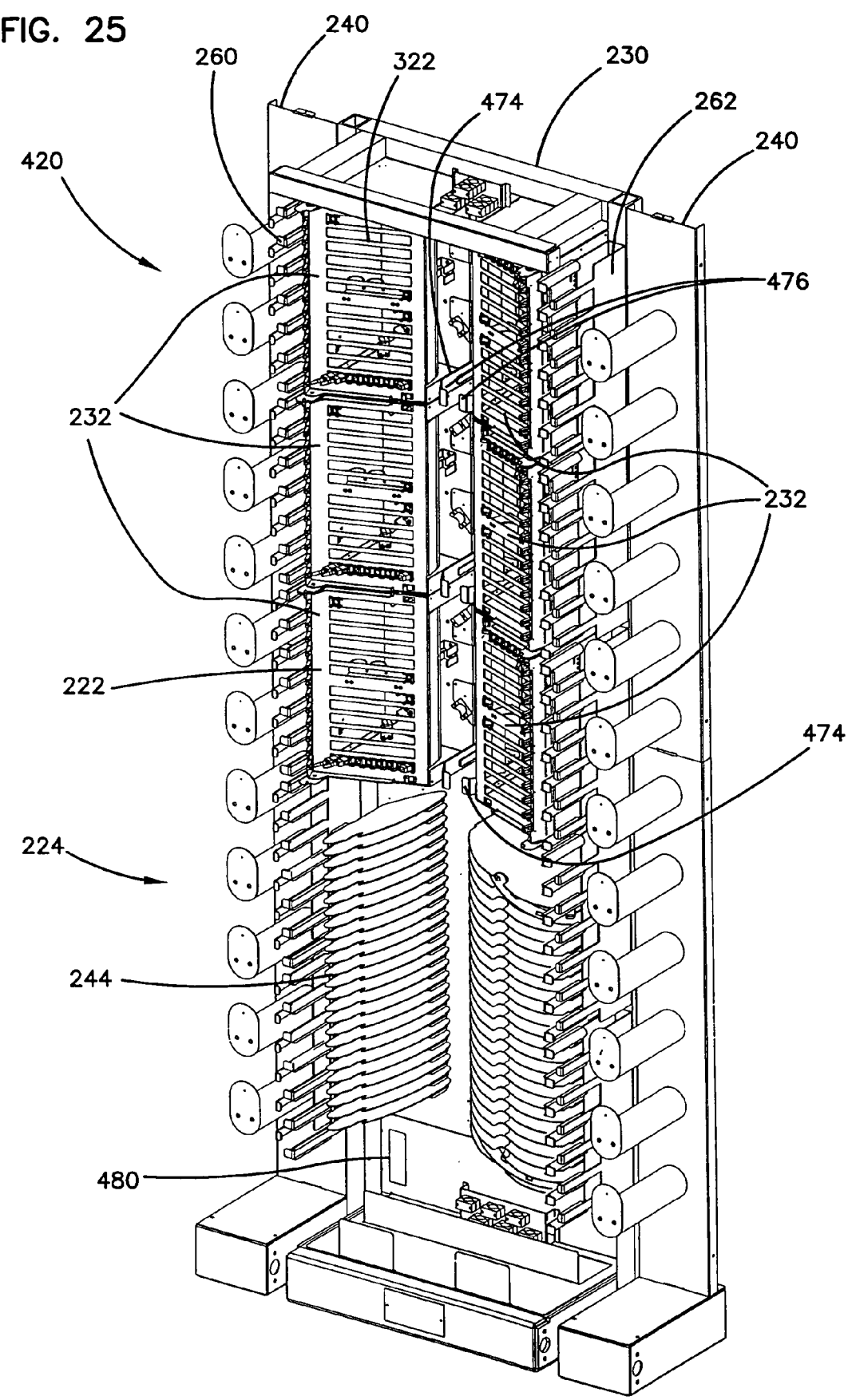
FIG. 25 is a front, top and right side perspective view of a third embodiment of a fiber distribution frame according to the present invention.
Figure 26:
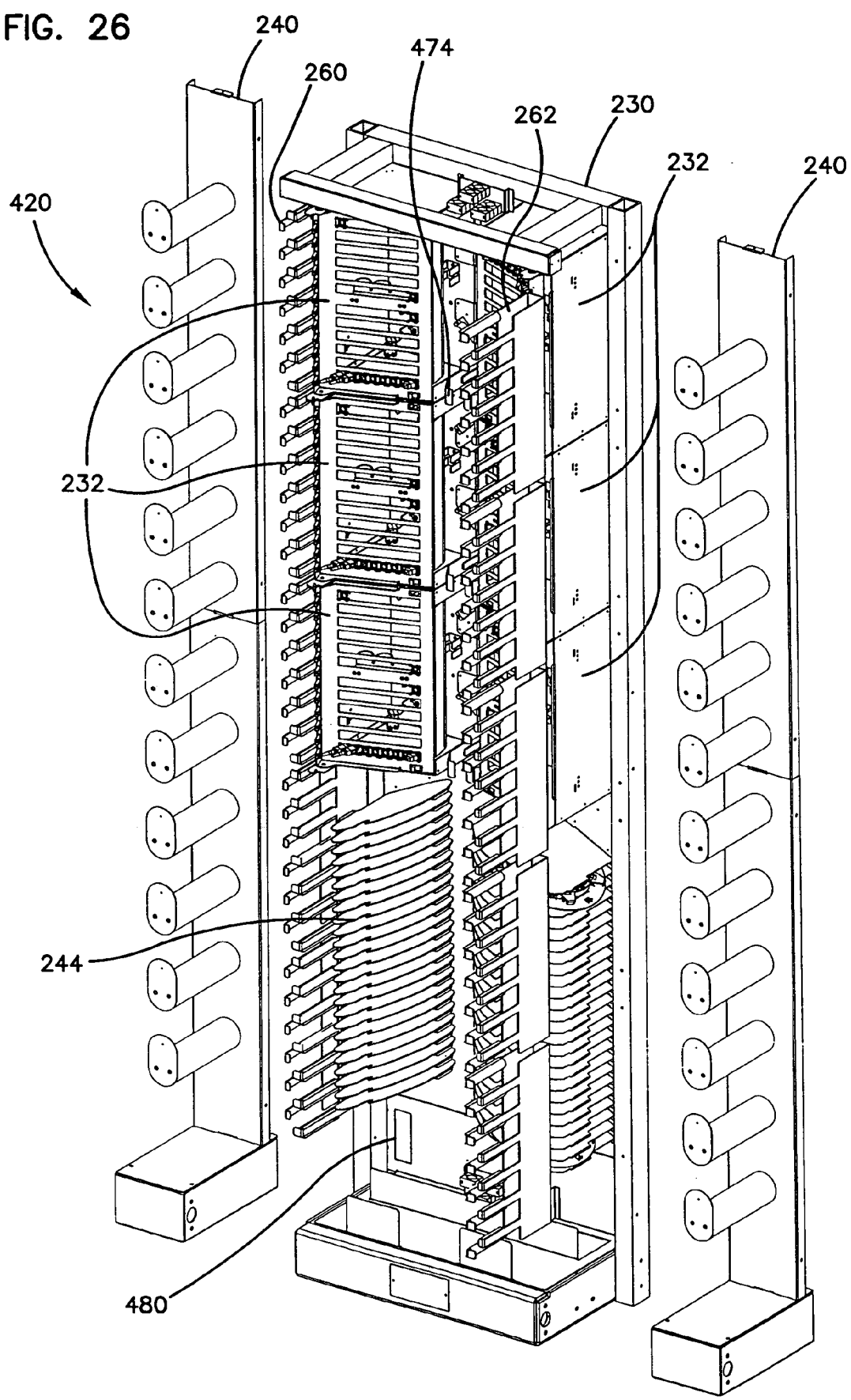
FIG. 26 is a front, top and right side perspective view of the frame of FIG. 25, showing features in exploded view.
Figure 29:
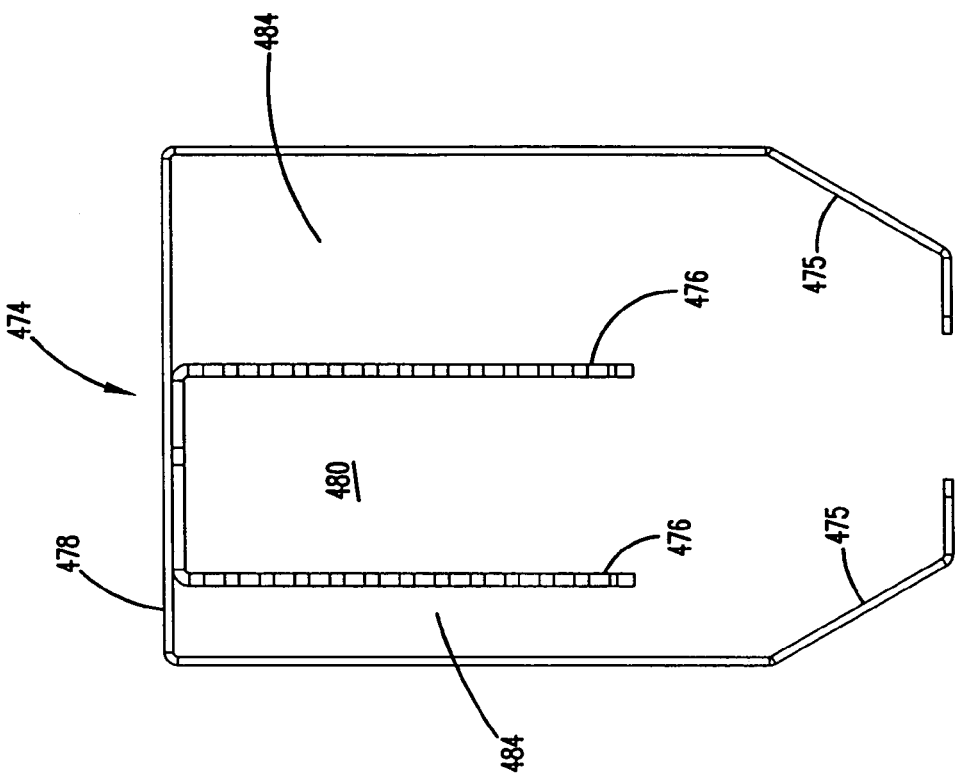
FIG. 29 is a top view of the cable ring of FIG. 28.
Figure 28:
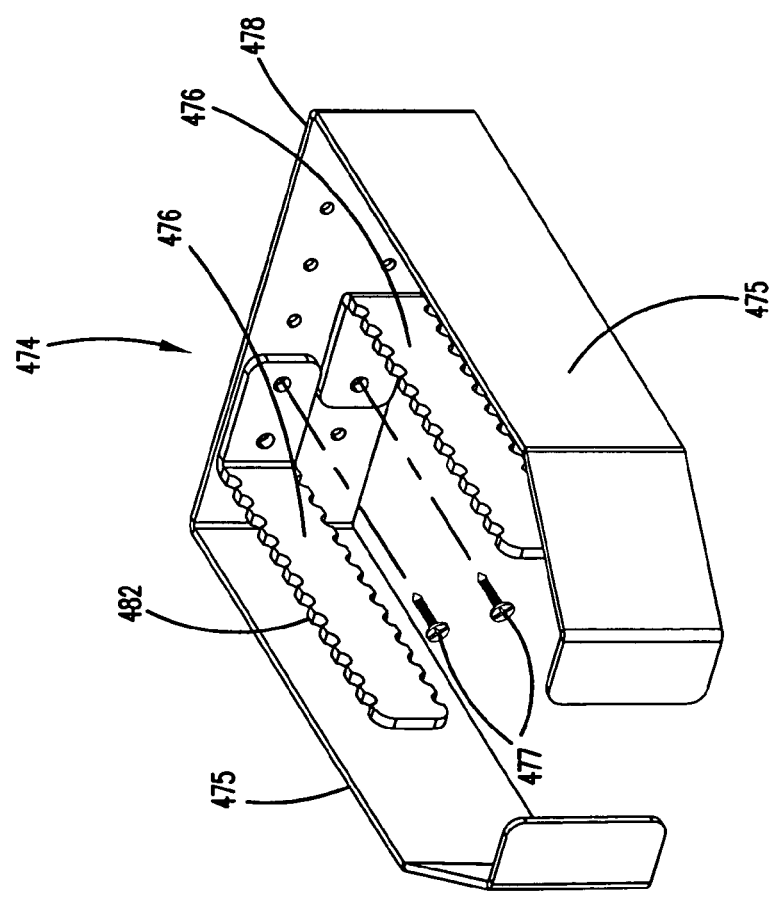
FIG. 28 is a perspective view of an upper cable ring from the frame of FIGS. 25–27.

Referring now to FIGS. 25 and 26, a frame 420 is shown which is similar to frame 220 for the features of the rack 230, termination modules 232, splice tray assembly 244, cable management panels 240, and guides 260, 262. Frame 420 includes adjustable cable rings 474 in termination area 222. Ring 474 includes outer arms 475 and inner moveable arms 476. The location and spacing of arms 476 can be selected depending on the location and amount of cable to be held by rings 474. A cable ring 474 is shown in greater detail in FIGS. 28 and 29. For example, separate space is useful for top entering cables which first extend to splice area 244, and for further cables extending up from splice area 244 to termination modules 232. Inner arms 476 are held by fasteners 477 to a connecting section 478 of outer arms 475. Inner arms 476 define an inner chamber 480 for cables entering frame 420. The serrations 482 can be used to secure an o-ring or other tie to secure the cables in chamber 480. Outside of chamber 480 in area 484, other cables can be positioned, such as cables from the splice area 244 extending to the termination area 224. Also, frame 420 includes a lower opening 480 so as to allow cables to pass to a rear side of frame 420, for passing the cable to a second frame mounted back-to-back with frame 420, or to connect to other telecommunications equipment.

Frame 520 of FIG. 27, noted above, includes splice tray assembly 244 mounted in an inverse position so that the dividers 292 angle downwardly in a direction toward the center of frame 520. The arrangement of FIG. 27 is useful for managing cables entering from bottom 528 which are terminated at splice tray assembly 244. To increase manufacturing efficiencies, assembly 244 is identical in frames 420, 520 but selectively mounted in the desired orientation.

Referring now to FIGS. 30–37, a fourth preferred embodiment of a frame 620 is shown for splicing, terminating, and managing fiber optic cables within the frame. An upper portion 622 of frame 620 defines a termination area. A lower portion 624 of frame 620 defines a splice area, as for example described above for the embodiments shown in FIGS. 1–29. Cables containing one or more individual optical fibers enter frame 620 typically from an overhead cable environment through a top 626 of frame 620, or from a raised floor environment at a bottom 628 of frame 620. If the cables are pre-terminated, the cables extend directly to termination area 622. If the cables entering frame 620 are not pre-terminated, the cables extend to splice area 624 for splicing to terminated cables.

Figure 30:
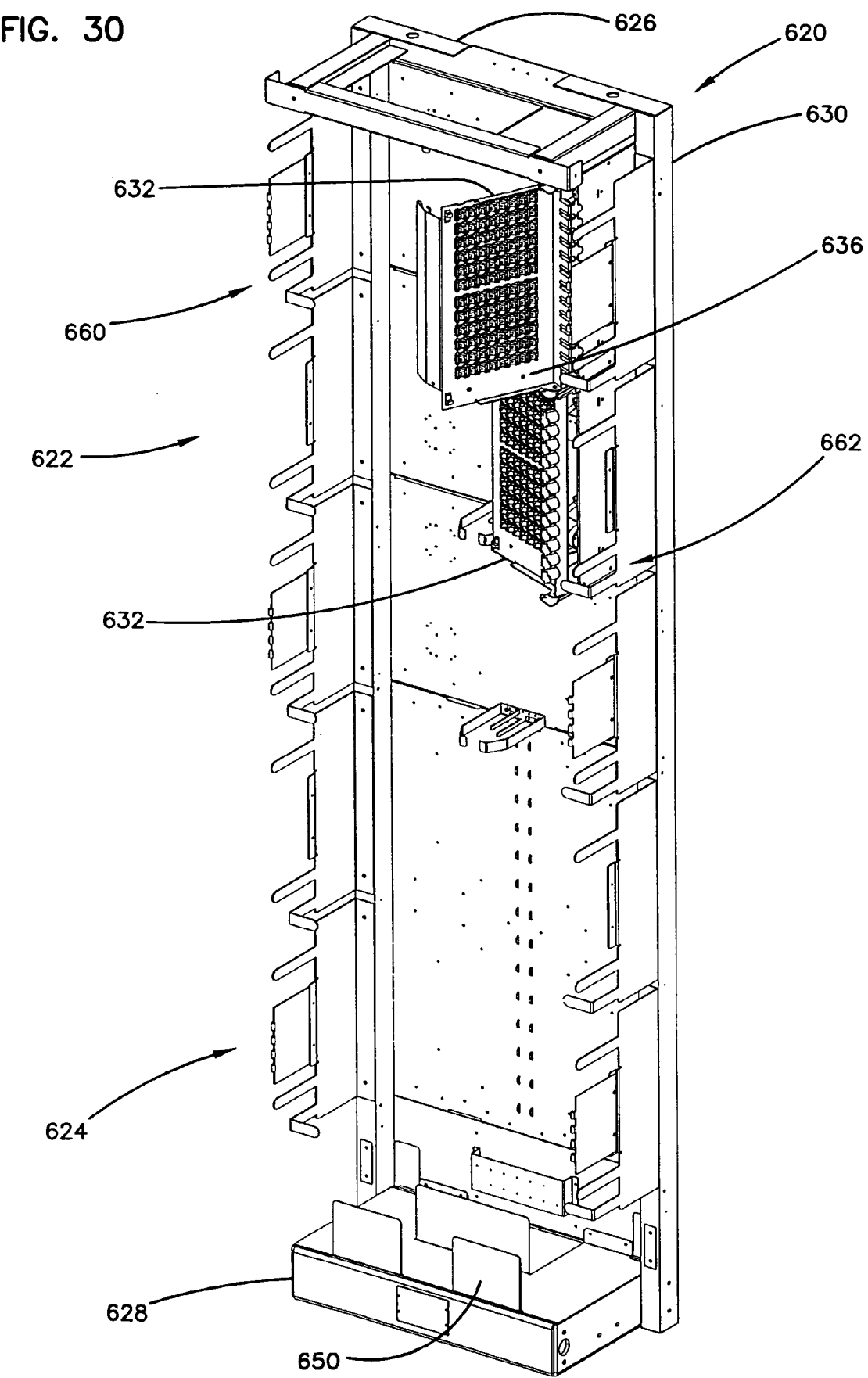
FIG. 30 is a front, top and right side perspective view of a fourth embodiment of a fiber distribution frame according to the present invention, with portions of the frame removed, and with one of the panels in a pivoted open position.
Figure 31:
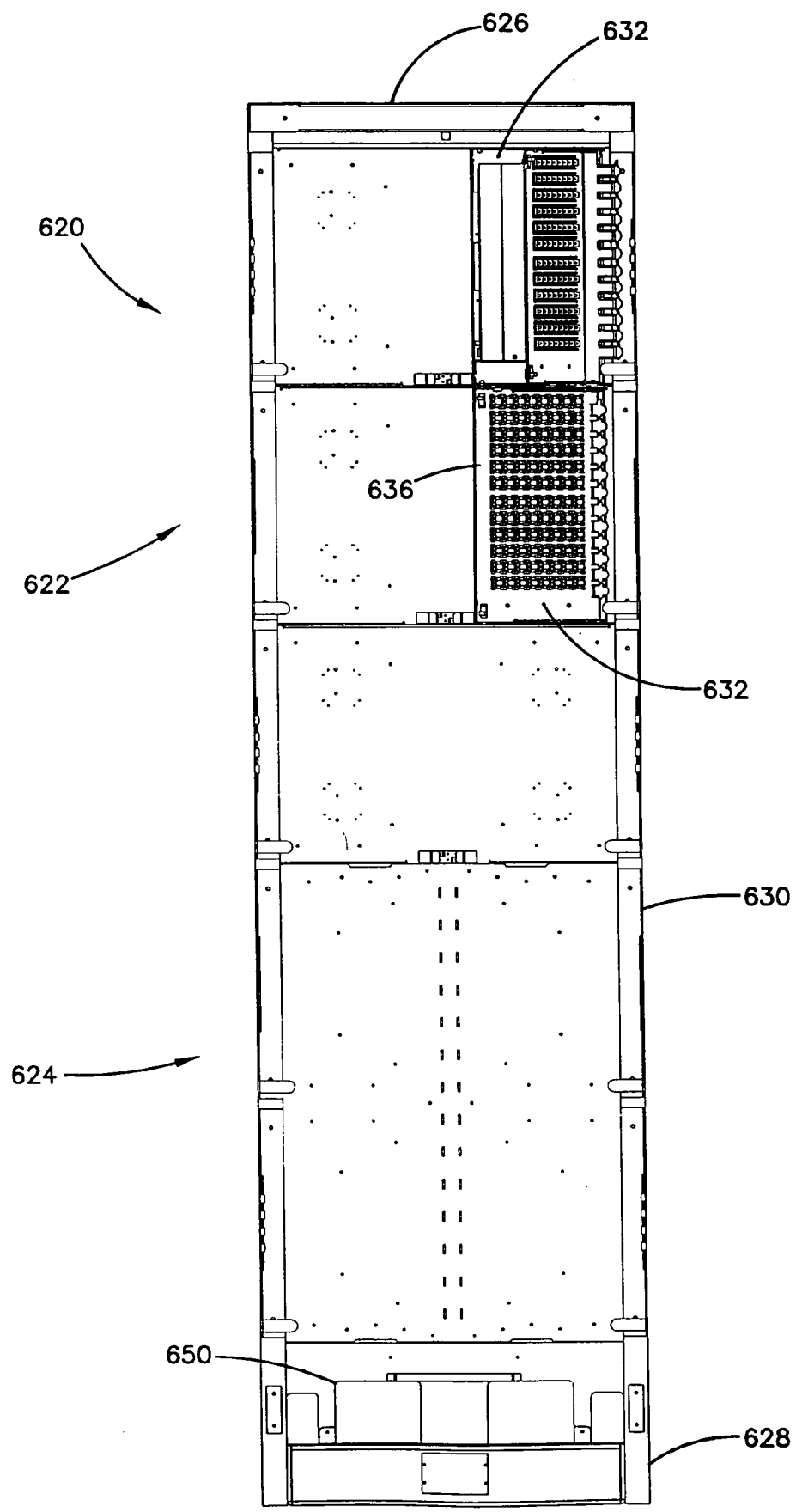
FIG. 31 is a front view of the frame of FIG. 30.
Figure 32:
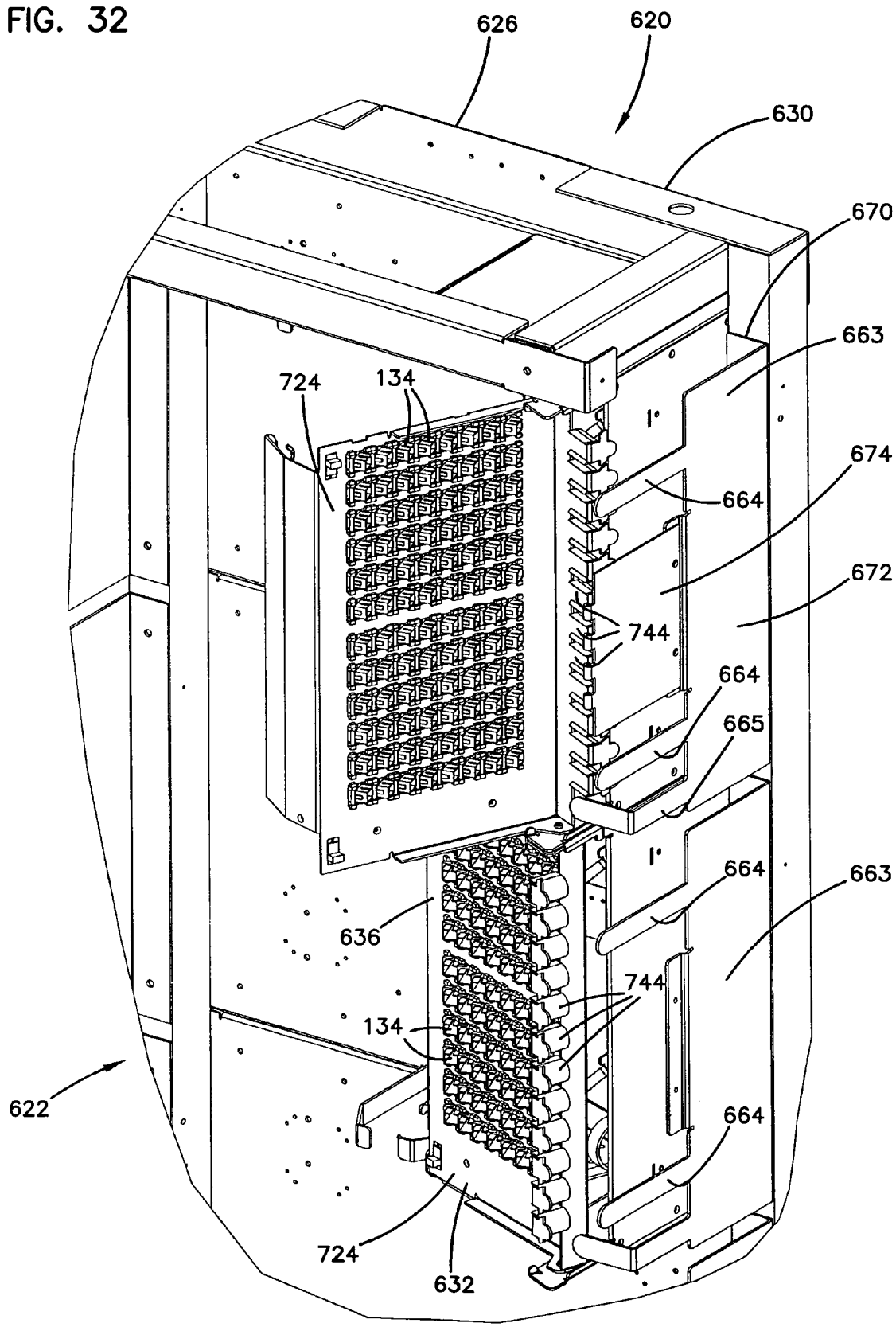
FIG. 32 is a front, top and right side perspective view of an upper portion of the frame of FIG. 30.
Figure 33:
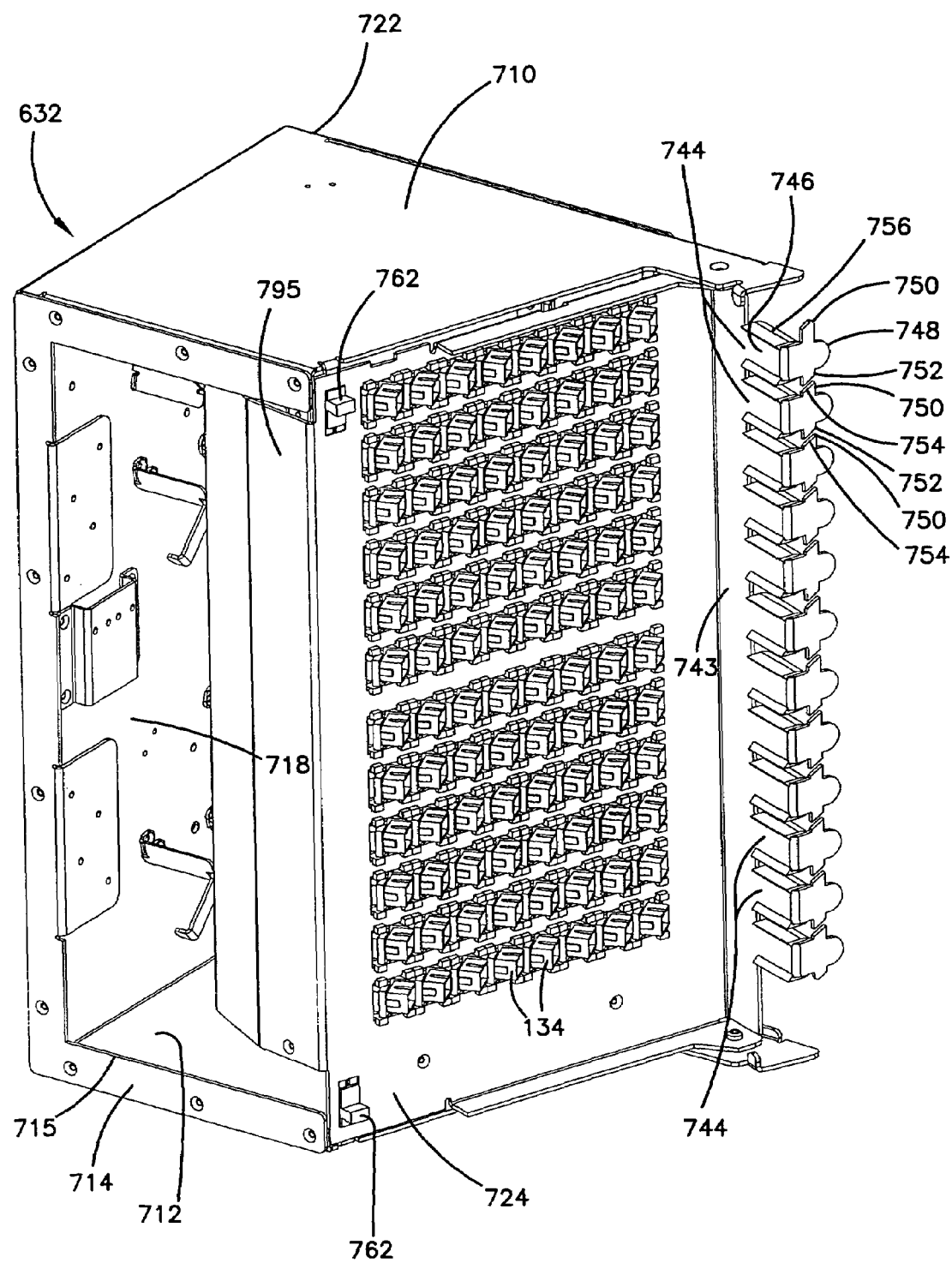
FIG. 33 is a front, top and left side perspective view of one of the termination modules in the frame of FIG. 30.

Frame 620 includes a rack 630 which supports a plurality of termination modules 632. In the illustrated embodiment, left and right arrays of termination modules 632 are provided. In FIGS. 30–32, only the right array 636 is shown. Each array in the illustrated embodiment includes three individual termination modules 632b (only 2 are shown).

Frame 620 is used to cross-connect telecommunications equipment through the termination locations provided by the frame. Frame 620 also includes a cable management panel (not shown), as described above, and a horizontal cable tray 650 positioned below splice area 624.

Rack 630 further supports two vertical cable guides 660, 662, one on each side of rack 630, for use in managing and protecting patch cables adjacent to a front of frame 620. Cable guides 660, 662 include a plurality of fingers 664, including one angled finger 665. Each of cable guides 660, 662 is preferably made in segments 663, as part of the modular design of frame 620. Each segment 663 includes a base section 670, a side section 672, and a hinge 674 for hingedly mounting front doors (not shown) to rack 630. Fingers 664, 665 all extend from side section 672.

As above with respect to frames 20, 220, components making up frame 620 are preferably separate components held together by fasteners, to aid in assembly, and versatility in use. In the illustrated embodiment, termination modules 632, and cable guides 660, 662 are separate from rack 630.

Referring now to FIGS. 33–36, each termination module 632 includes a top 710, a bottom 712, opposed sides 714, 716, and a rear 718. Side 714 defines a side opening 715 bounded on three sides. Side opening 715 permits cable access to an interior of module 632. The illustrated module in FIGS. 33–37 is from right array 636. As opposed to the termination modules 232a, 232b noted above, termination module 632 from right array 636 is not identical to the termination modules for use in the left array, as will be seen from the following discussion.

Each termination module 632 defines an open front 720 preferably closed off by door or main panel 724 which is hingedly mounted to main housing 722, in a similar manner as module 232 noted above. Main panel 724 is constructed in a similar manner as main panel 324 noted above with respect to the mounting of adapters 134. The main panels 724 are shown fully loaded with adapters 134.

Instead of clips 344 as noted above for main panel 324, main panel 724 includes a plurality of guides or extensions 744, one adjacent to each row of adapters 134. Guides 744 extend from side panel 743. Guides 744 rotate with main panel 724 and side panel 743. Each guide 744 holds the cables from each connector 142a disposed in each row. From guides 744, the cables extend through a side access of the closest vertical cable guide 660, 662. Guides 744 help retain and protect the cables as main panel 724 is rotated. Without guides 744, rotation of main panel 724 may excessively pull or push on the portions of the cables positioned within vertical cable guides 660, 662.

Guides 744 are preferably formed as extensions of planar side panel 743. Sheet metal is a convenient material for making main panel 724 and side panel 743, as well as guides 744. Each guide 744 includes a main extension 746, with an angled tab 748, angled toward the respective vertical cable guide 660, 662. Extending vertically on opposite sides of tab 748 are first and second fingers 750, 752. A slot 754 is formed between one finger 750, 752 of one guide 744 and an opposite finger 752, 750 of an adjacent guide 744 above or below the respective guide. Slot 754 is sized for receipt of cables, such as during installation or removal of the cables. Preferably, slot 754 is at an angle to the horizontal, to help limit each cable from falling out of guides 744 during movement of other cables, or movement of main panel 724. An edge protector 756 is snapped over main extension 746 to protect the cables from possible damage from the sharper edges of main extension 746, such as occurs if sheet metal is used.

Like main panel 324 noted above, main panel 724 is hingedly mounted top 710 and bottom 712 of termination module 632. Further, main panel 724 is disposed at an angle to a vertical plane extending parallel to a front and a rear of frame 620. Further, main panel 724 includes the use of angled retainers 362 as noted above. To maintain main panel 724 in the closed position, two vertically operated latches 762 are provided, similar to the latches noted above which operate horizontally.

Figure 34:
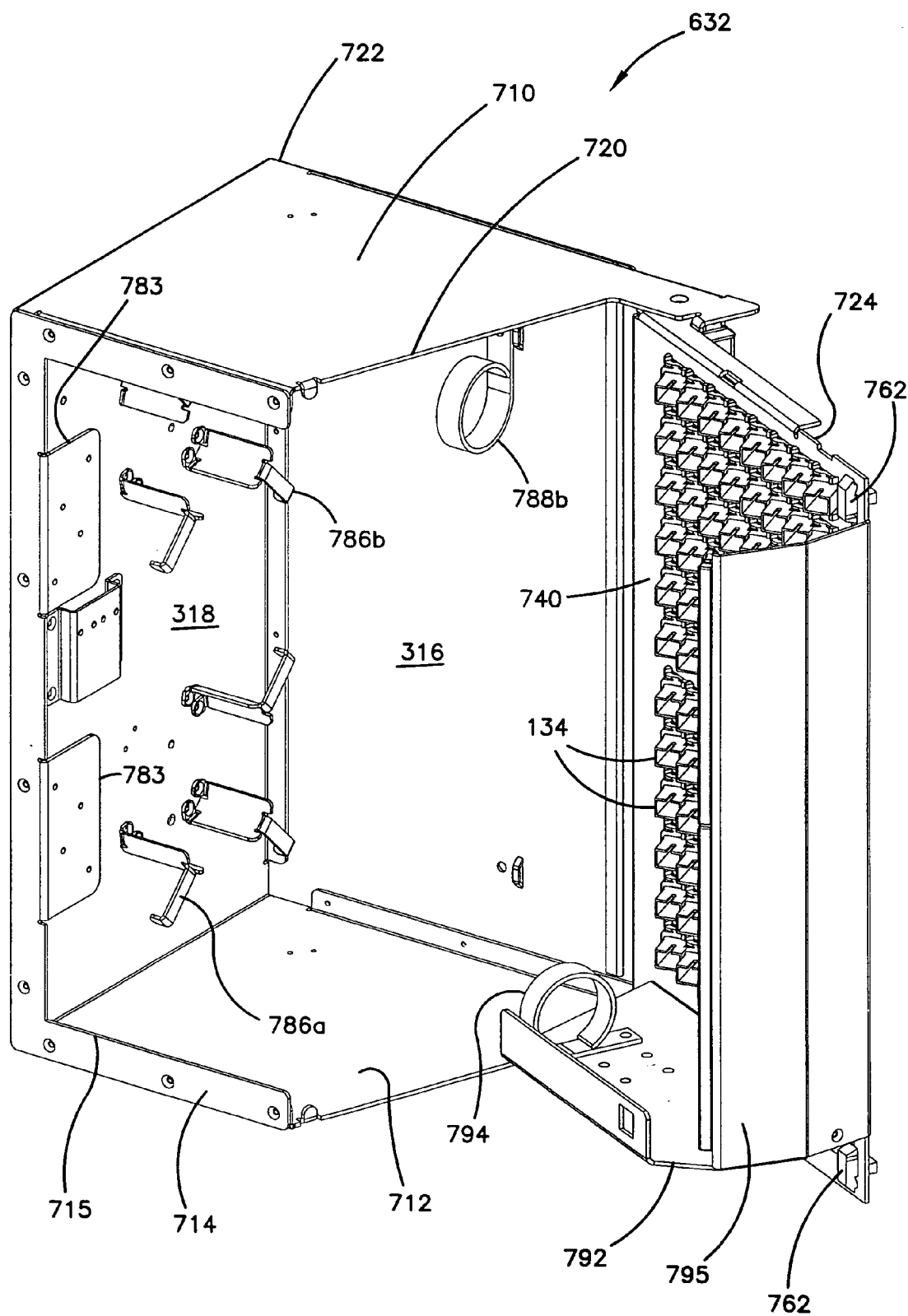
FIG. 34 is a front, top and left side perspective view of the termination module of FIG. 33, shown with the main panel pivoted to the open position.
Figure 35:
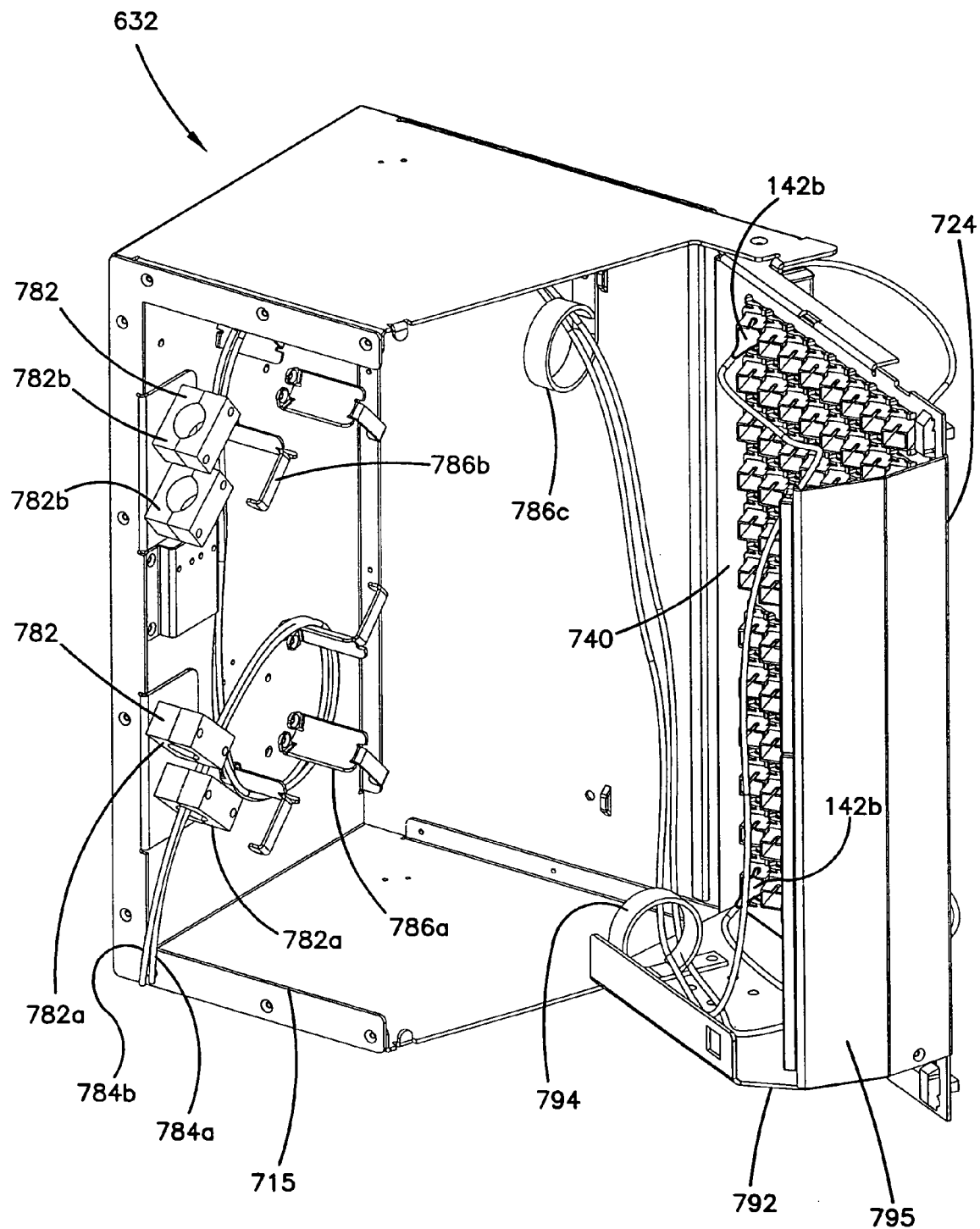
FIG. 35 is a front, top and left side perspective view of the termination module of FIG. 34, with the main panel in the open position, showing exemplary cable pathways.
Figure 36:
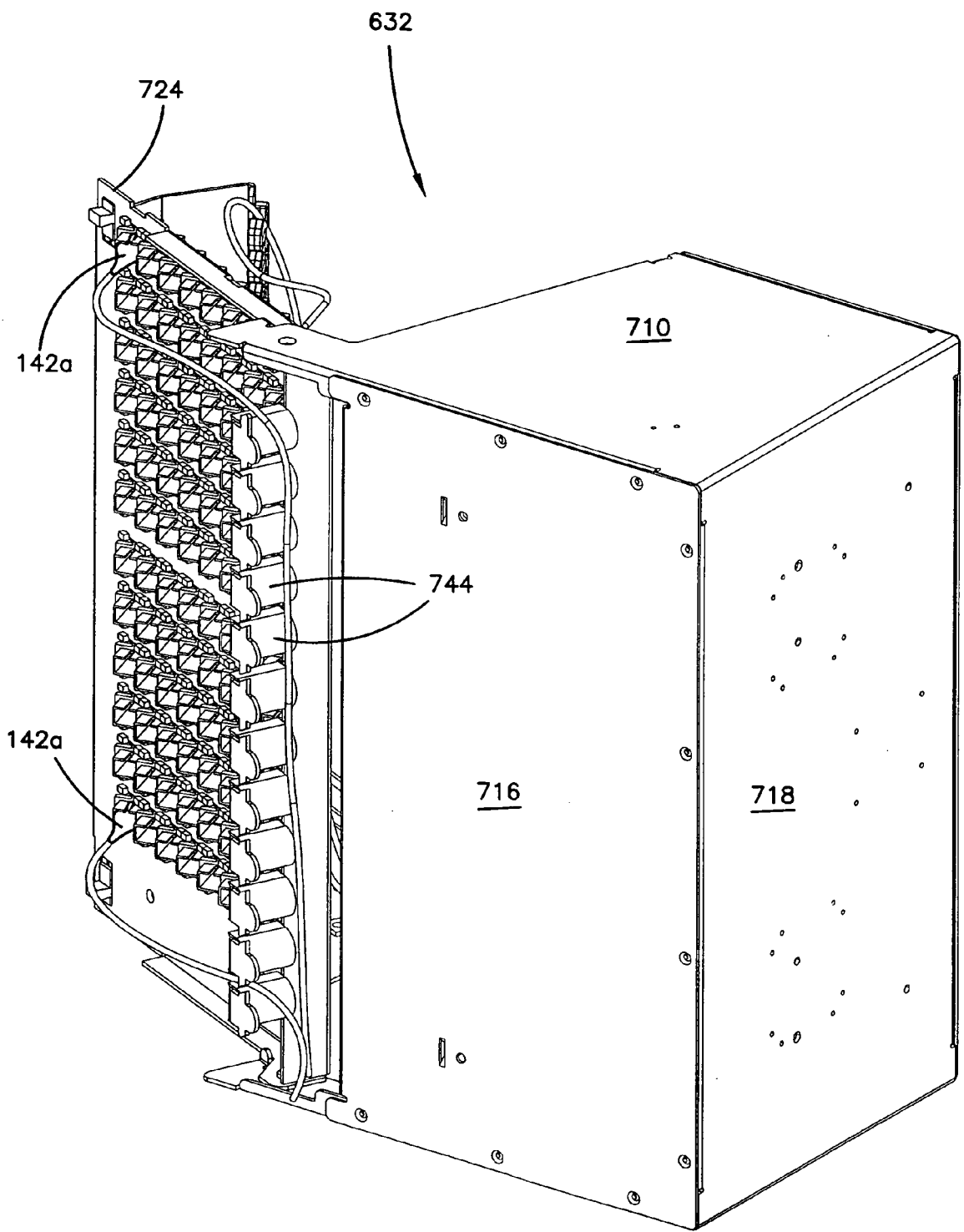
FIG. 36 is a front, top and right side perspective view of the termination module shown in FIG. 35 with the exemplary cable pathways.

Referring now to FIGS. 34 and 35, internal cable management features are provided within termination module 632. Cable clamps 782 securely hold the cable or cables entering termination module 632 at side opening 715 through side 714. Lower clamps 782a are used for cables entering termination module 632 from below. Upper clamps 782b are used for cables entering termination module 632 from above. Preferably, all of clamps 782 are positioned at an angle. Clamps 782 are preferably positioned on mounting flanges 783. From clamp 782, the individual fibers are routed through various cable guides 786 including tabs, spools, clips, or rings. A tie bracket can be utilized with or instead of the clamps to tie down cable entering termination module 632. On rear 740 of main panel 724, a rear tray 792 is positioned along a lower edge of main panel 724 projecting horizontally and rearwardly. Rear tray 792 includes one or more horizontal cable rings 794. A vertical lip 795 extends rearwardly from the free edge of main panel 724 to protect the cables and the connectors.

As shown in FIG. 35, example cables (fibers) enter termination module 632 through side opening 715. Clamp 782 holds example first and second fibers 784a, 784b. Both fibers extend around lower spool or guide 786a to an upper spool or guide 786b through an upper ring 786c, and through horizontal ring 794 to one of the connection locations on main panel 724.

Figure 37:
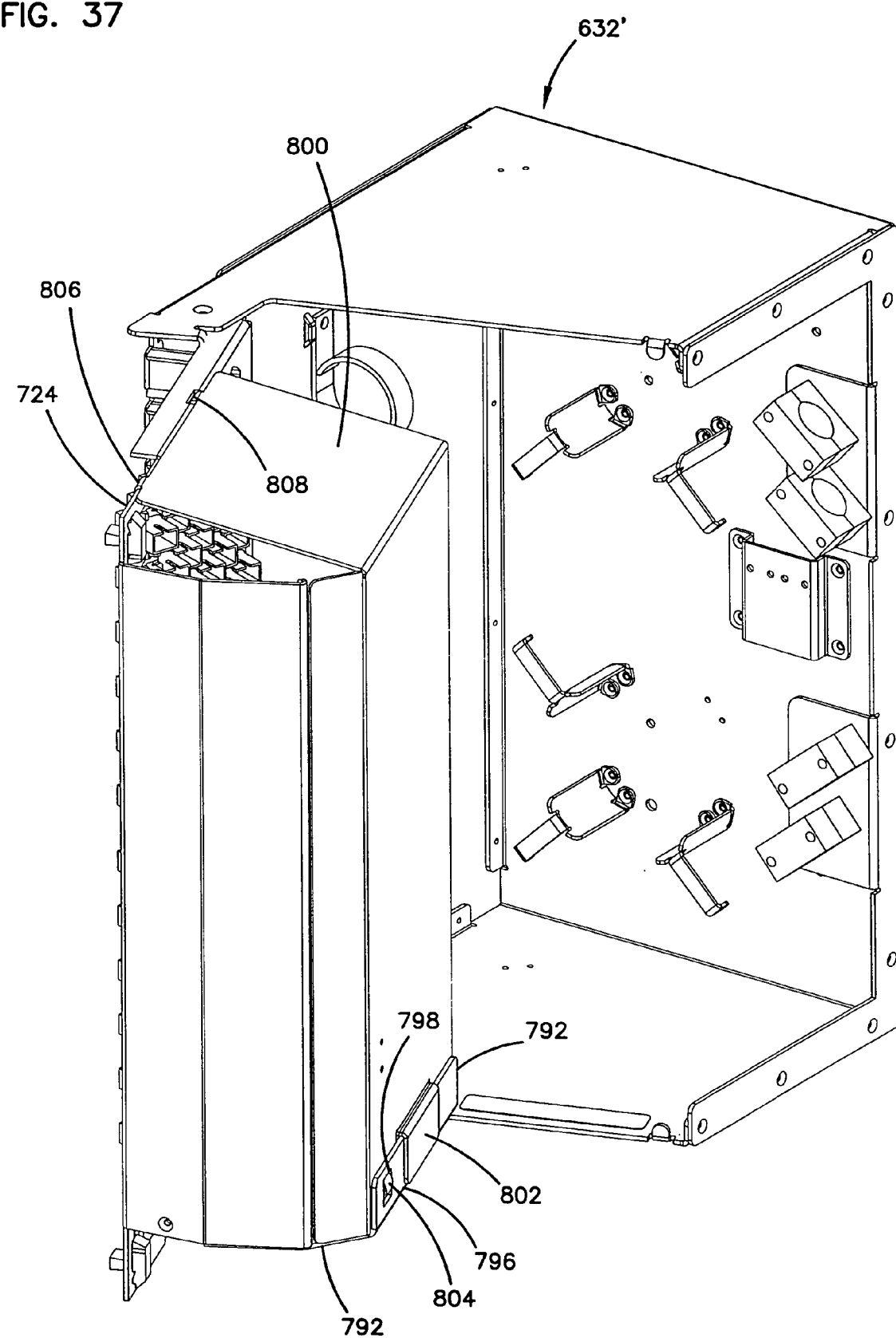
FIG. 37 is a front, top and right side perspective view of a termination module like the view of FIG. 35, and showing a protective cable cover mounted to the main panel; the termination module of FIG. 37 configured and arranged for the left side of the frame of FIG. 30.

Referring now to FIG. 37, a rear cover 800 is supplied for protecting the cables adjacent to the connection locations on a rear side of main panel 724. In FIG. 37, a termination module 632' from the left array of frame 620 is shown. The module 632' of FIG. 37 is a mirror image of the module 632 of FIG. 34. Cover 800 mounts to rear tray 792 w/with a tab 802 over lip 796 of tray 792. A leaf spring 804 fits into notch 798. Two top tabs 806, 808 engage a top of panel 724 to further secure cover 800.

Referring now to FIGS. 38–58, a fifth preferred embodiment of a frame 920 is shown for managing fiber optic cables within the frame. Frame 920 can be used with splice tray assemblies 44, 224, and termination modules 32, 232, 632, with hinged doors as noted above. Frame 920 includes termination modules 940 which provide the termination function as for modules 32, 232, 632, and further include couplers used for monitoring and/or testing fiber optic signal transmission. In the illustrated example, an upper portion 922 of frame 920 defines a termination area. A lower portion 924 of frame 920 defines a secondary area, such as for splicing as described above for the embodiments of FIGS. 1–37. Alternatively, the secondary area can include additional termination areas by populating frame 920 with similar terminations as in upper portion 922. Still further, lower portion 924 can provide cable storage locations, such as including spools.

Cables containing one or more individual optical fibers enter frame 920 typically from an overhead cable environment through a top 926 of frame 920, or from a raised floor environment at a bottom 928 of frame 920. If the cables are pre-terminated, the cables extend directly to termination area 922 and into central cable passageway 970. If the cables entering frame 920 are not pre-terminated, the cables extend to lower portion 924 for splicing to terminated cables and then through passage 979 to termination area 922. Cables in central passageway 970 enter the termination modules 940 through side access openings as will be described below.

Frame 920 includes a rack 930 which supports a plurality of termination modules 940 along right side 934. Along left side 932 of frame 920 are termination modules 632, as described above for the embodiment of FIGS. 30–37. If desired, one or more termination modules 940 can also populate left side 932.

Frame 920 is used to cross-connect telecommunications equipment through the termination locations provided by the frame. Frame 920 is also used to monitor, test or provide other functions with respect to the signals passing through termination modules 940, such as splitting, combining, etc. Frame 920 may also include a cable management panel (not shown) as described above along the right or left sides, and a horizontal cable tray 950 at or below lower portion 924.

Rack 930 further supports two vertical cable guides 960, 962 similar to guides 660, 662 noted above, for use in managing and protecting patch cables adjacent to a front of frame 920.

As above with respect to frames 20, 220, 420, 620, components making up frame 920 are preferably separate components held together by fasteners, to aid in assembly, and versatility in use. In the illustrated embodiment, termination modules 632, 940 and cable guides 960, 962 are separate from rack 930. Modules 632, 940 mount to rear panel 942 of rack 930.

Referring now to FIGS. 41–49, each termination module 940 includes a top 1010, a bottom 1012, opposed sides 1014, 1016, and a rear 1018. Side 1014 defines a side opening 1015 bounded on four sides. Side opening 1015 permits cable access and user access to an interior of termination module 940 from central passageway 970. The illustrated module in FIGS. 41–49 is from the right array 936. Termination module 940 can be flipped so as to create a left array, somewhat similar to termination modules 232a, 232b noted above. Alternatively, right and left modules can be designed for use on only one side, as for modules 632.

Figure 38:
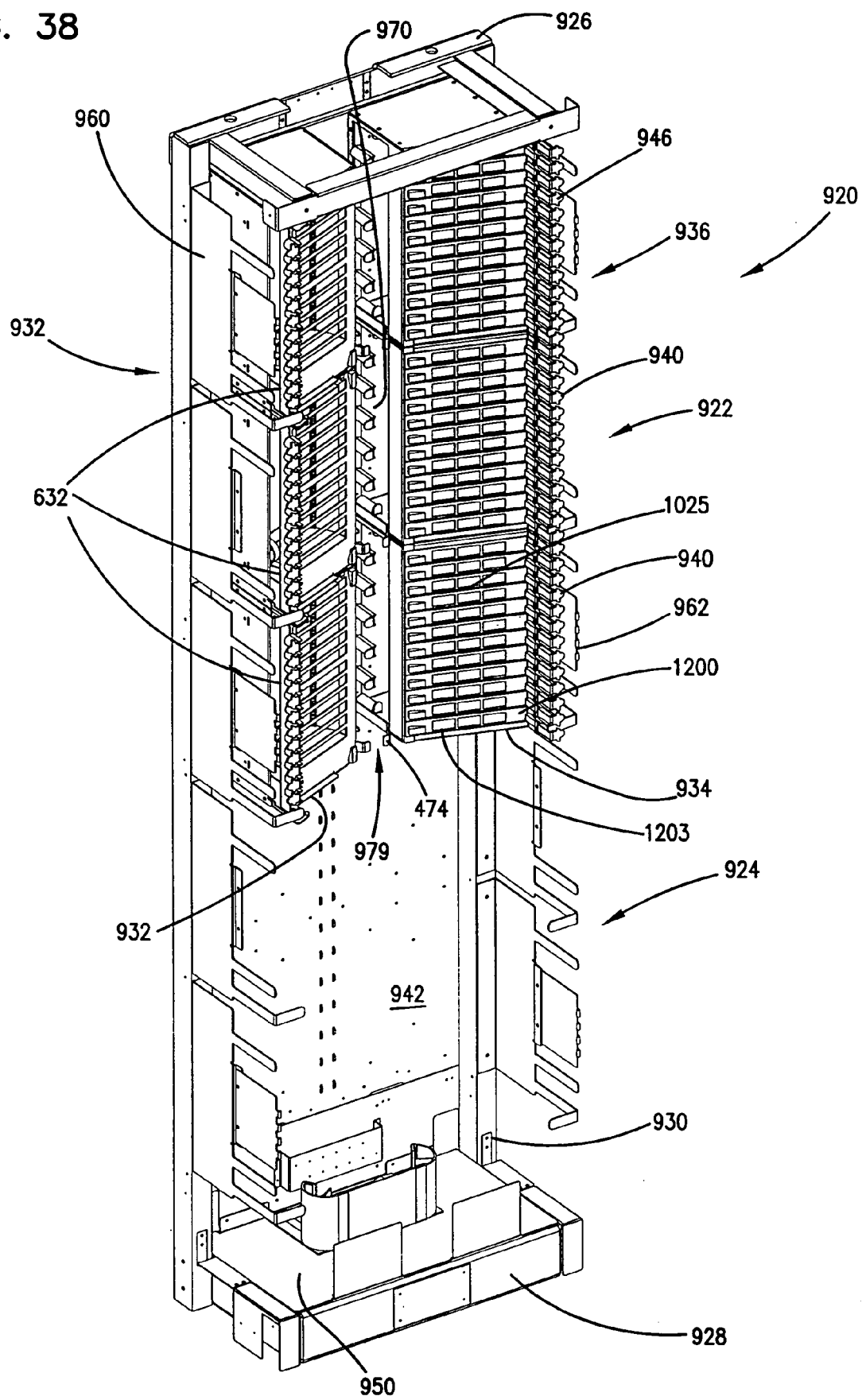
FIG. 38 is a front, top and left side perspective view of a fifth embodiment of a fiber distribution frame according to the present invention, with the termination locations not shown, and with a lower portion of the frame shown with the cable management structure removed.
Figure 39:
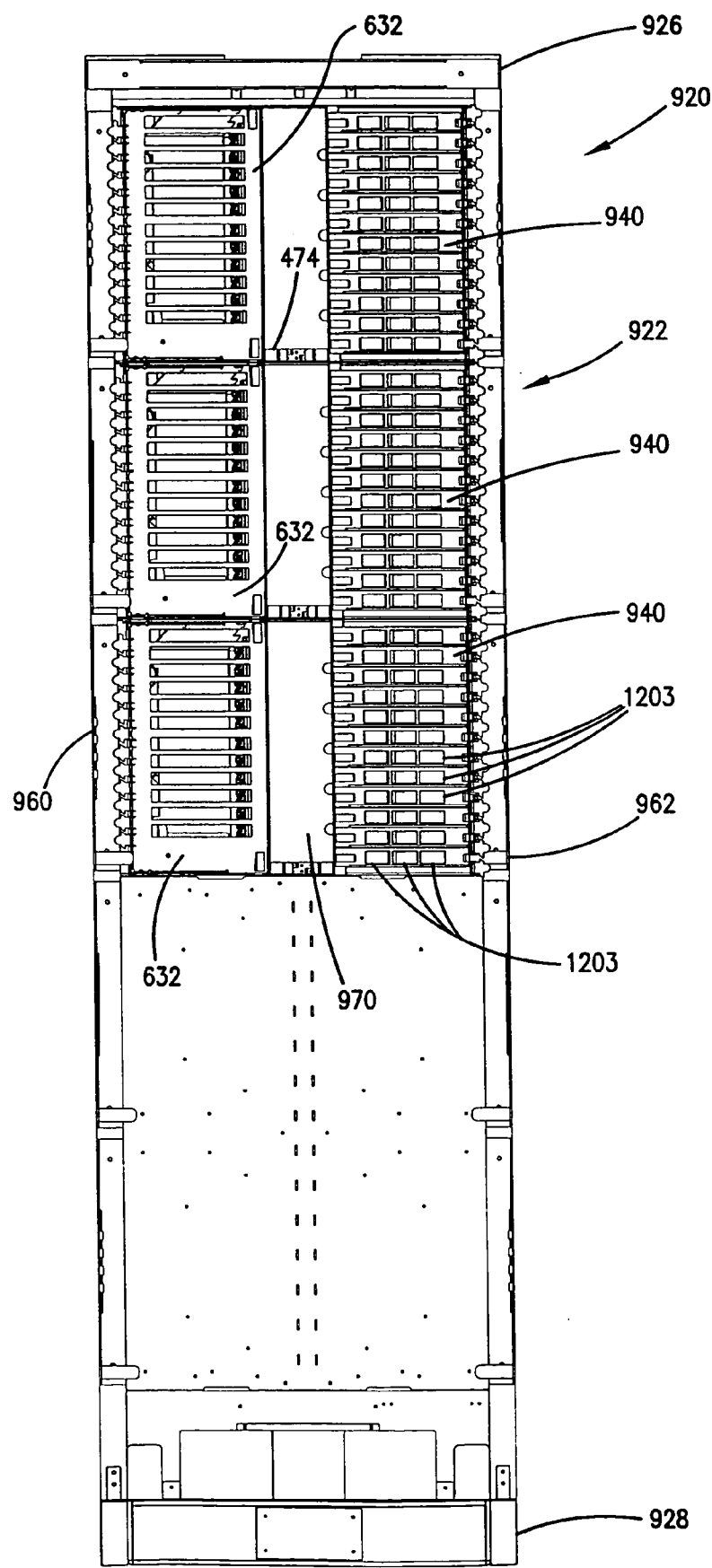
FIG. 39 is a front view of the frame of FIG. 38.
Figure 40:
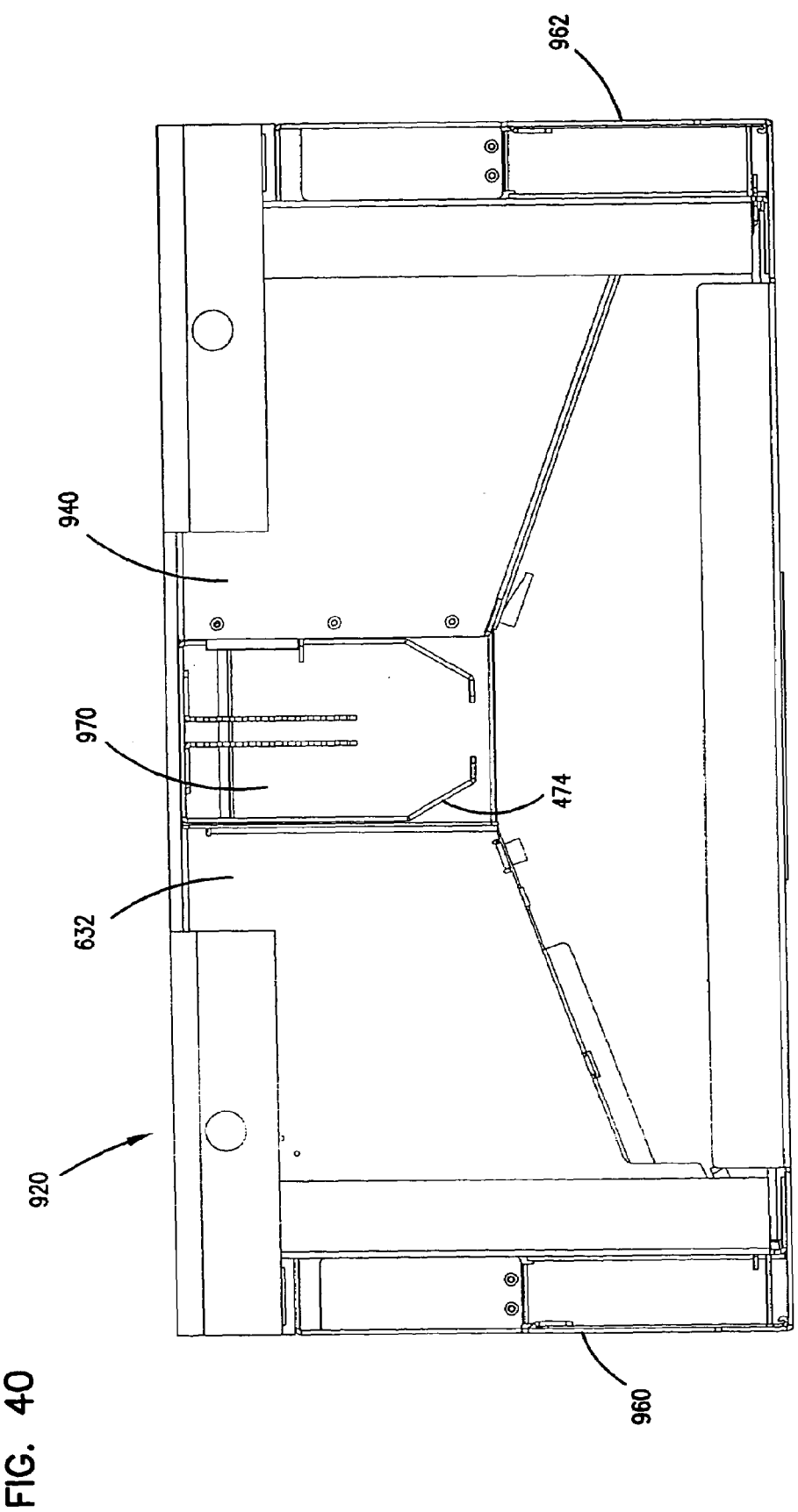
FIG. 40 is a top view of the frame of FIG. 38.
Figure 41:
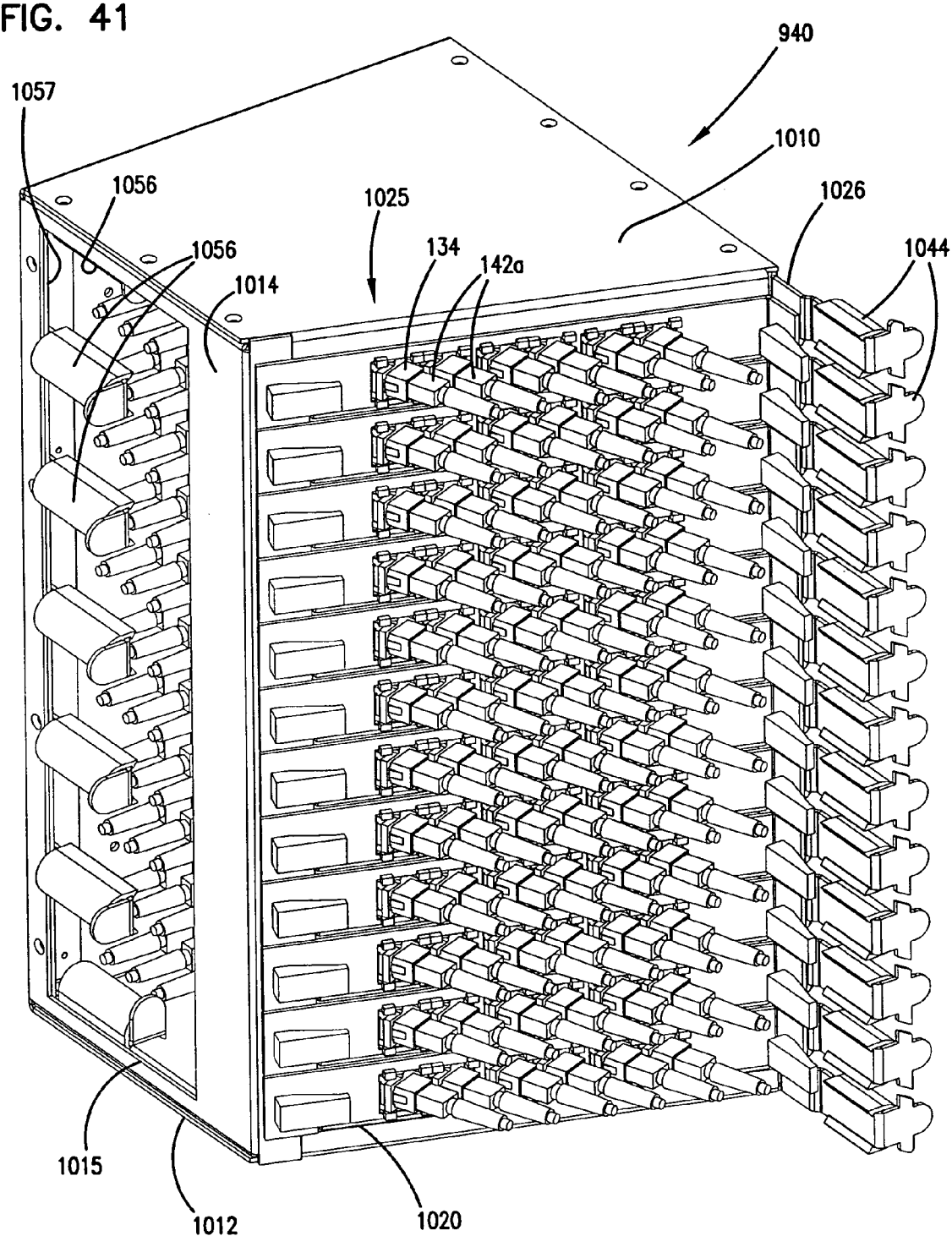
FIG. 41 is a front, top and left side perspective view of one of the termination modules from the right side of the frame of FIG. 38 for holding connector modules.
Figure 42:
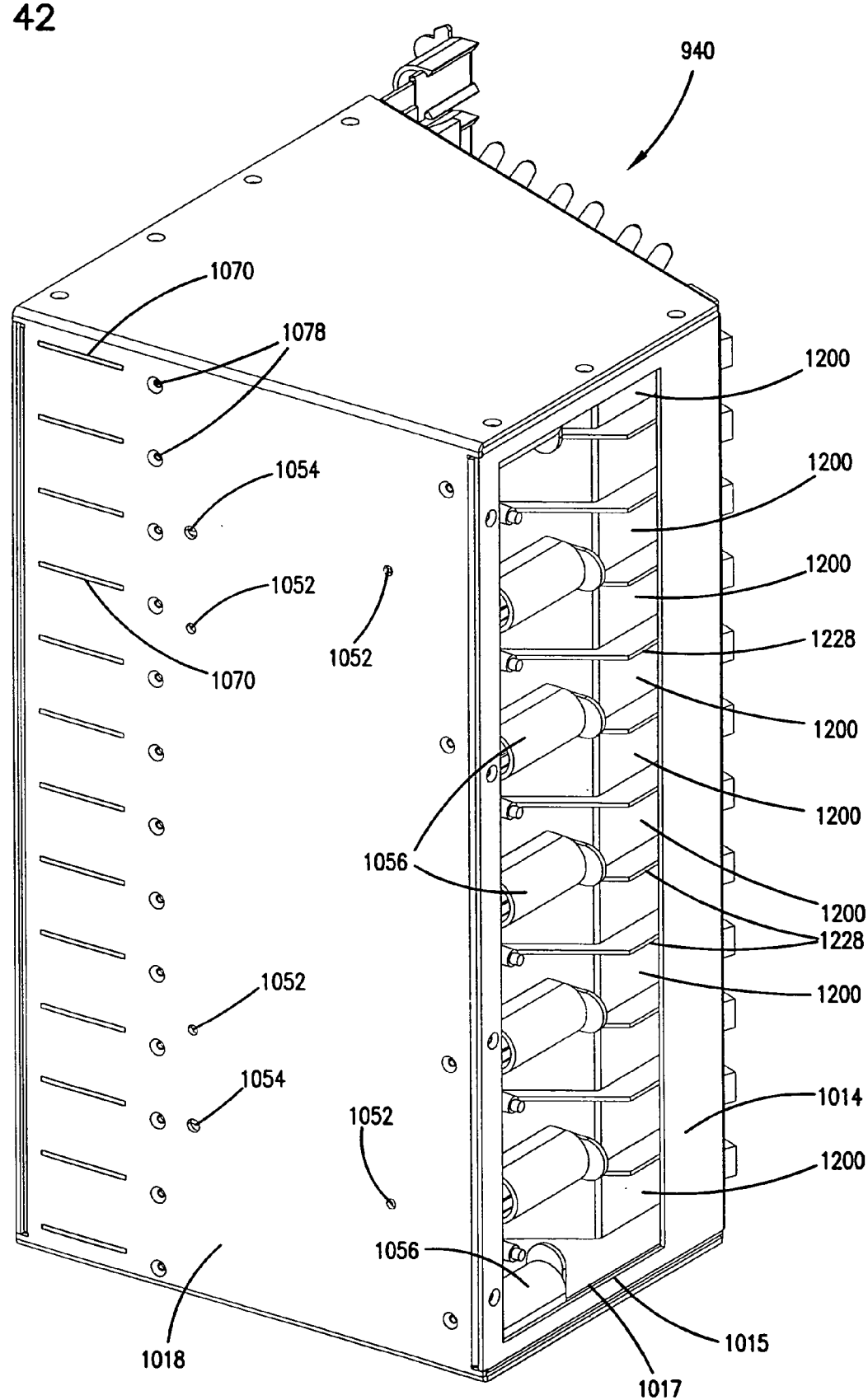
FIG. 42 is a rear, top and left side perspective view of the termination module of FIG. 41.
Figure 43:
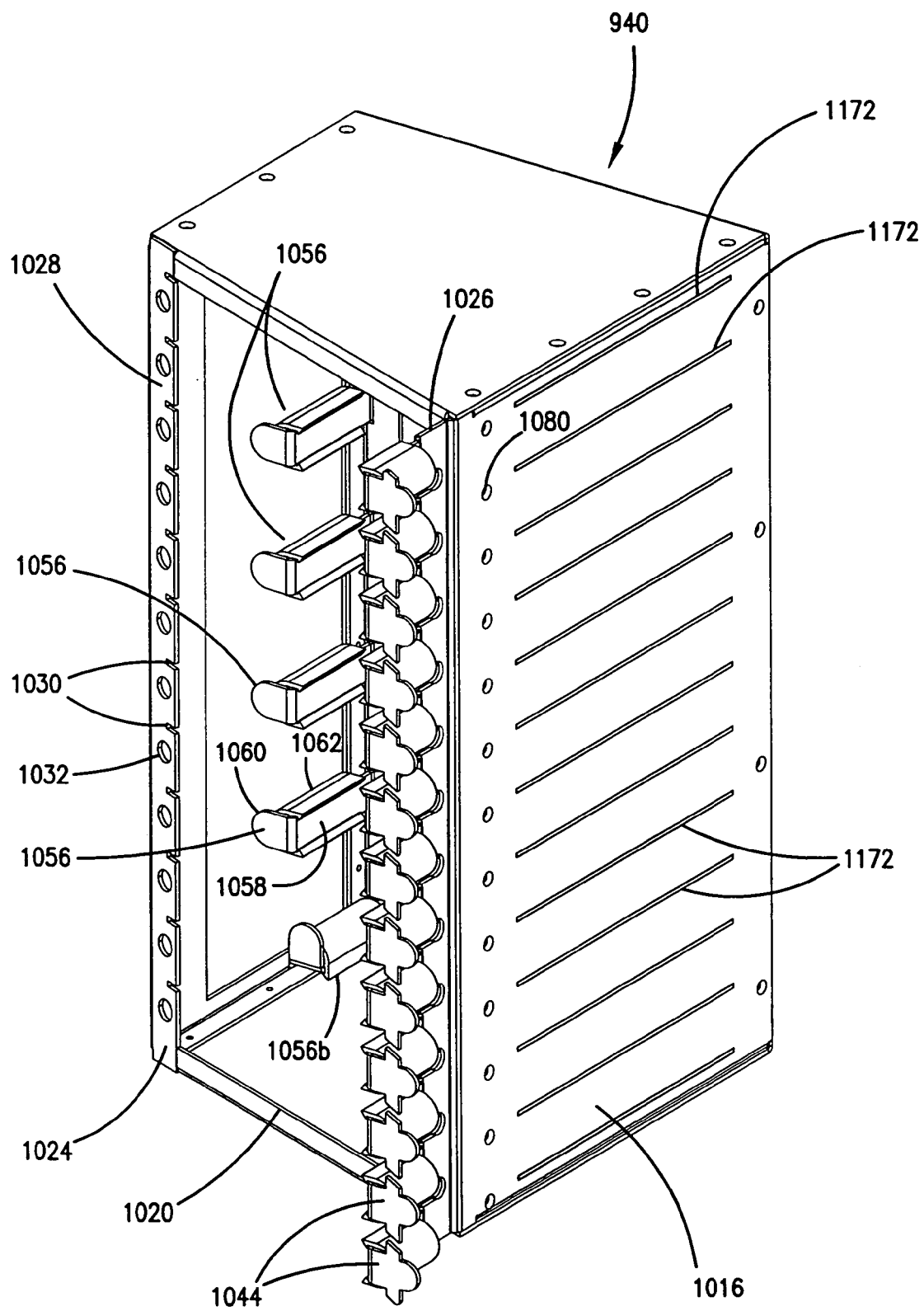
FIG. 43 is a front, top and right side perspective view of the termination module of FIG. 41, shown without the connector modules.
Figure 44:
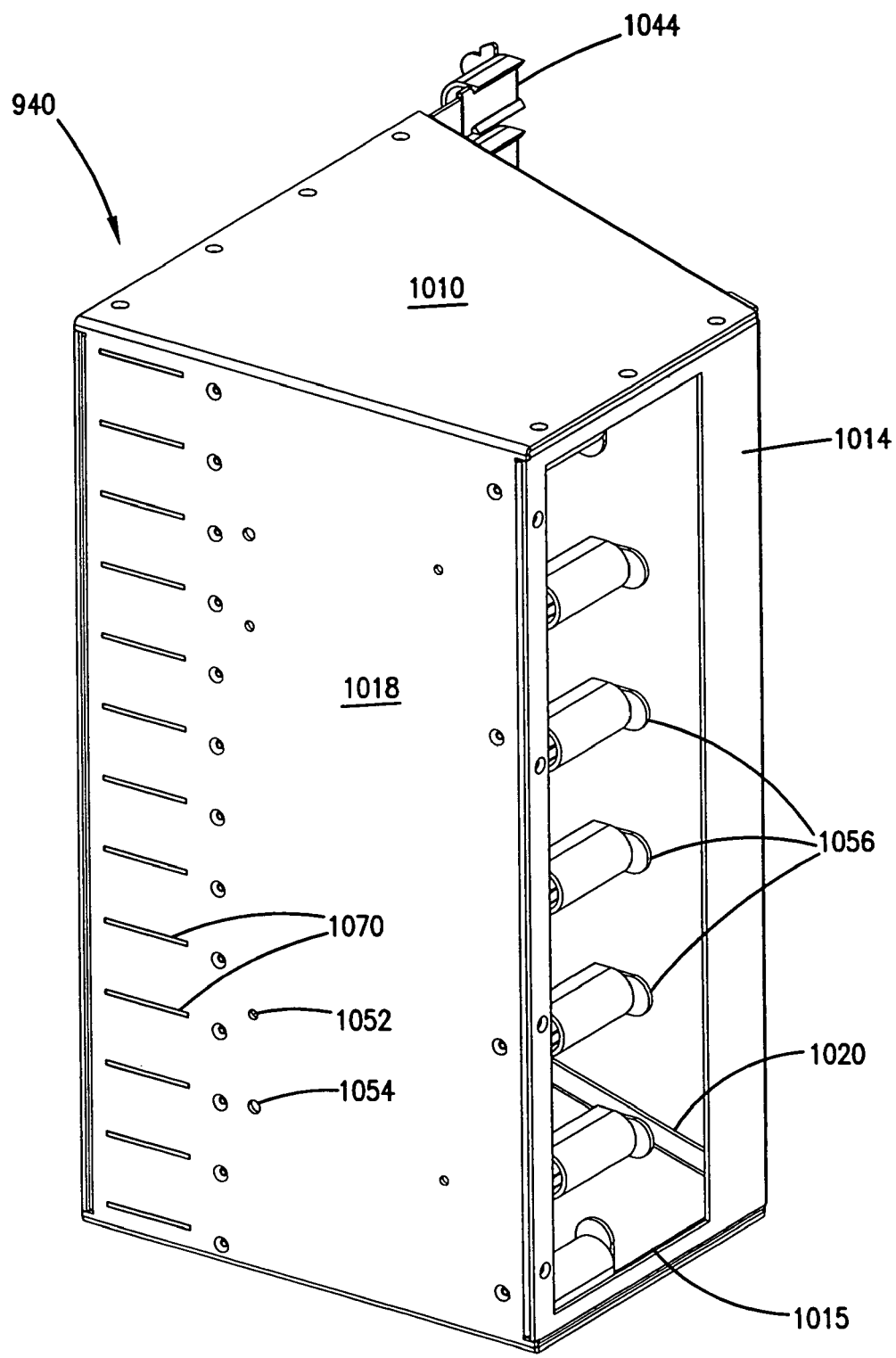
FIG. 44 is a rear, top and right side perspective view of the termination module of FIG. 43.
Figure 45:
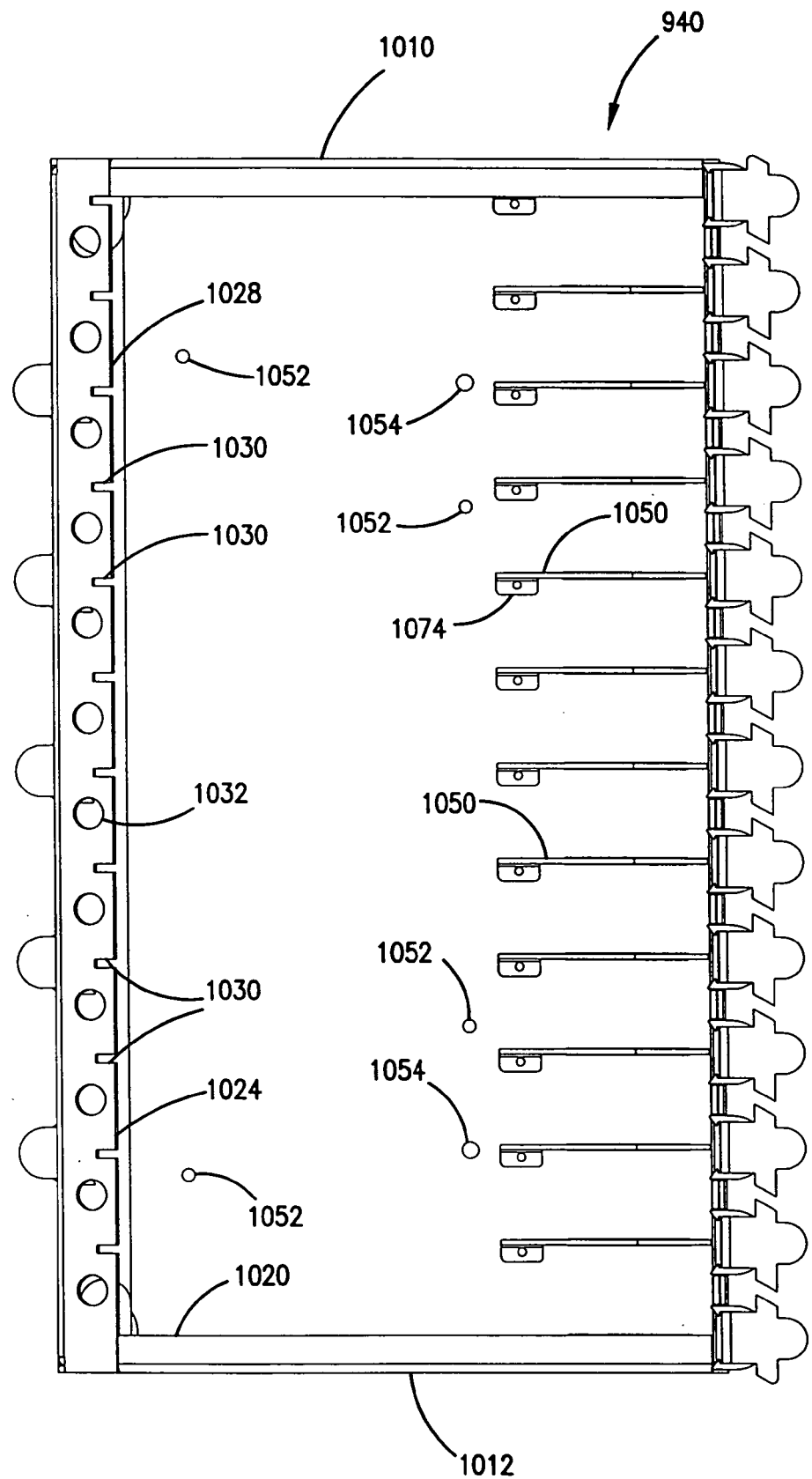
FIG. 45 is a front view of the termination module of FIG. 43.
Figure 46:
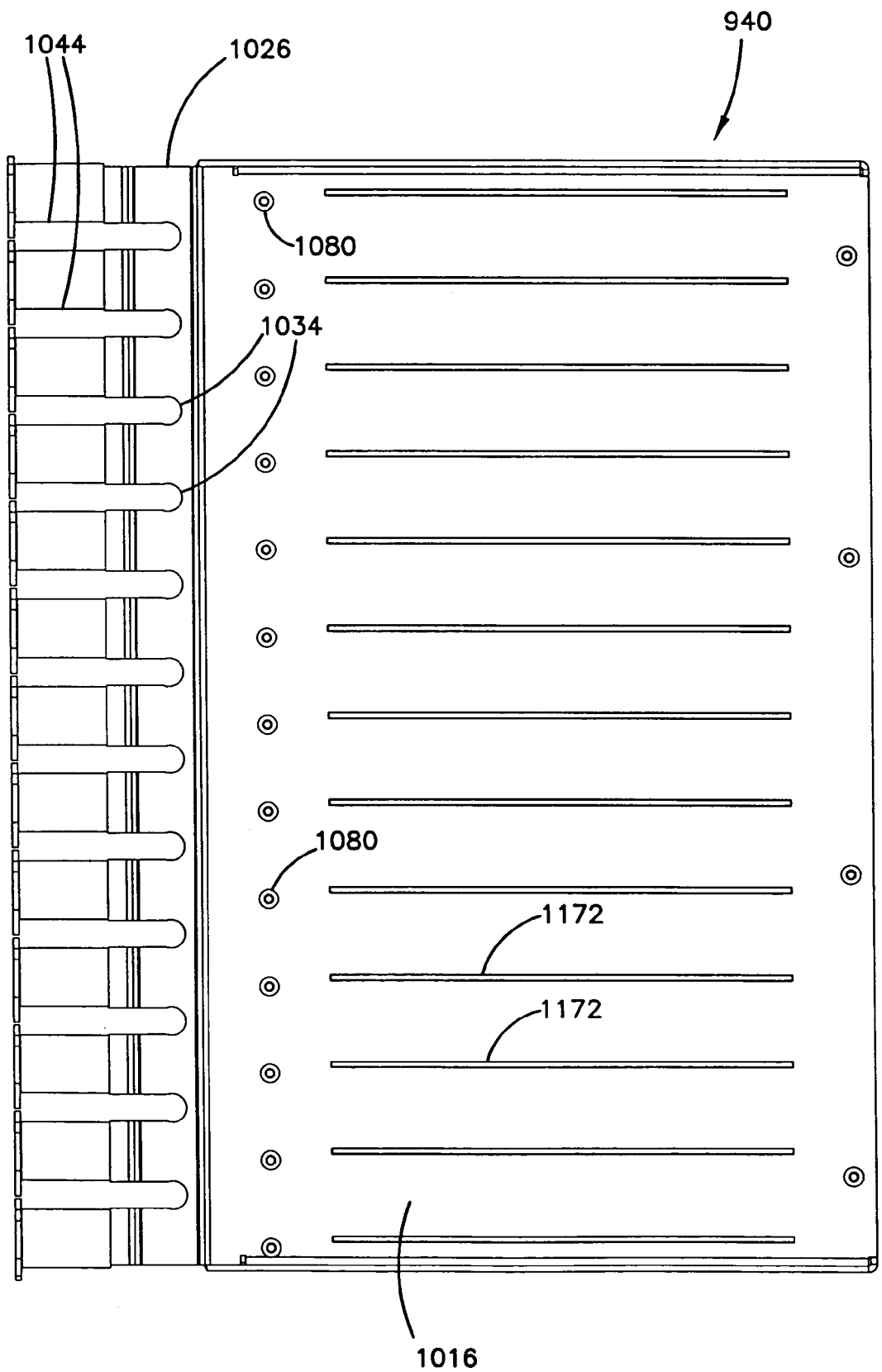
FIG. 46 is a right side view of the termination module of FIG. 43.
Figure 47:
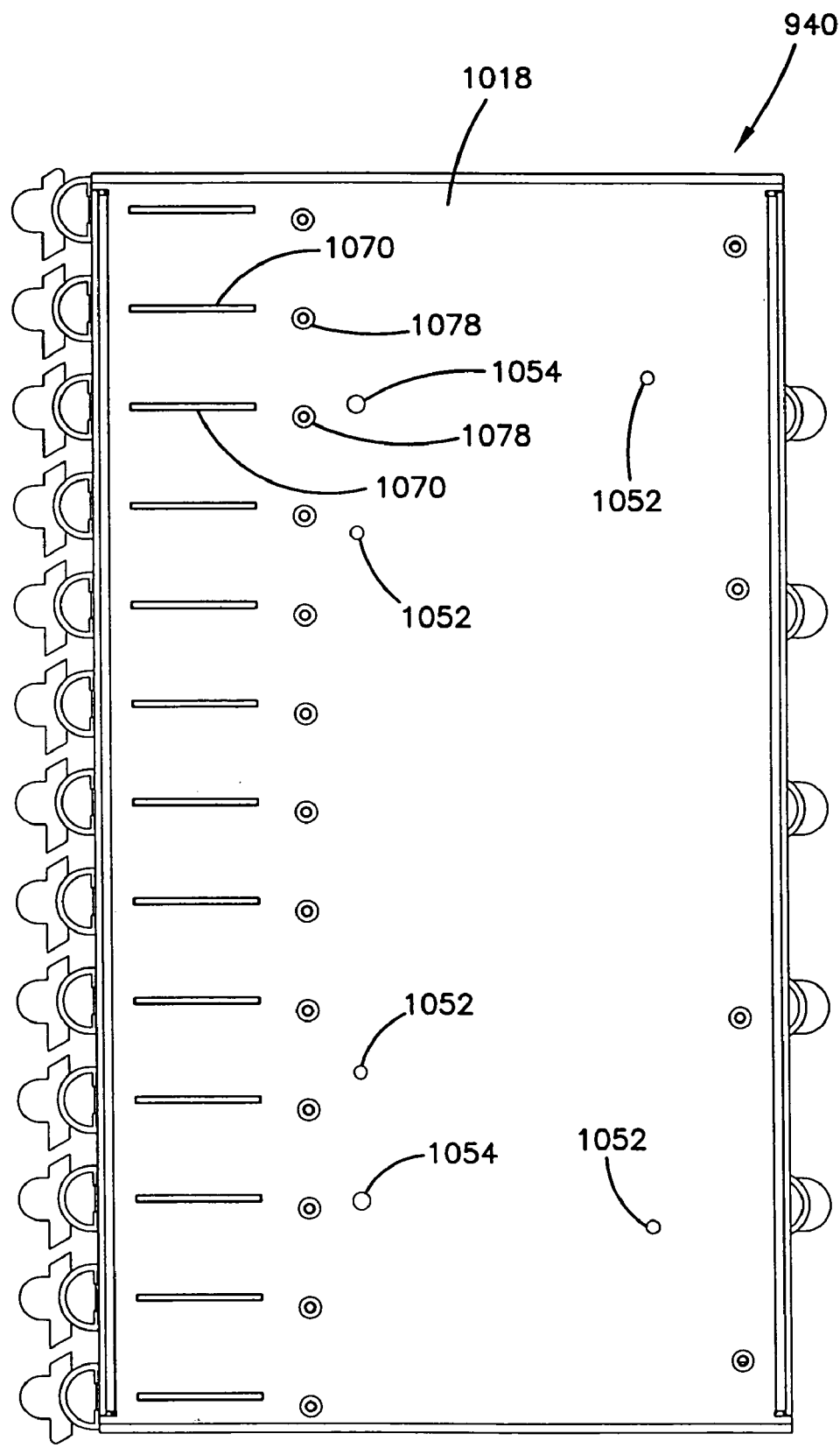
FIG. 47 is a rear view of the termination module of FIG. 43.
Figure 48:
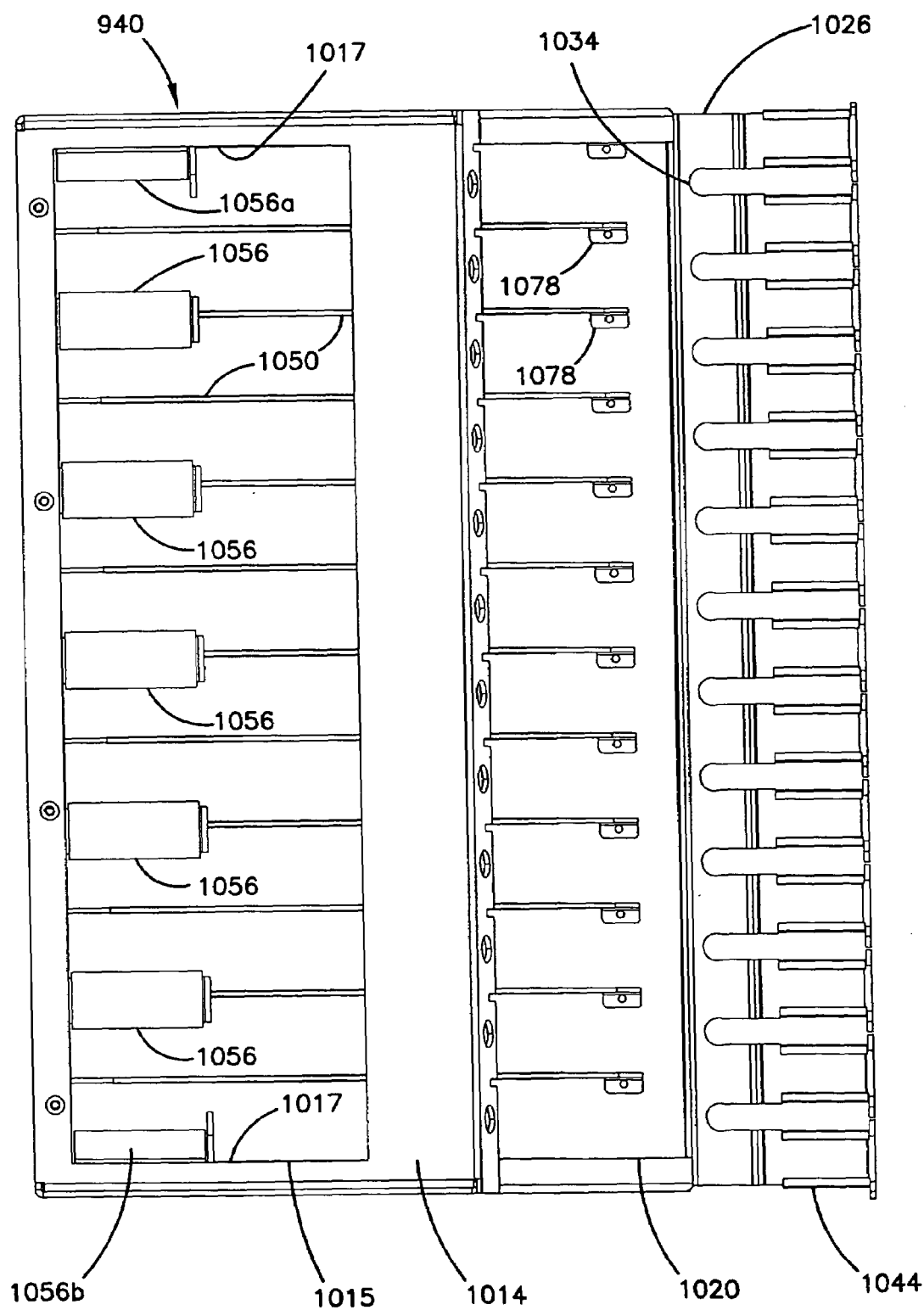
FIG. 48 is a left side view of the termination module of FIG. 43.
Figure 49:
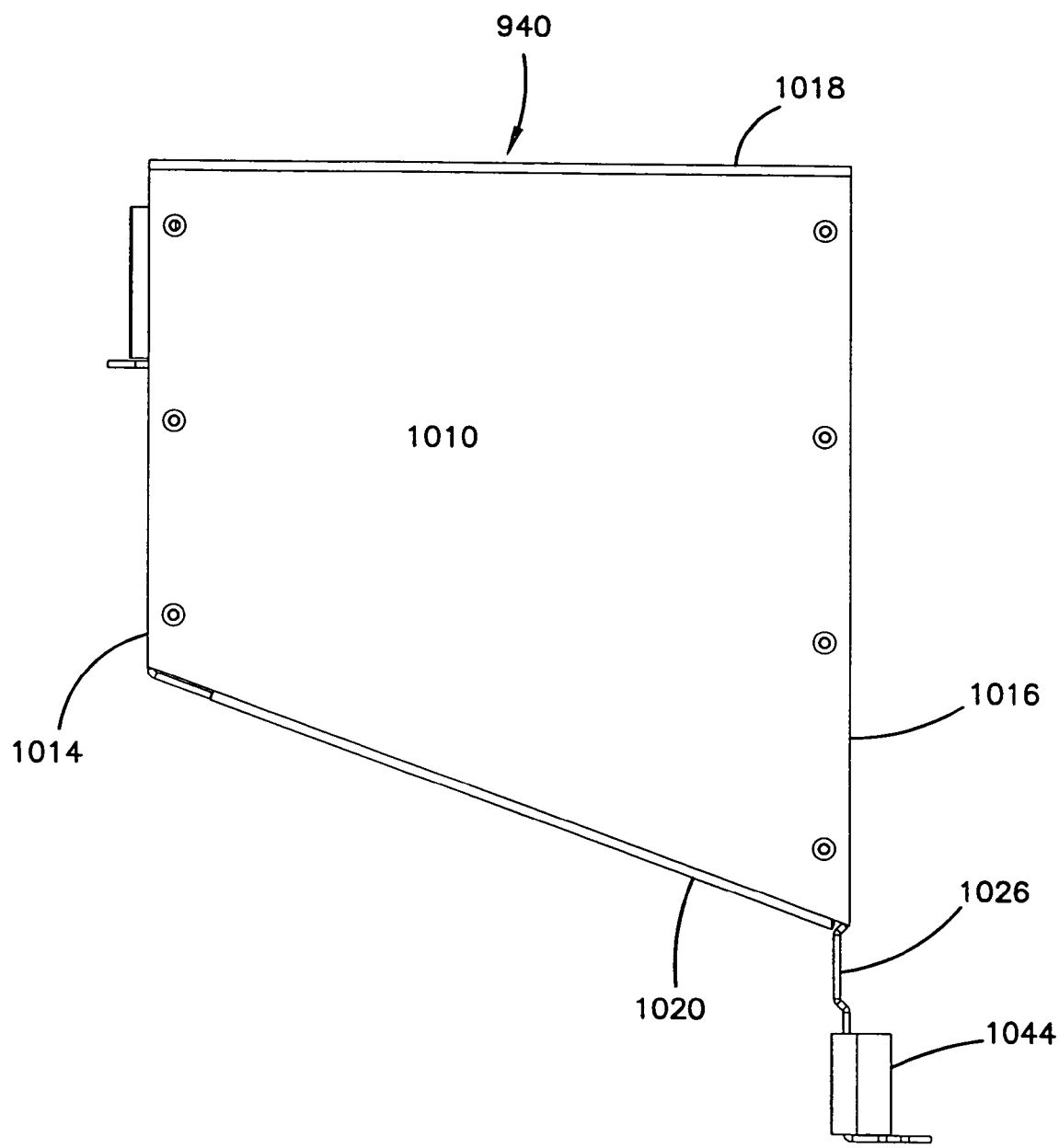
FIG. 49 is a top view of the termination module of FIG. 43.
Figure 50:
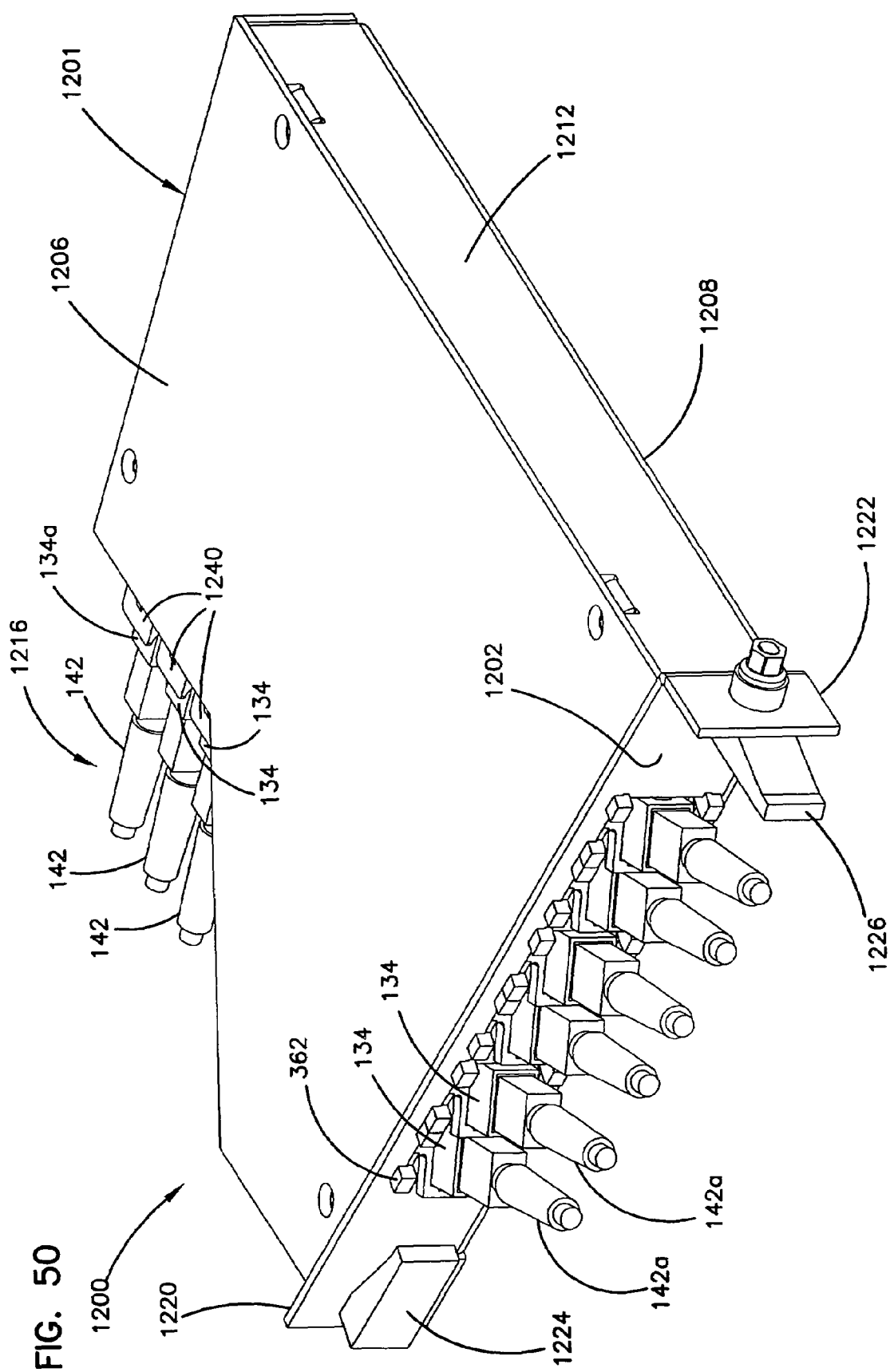
FIG. 50 is a front, top and right side perspective view of one of the connector modules removed from the termination module of FIG. 41.
Figure 51:
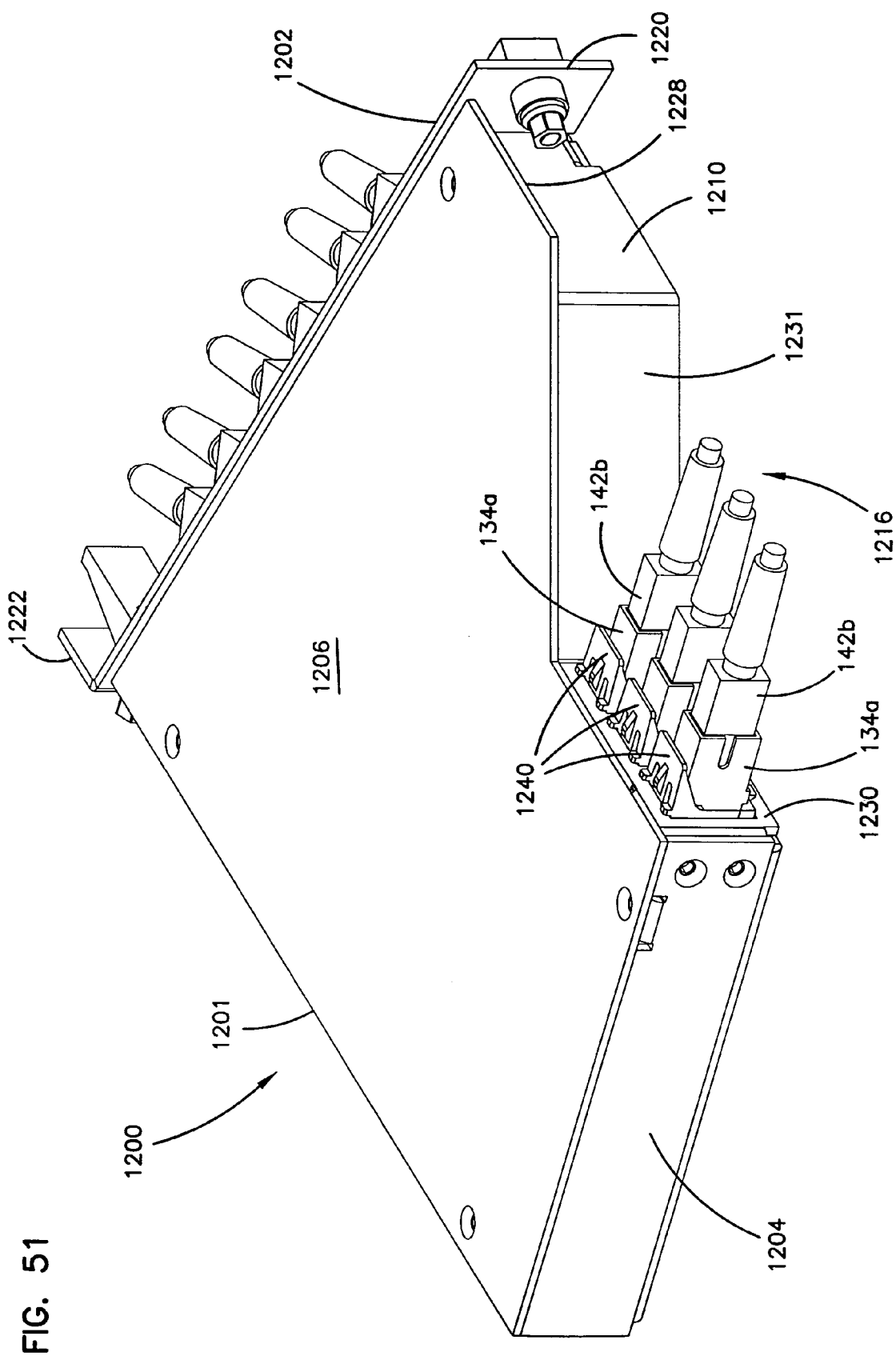
FIG. 51 is a rear, top and right side perspective view of the connector module of the termination module of FIG. 50.
Figure 52:
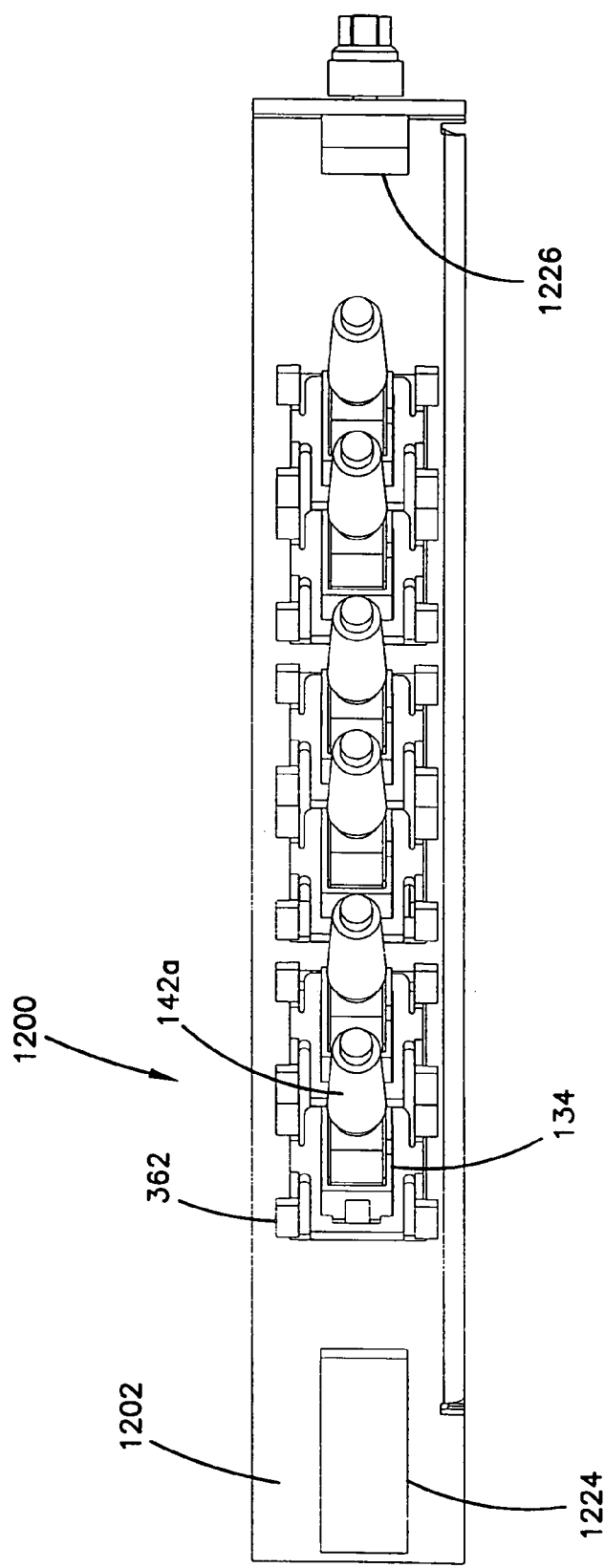
FIG. 52 is a front view of the connector module of FIG. 50.
Figure 53:
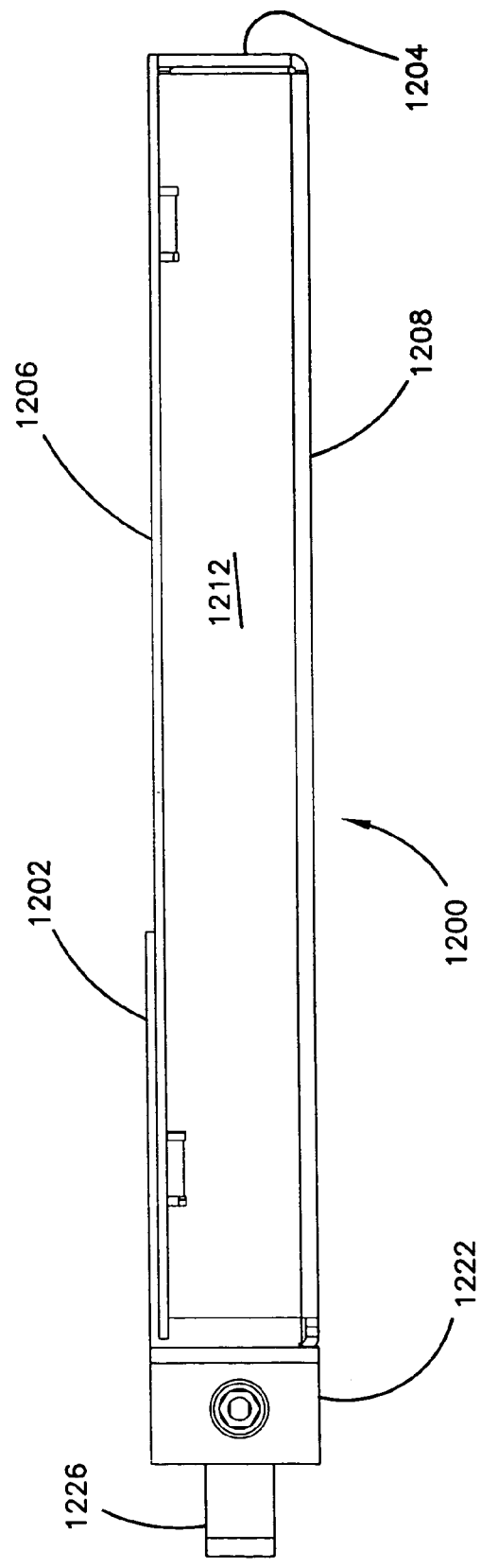
FIG. 53 is a right side view of the connector module of FIG. 50.
Figure 54:
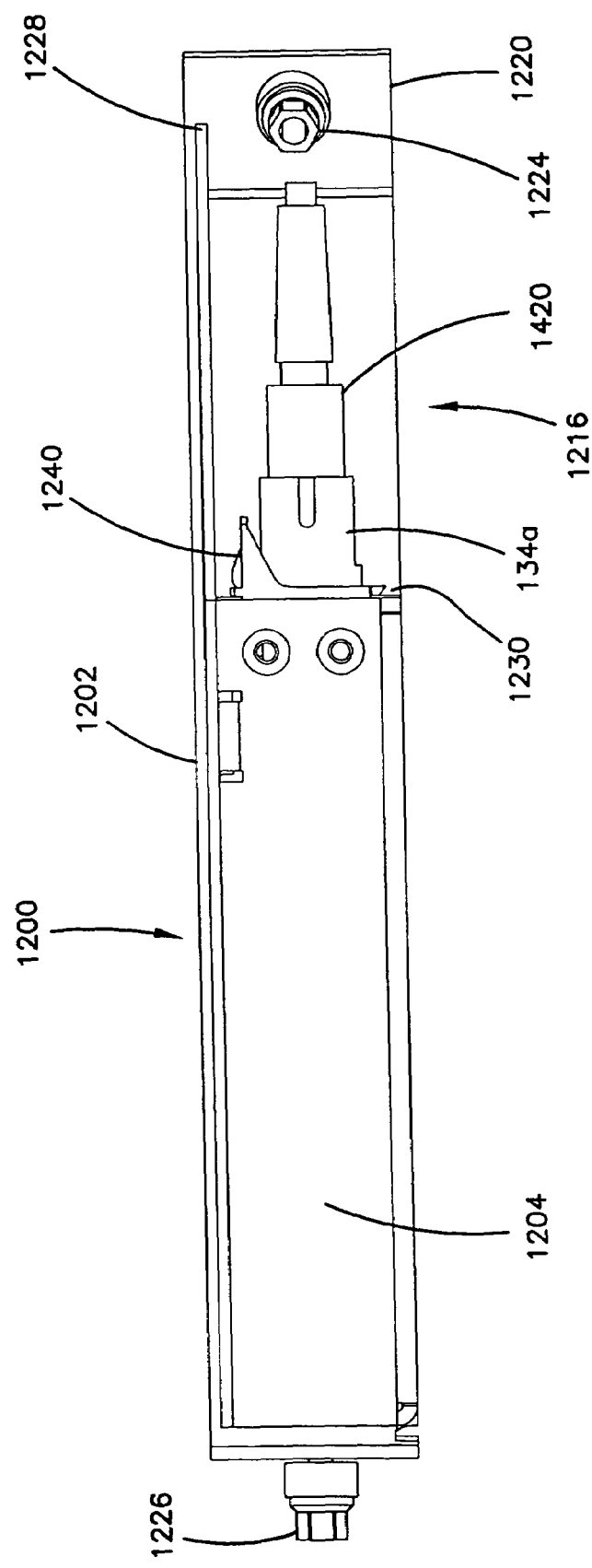
FIG. 54 is a rear view of the connector module of FIG. 50.
Figure 55:
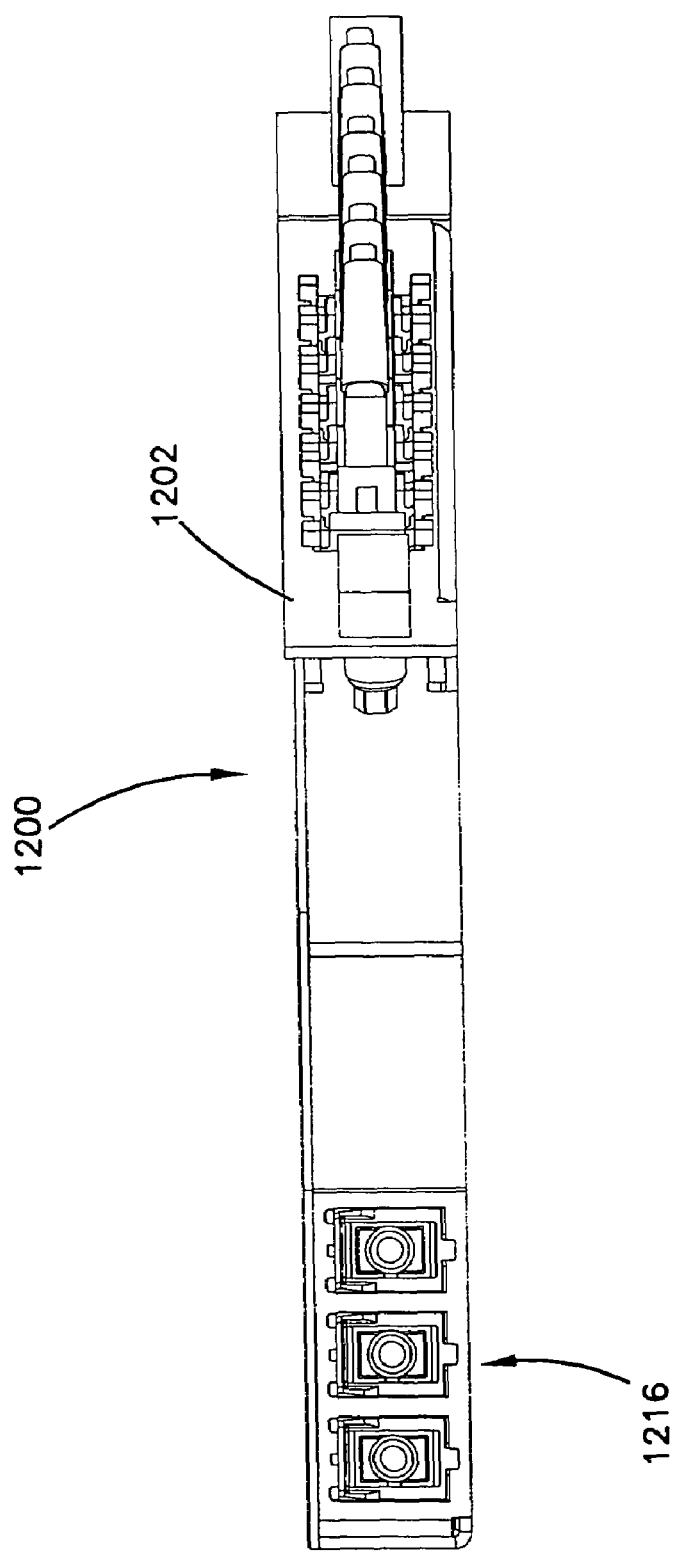
FIG. 55 is a left side view of the connector module of FIG. 50.
Figure 56:
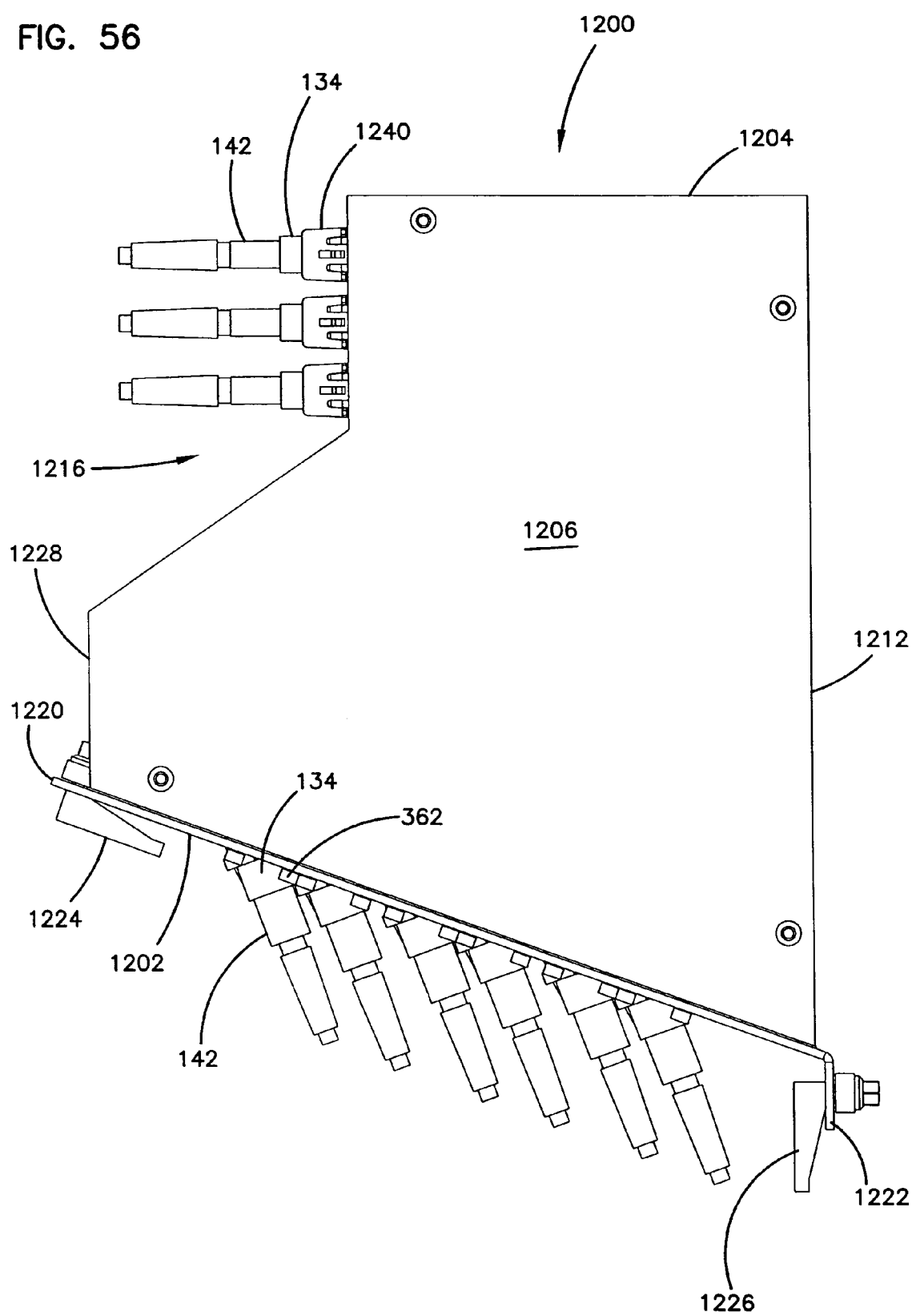
FIG. 56 is a top view of the connector module of FIG. 50.

Each termination module 940 defines an open front 1020 through a main panel section 1024 which receives individual connector modules or units 1200, such as further illustrated in FIGS. 50–58. With respect to termination module 632 noted above, main panel 724 defined the various termination locations. With respect to termination module 940, the front faces 1202 of each connector module 1200 cooperate with each other in termination module 940 to create the array of termination locations of a main panel 1025 of termination module 940. Each connector module 1200 allows for the mounting of front adapters 134 in one or more openings 1203 associated with each connector module 1200. The termination modules 940 of FIGS. 38 and 39 are shown without the adapters 134 in openings 1203. Any number of openings can be provided, such as one for all the adapters of each module 1200, or more openings, such as one per adapter, or three (2 adapters 134 per opening) in the illustrated embodiment.

The main or front panel section 1025 of termination module 940 defines open front 1020. On one side 1026 a vertical array of guides 1044 are provided for protecting and retaining the cables, one guide adjacent to each row of adapters 134. Side 1026 extends generally parallel to side 1016 of termination module 940. In the illustrated embodiment, one guide 1044 is provided per connector module 1200. Each guide 1044 holds the cables from each front connector 142a disposed in each row. From guides 1044, the cables extend through a side access of the closest vertical cable guide 660, 662.

In the illustrated preferred embodiment, connector module 1200 is slid into position in termination module 940 and held in a desired vertical position in module 940. An opposite side 1028 of main panel section 1025 includes a plurality of guides or notches 1030 for slideably receiving a guide or side flange 1228 of connector module 1200. Side 1028 further includes openings 1032 for receiving a fastener or latch 1224 of connector module 1200. Opposite side 1026 includes notches 1034 for receiving a similar fastener 1226 on an opposite side of connector module 1200.

Termination module 940 includes connector module holders disposed in the interior. In the illustrated embodiment, interior horizontal shelves 1050 support and hold the individual connector modules 1200. Shelves 1050 are partial planar shelves, not filling the entire inside of termination module 940. This allows front access through open front 1020 for mounting termination module 940 to frame 920 through rear fastener holes 1052, and rear alignment holes 1054 through rear 1018. Alignment holes 1054 assist an installer by receiving pegs associated with rear panel 942 of rack 930, prior to the insertion of fasteners through fastener holes 1052.

Side 1016 and rear 1018 each include a column of horizontal slots 1072, 1070 for supporting an edge of each shelf 1050. Shelves 1050 further include tabs 1074, 1076 for receiving a fastener for mounting to fastener holes 1078, 1080 in rear 1018 and side 1016 to fasten each shelf 1050 in place in termination module 940.

Termination module 940 further includes one or more cable supports 1056 at side opening 1015. Cable supports 1056 protect cables from sharp bends of from contacting any nearby sharp edges. Cable supports 1056 include a longitudinal section 1058 extending from side 1057, a bend section 1060, and an edge protector 1062. Top and bottom supports 1056a, b are turned 90° relative to a horizontal longitudinal axis and help protect entering cables from damage by edge 1017.

Referring now to FIGS. 50–58, connector module 1200 includes a housing 1201 including front 1202, and a rear 1204. Front 1202 and rear 1204 are generally planar. Major sides 1206, 1208 are parallel to one another and spaced-apart to define an interior which cooperates with spaced-apart minor sides 1210, 1212 to house fiber optic circuitry. Minor sides 1210, 1212 are generally parallel to each other. Housing 1201 further defines a rear notch 1216 extending from minor side 1210 to rear 1204. For mounting connector module 1200 to termination module 940, end flanges 1220, 1222 are provided, for supporting fasteners, locks or latches 1224, 1226. Flange 1222 is angled relative to the plane defined by front 1202.

Front 1202 of connector module includes a plurality of adapters 134 for receiving connectors 142a of patch cables. Angled retainers 362 hold each adapter 134 so its longitudinal axis is at a non-transverse angle to the plane defined by front 1202. In rear notch 1216, side segment 1230 of housing 1201 provides a mounting surface for rear adapters 134a. Each rear adapter 134a receives a rear connector 142b for the cables from passageway 970. Rear retainers 1240 hold each rear adapter 134a to housing 1201. Rear snap in retainers 1240 allow convenient assembly, and removal if necessary. Adapters 134, 134a can be SC type (as shown), FC type, ST type or other. Side flange 1228 extends from major side 1206. If connector module 1200 is used on left side 932 of frame 920 for a termination module 940 on the left side, connector module 1200 is flipped over to have its front angle toward the right side 934 of frame 920. An angled side segment 1231 connects side 1210 to side segment 1230.

Figure 57:
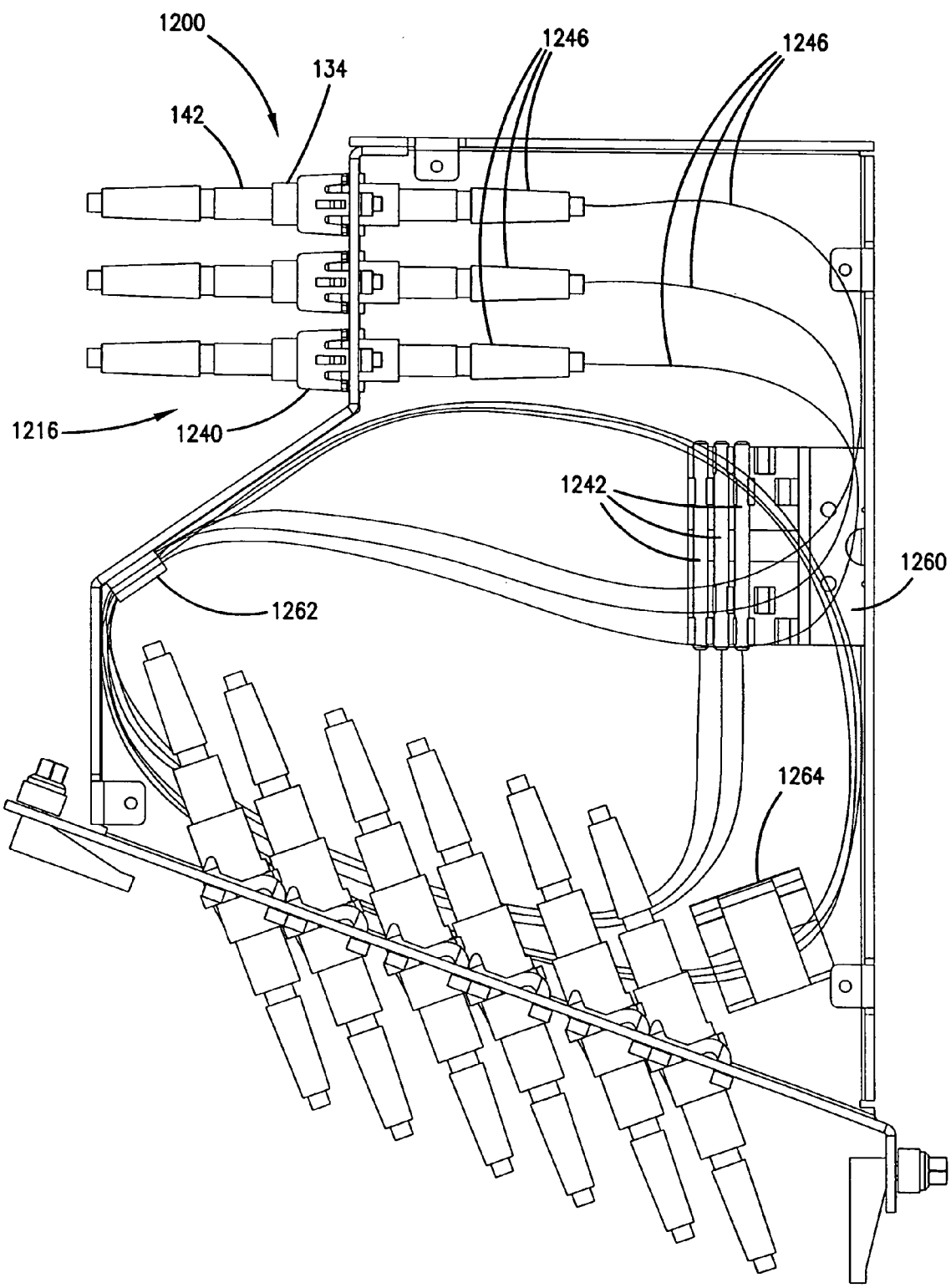
FIGS. 57 and 58 are top views of the connector module of FIG. 50, shown with the top cover removed, exposing the internal connectors, cables, couplers, and related fiber management structure for one example configuration.
Figure 58:
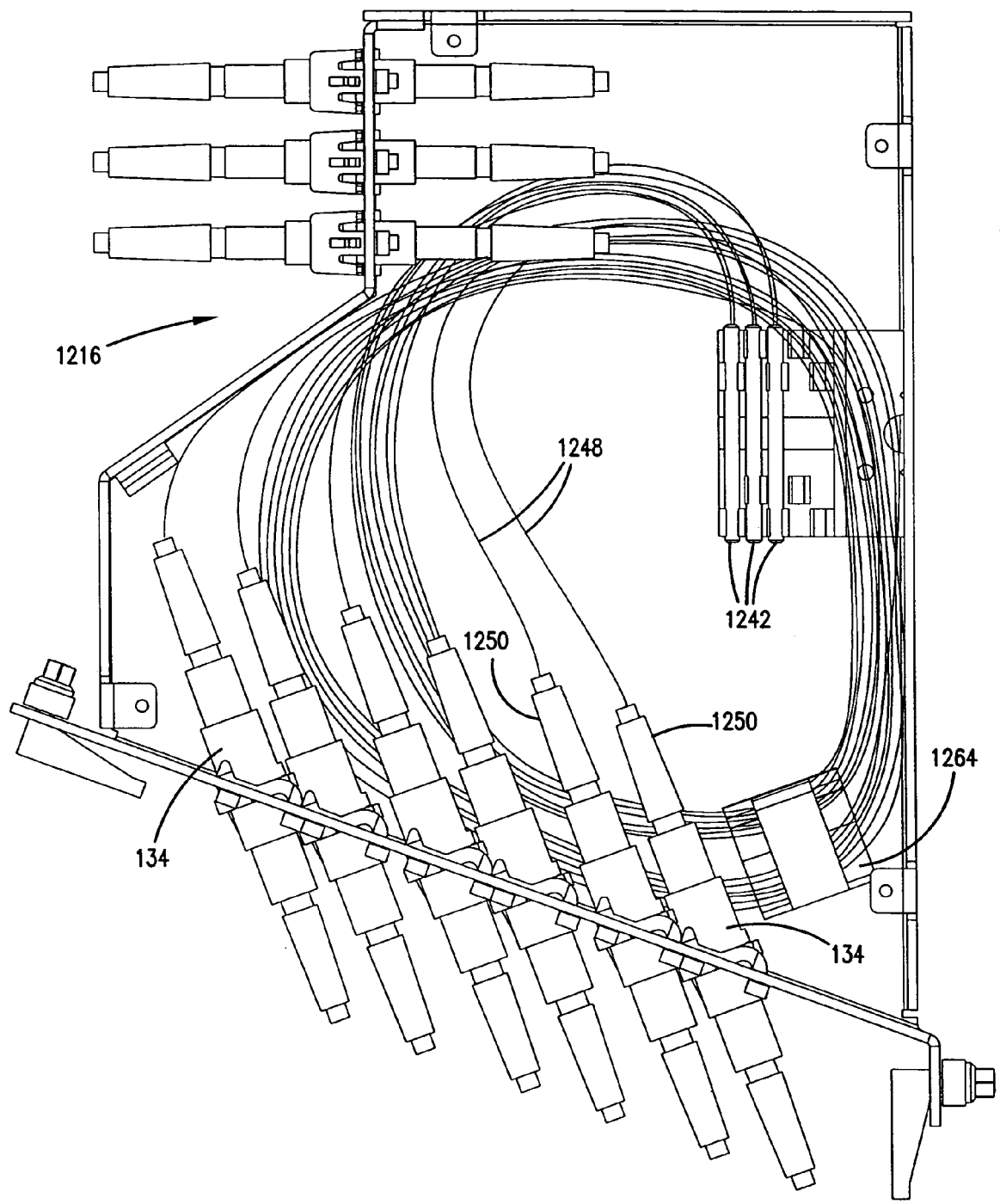

Disposed within housing 1201 of connector module 1200 is one or more couplers 1242, such as splitters, combiners, wave division multiplexers, etc. for connecting between rear adapters 134 and front adapters 134. In the example of FIGS. 57 and 58, 1×2 splitters are provided for couplers 1242. Rear internal connectors 1244 and fibers 1246 connect to couplers 1242. From couplers 1242, further fibers 1248 connect to further internal front connectors 1250 at front adapters 134. Connectors 1244, 1250 are similar connectors to connectors 142a, b. A coupler holder 1260 may be provided, as desired to secure couplers 1242 in place. Fiber management guides 1262, 1264 may be provided as appropriate to secure fibers 1246, 1248 in position. In the example shown, fibers 1246 follow an S-path, followed by a loop-path before connecting to couplers 1242, and fibers 1248 follow a loop-path.

By providing rear notch 1216, connectors 142b extending from rear adapters 134a along an exterior of housing 1201 are protected and do not protrude into central passageway 970 of frame 920. Further, the notch 1216 also allows for a greater front panel surface area, as well as a greater volume within the housing 1201 for routing of fibers from the rear adapters 134a to the couplers 1242, and then to the front adapters 134.

Figure 59:
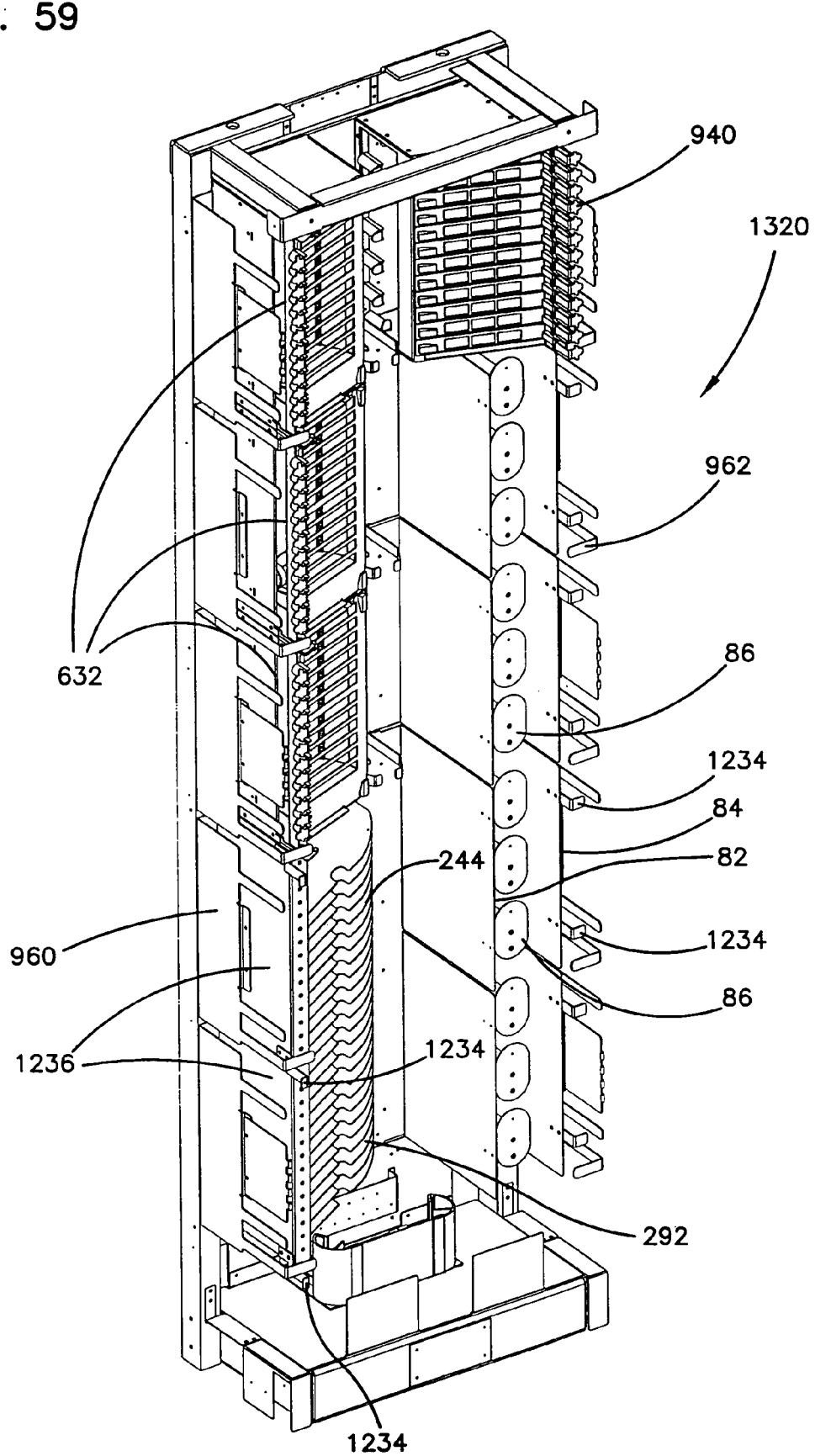
FIG. 59 is a front, top and left side perspective view of a sixth embodiment of a fiber distribution frame according to the present invention, with portions removed.
Figure 60:
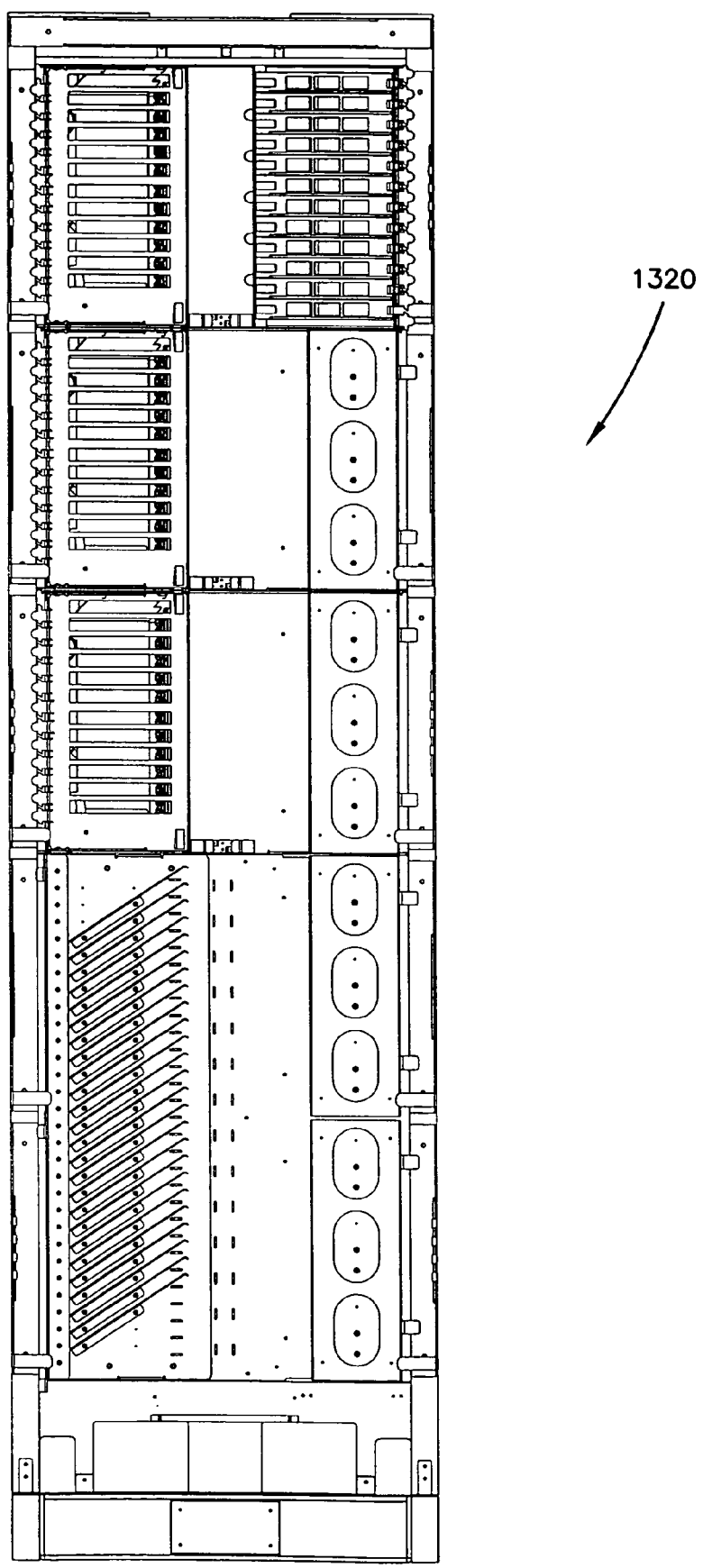
FIG. 60 is a front view of the frame of FIG. 59.
Figure 61:
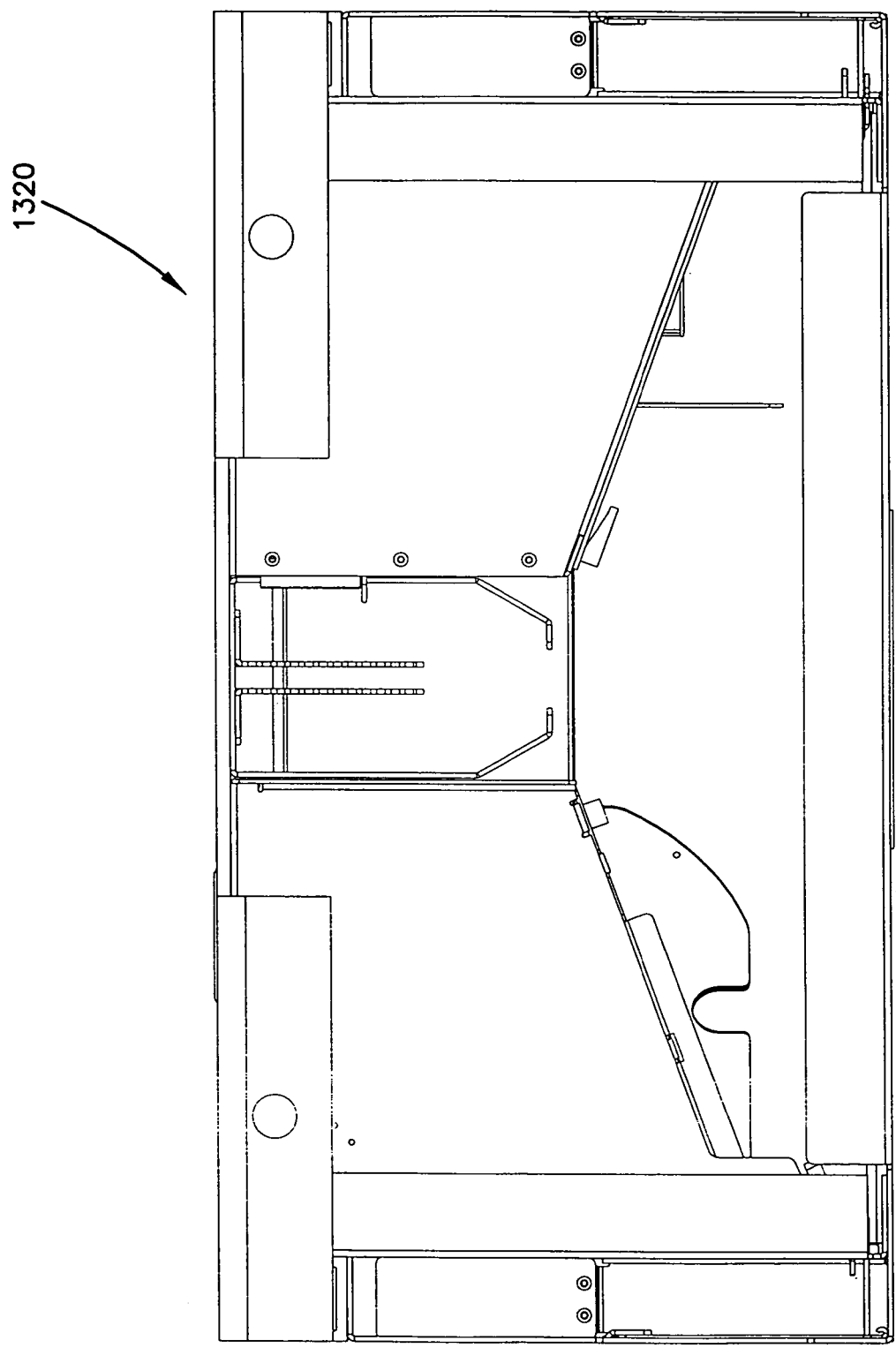
FIG. 61 is a top view of the frame of FIG. 59.
Figure 62:
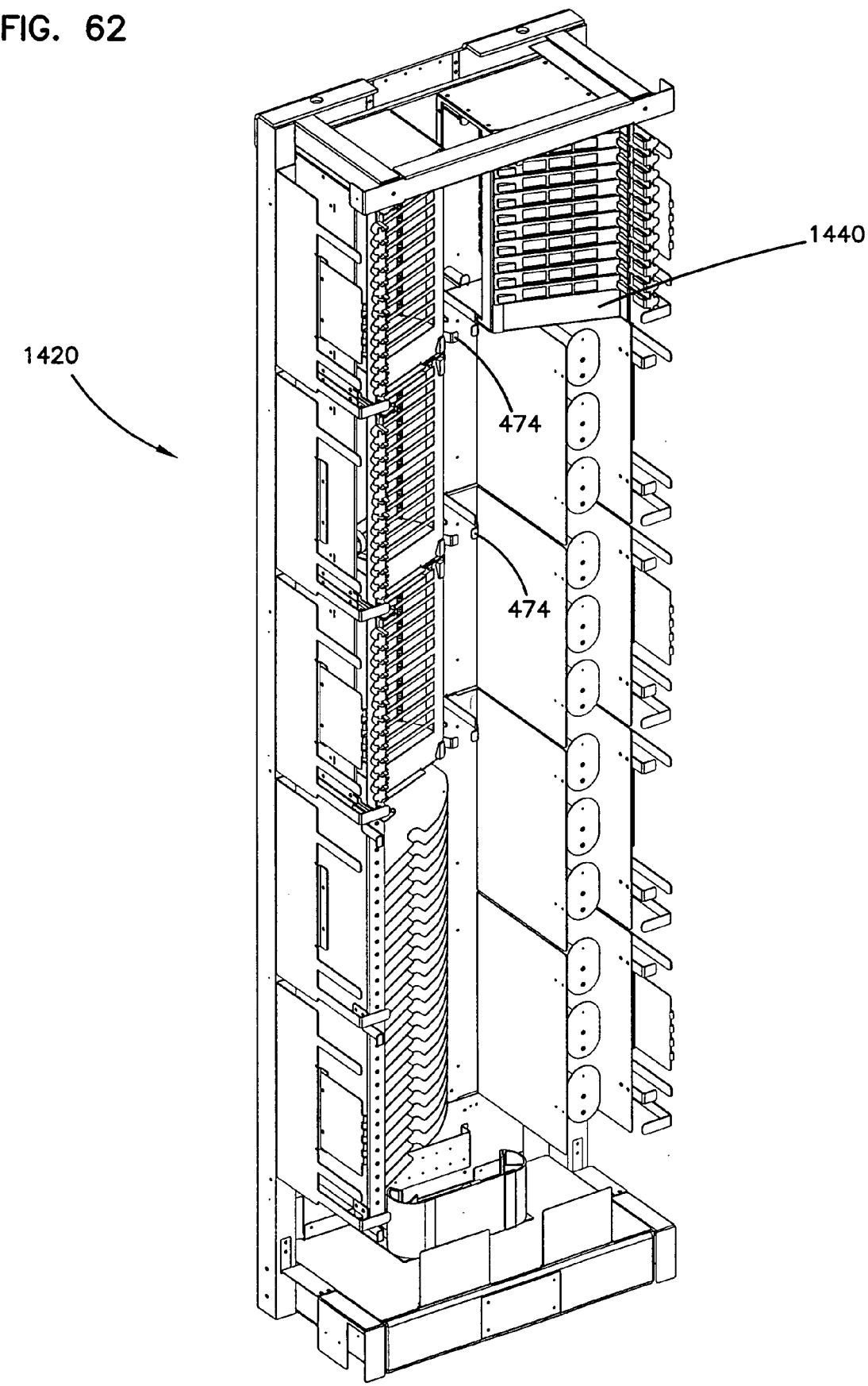
FIG. 62 is a front, top and left side perspective view of a seventh embodiment of a fiber distribution frame according to the present invention, with portions removed.
Figure 63:
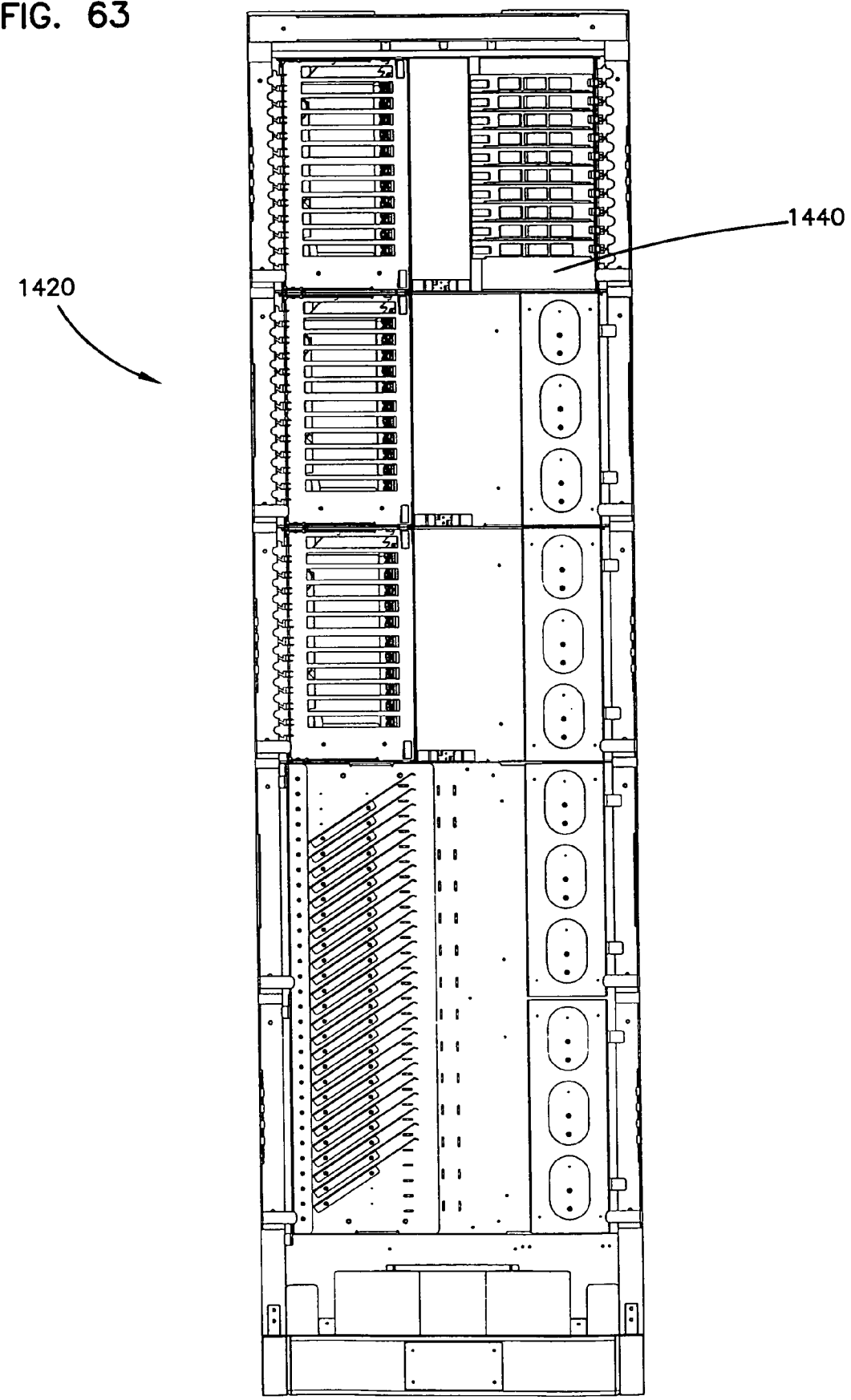
FIG. 63 is a front view of the frame of FIG. 62.
Figure 64:
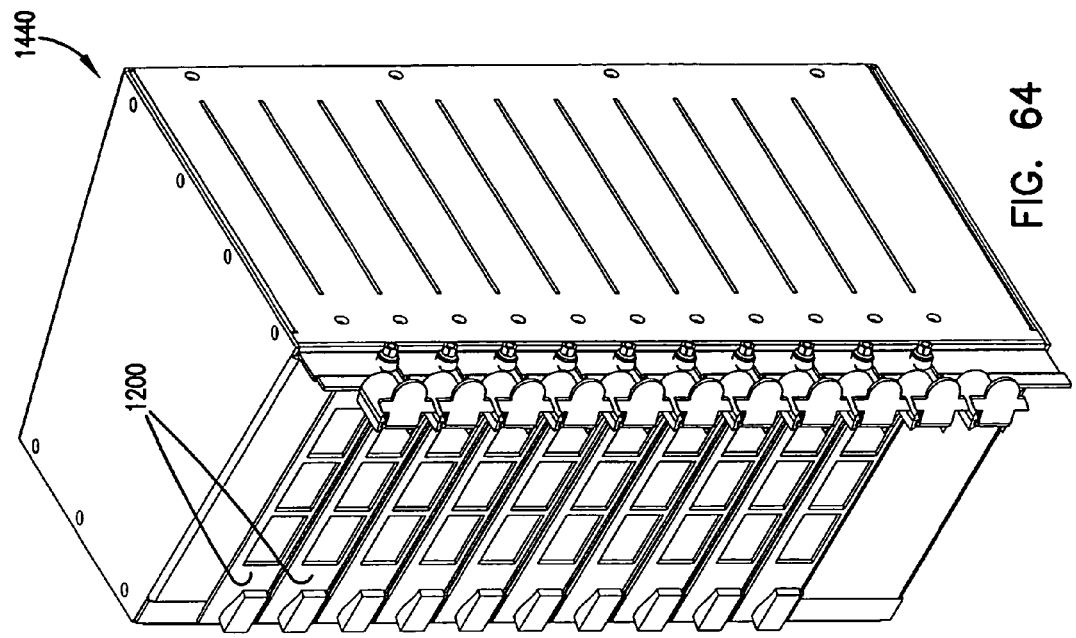
FIG. 64 is a front, top and right side perspective view of the termination module from the right side of the frame of FIG. 62.
Figure 65:
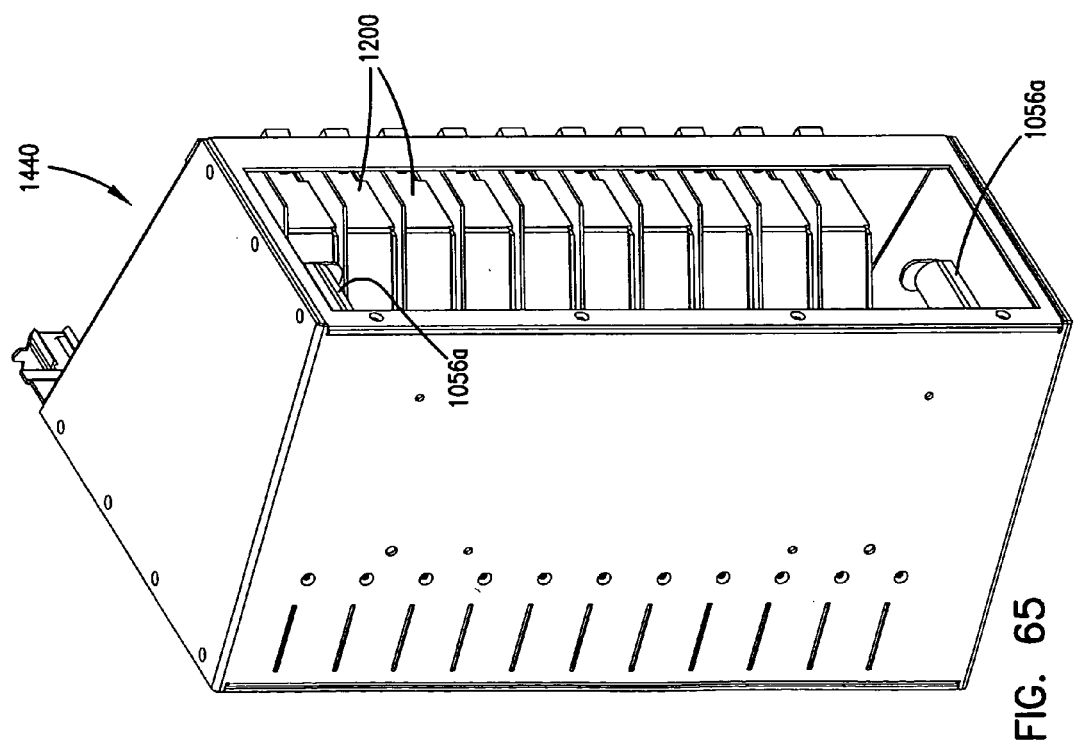
FIG. 65 is a rear, top and left side view of the termination module of FIG. 64.
Figure 66:
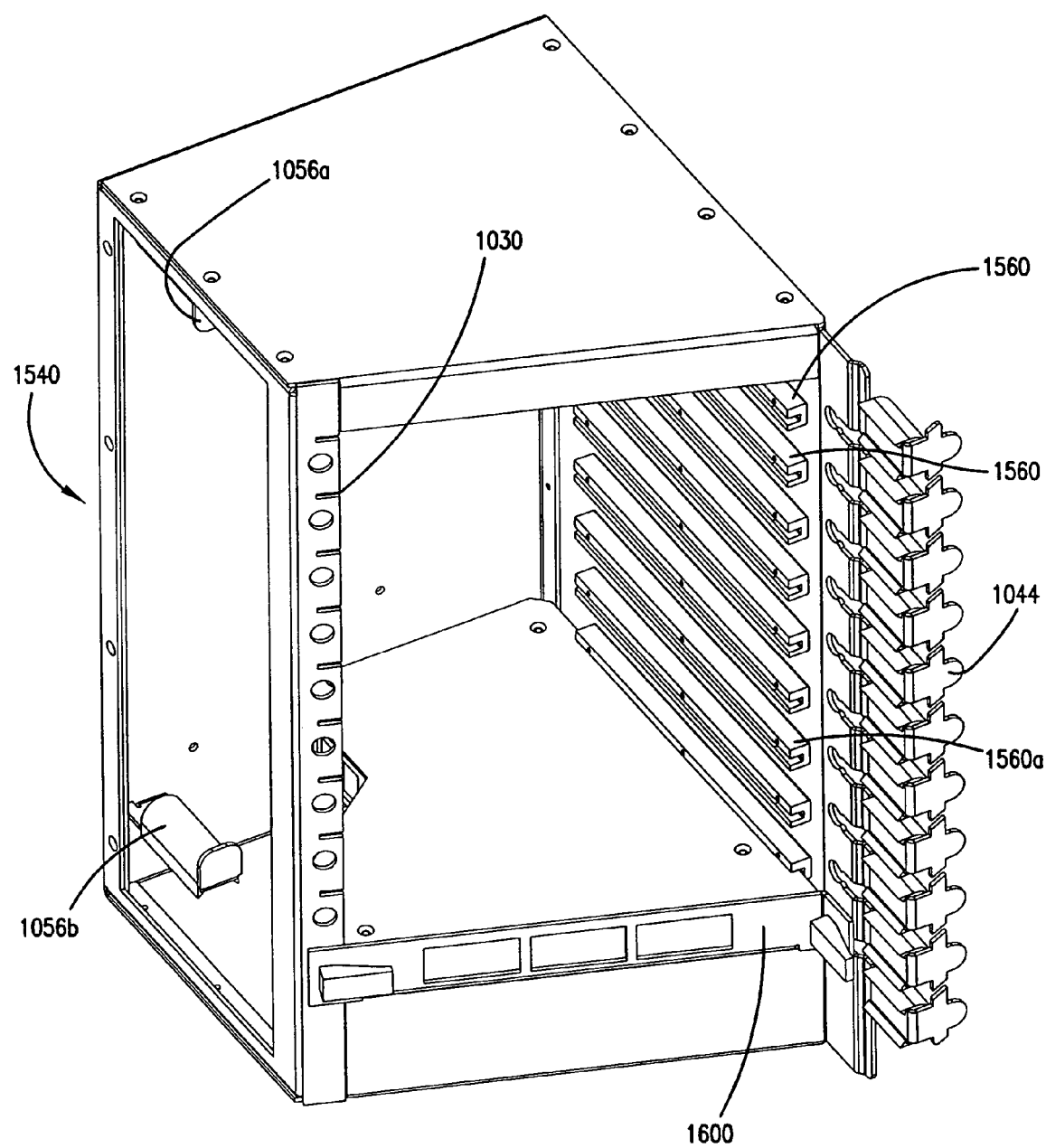
FIG. 66 is a front, top and left side perspective view of an alternative termination module to the termination module of FIGS. 64 and 65.
Figure 71:
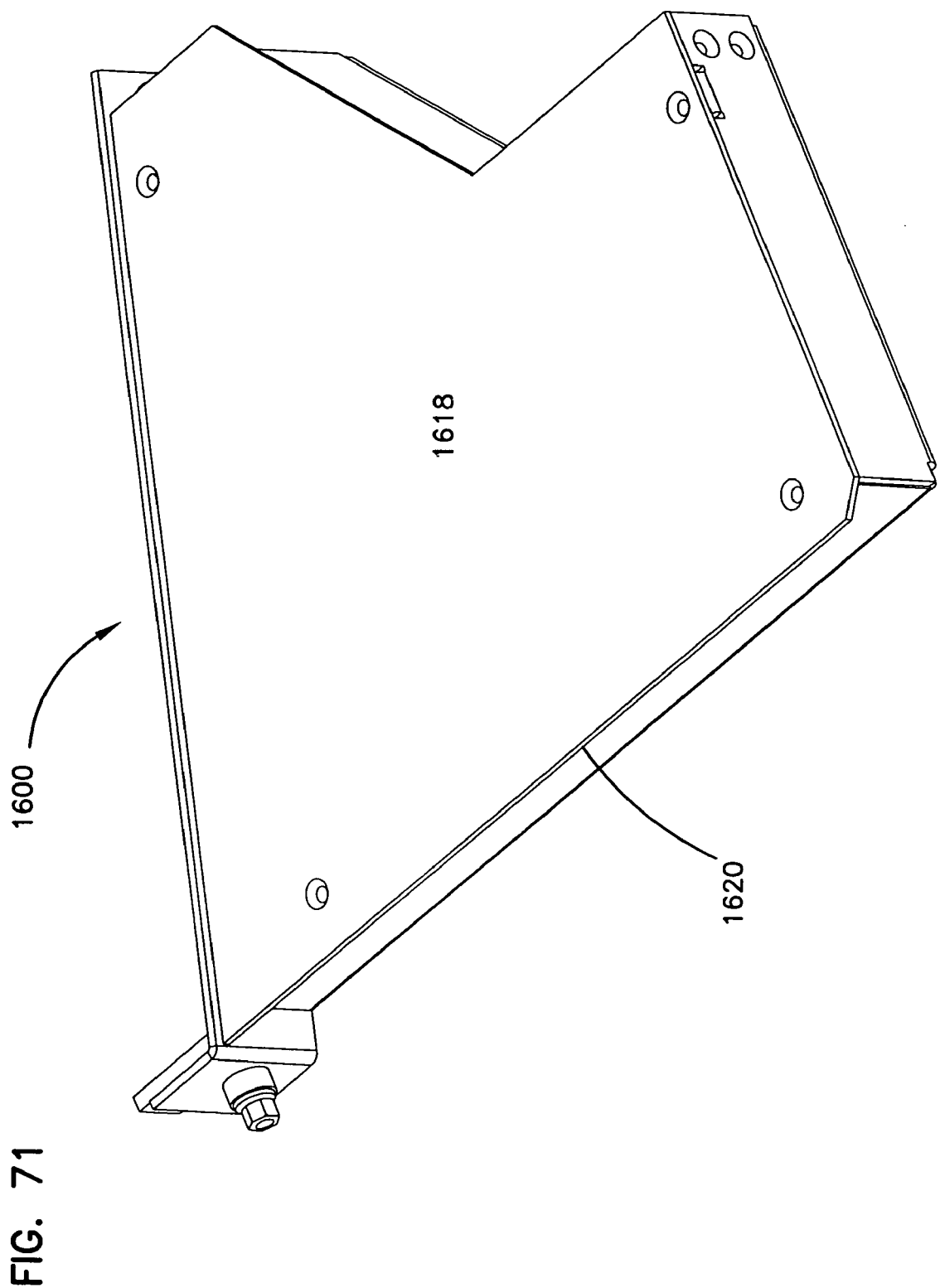
FIG. 71 is a rear, top and right side view of the connector module of FIG. 67.
Figure 72:
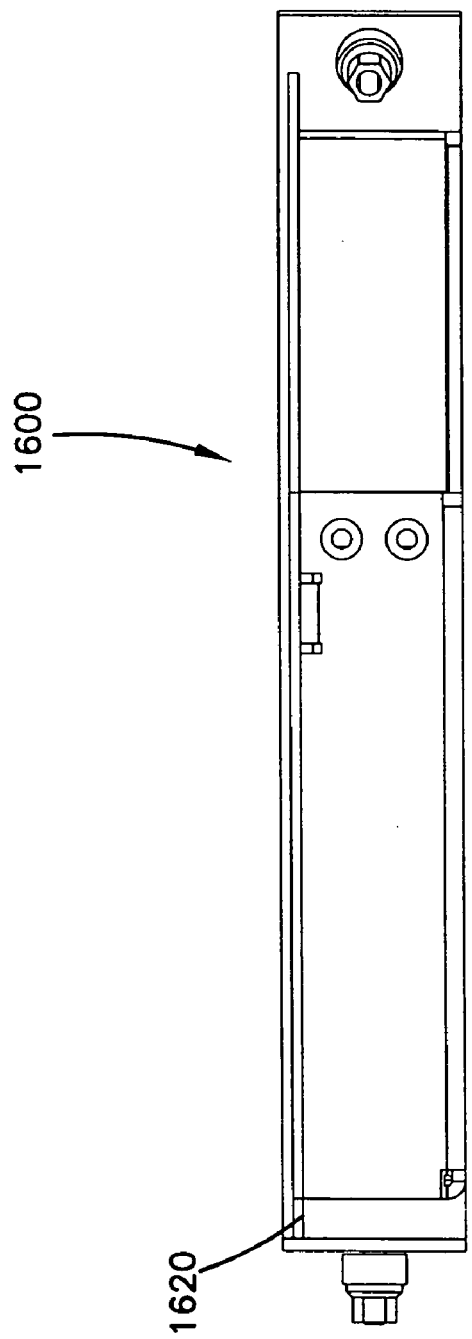
FIG. 72 is a rear view of the connector module of FIG. 67.
Figure 77:
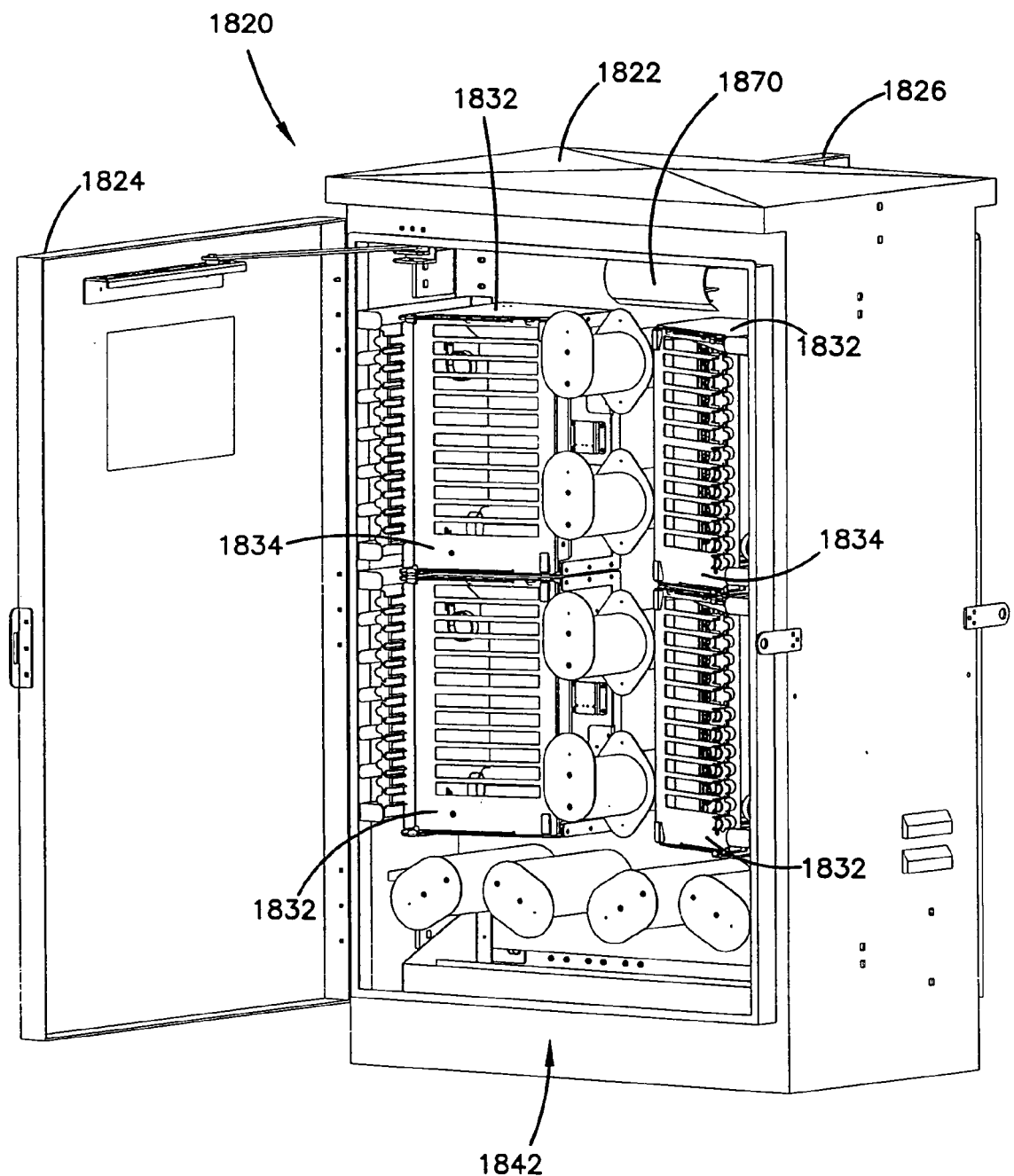
FIG. 77 is a front, top and right side perspective view of an eighth embodiment of a fiber distribution frame according to the present invention, with access panels of an enclosure shown in the open positions.
Figure 78:
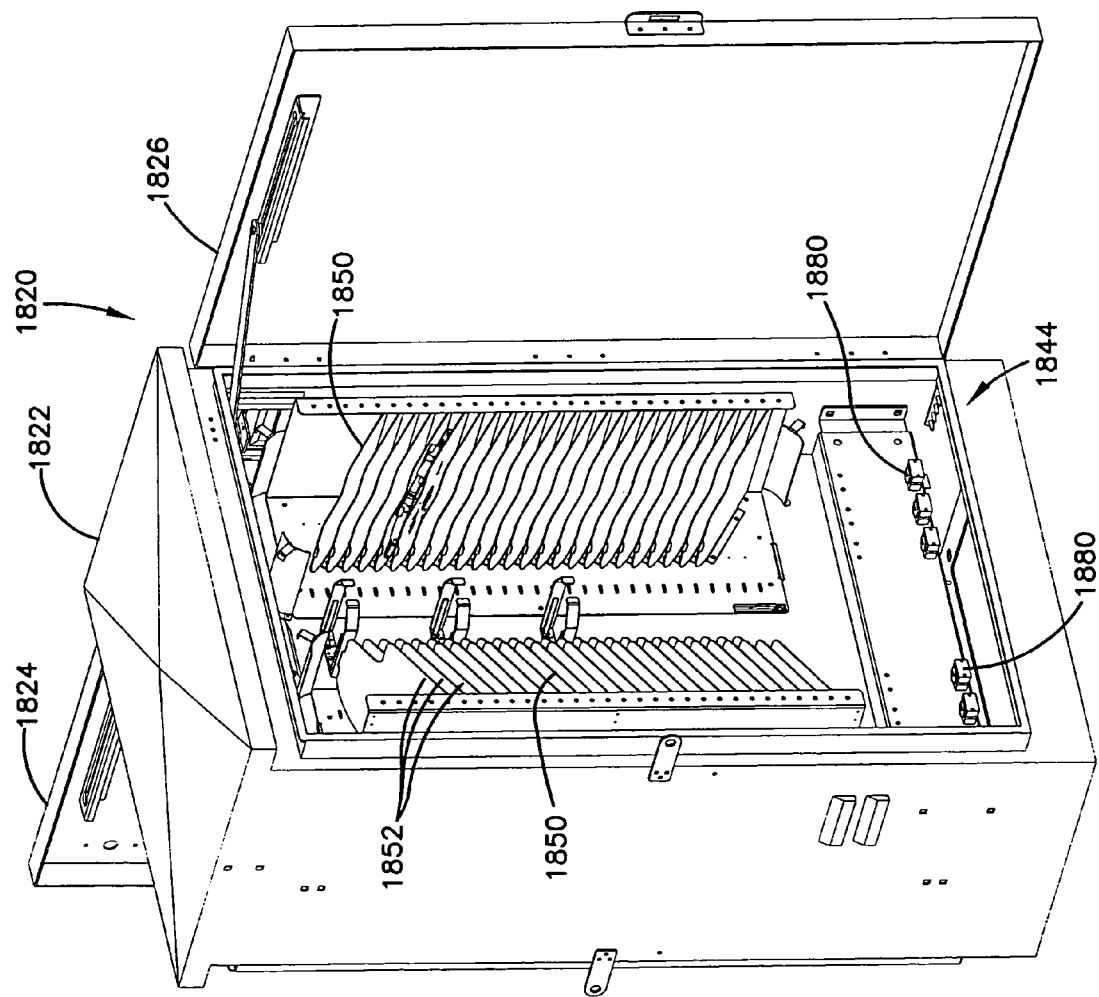
FIG. 78 is a rear, top, and right side perspective view of the fiber distribution frame of FIG. 77.
Figure 79:
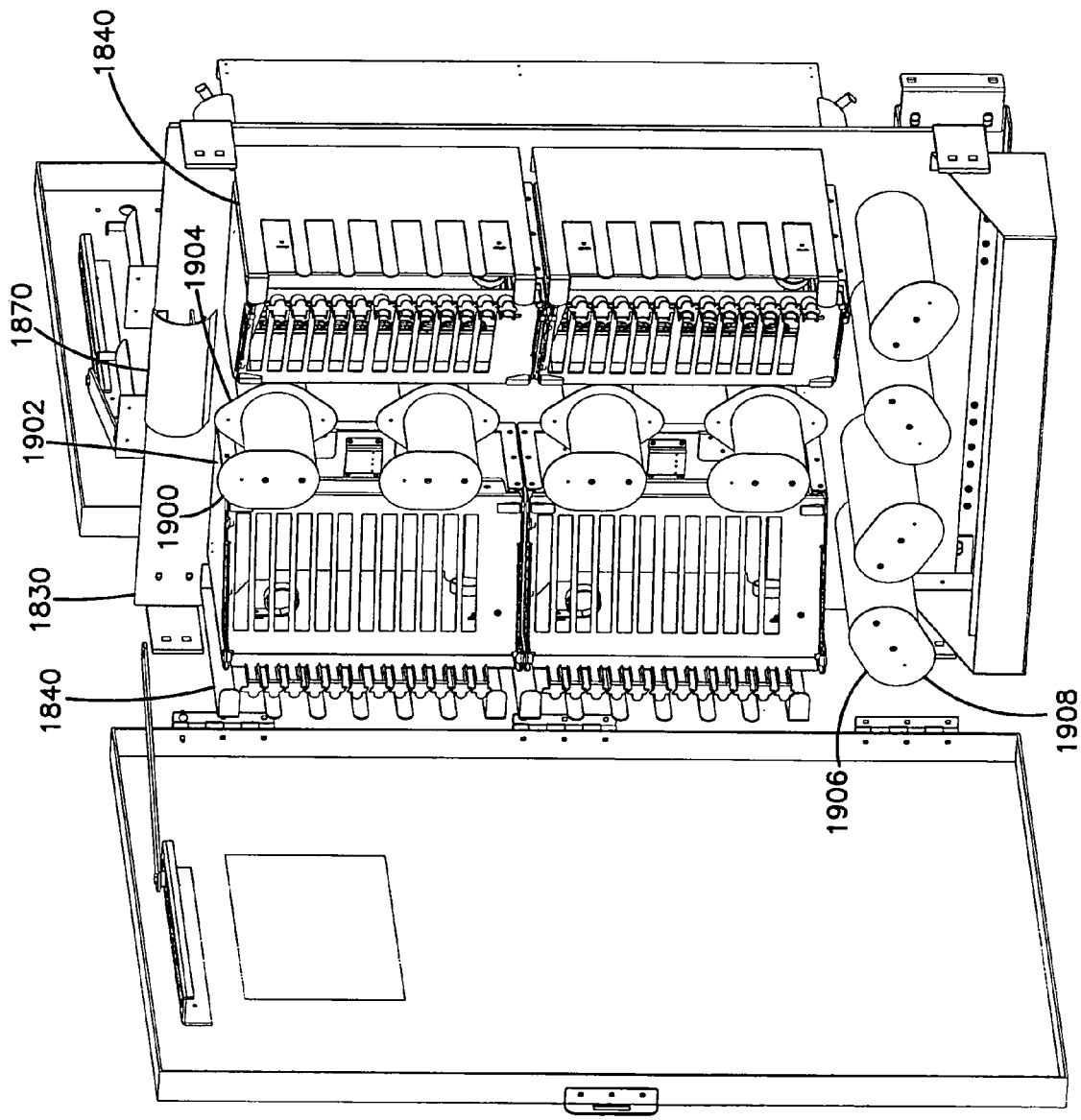
FIG. 79 is a perspective view like FIG. 77, showing portions of the enclosure removed.
Figure 80:
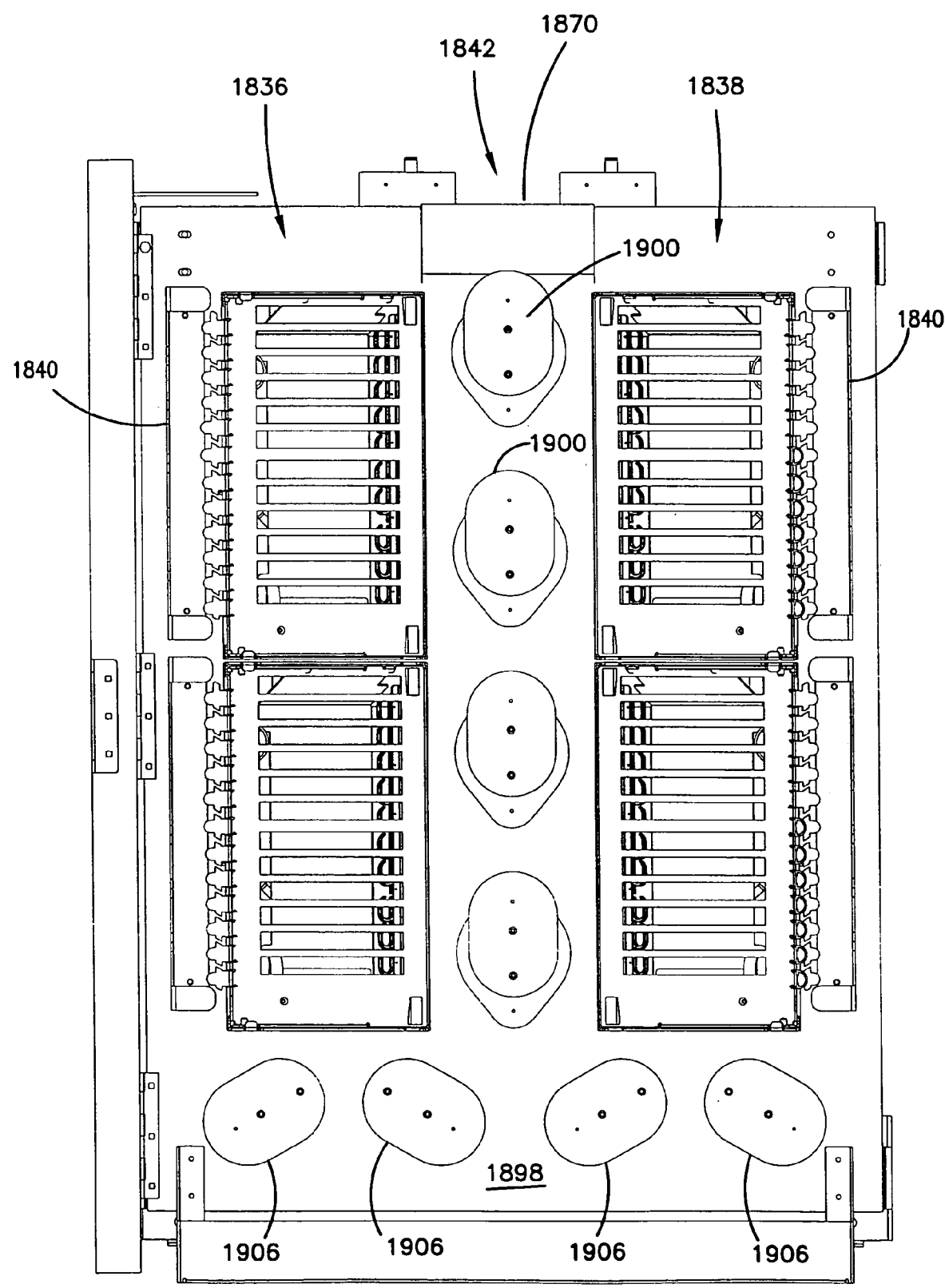
FIG. 80 is a front view of the view of FIG. 79.
Figure 81:
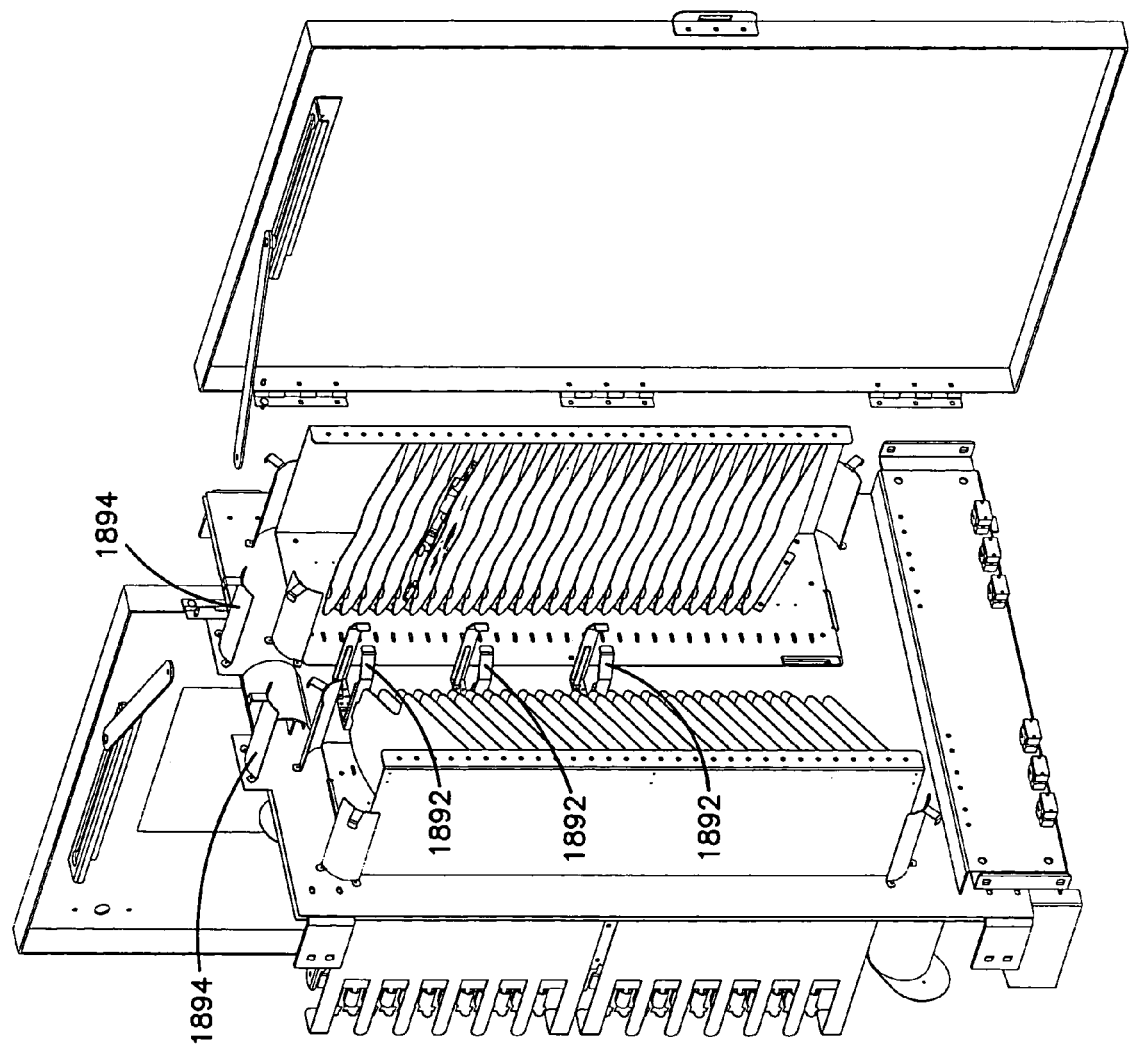
FIG. 81 is a perspective view like FIG. 78, showing portions of the enclosure removed.
Figure 82:
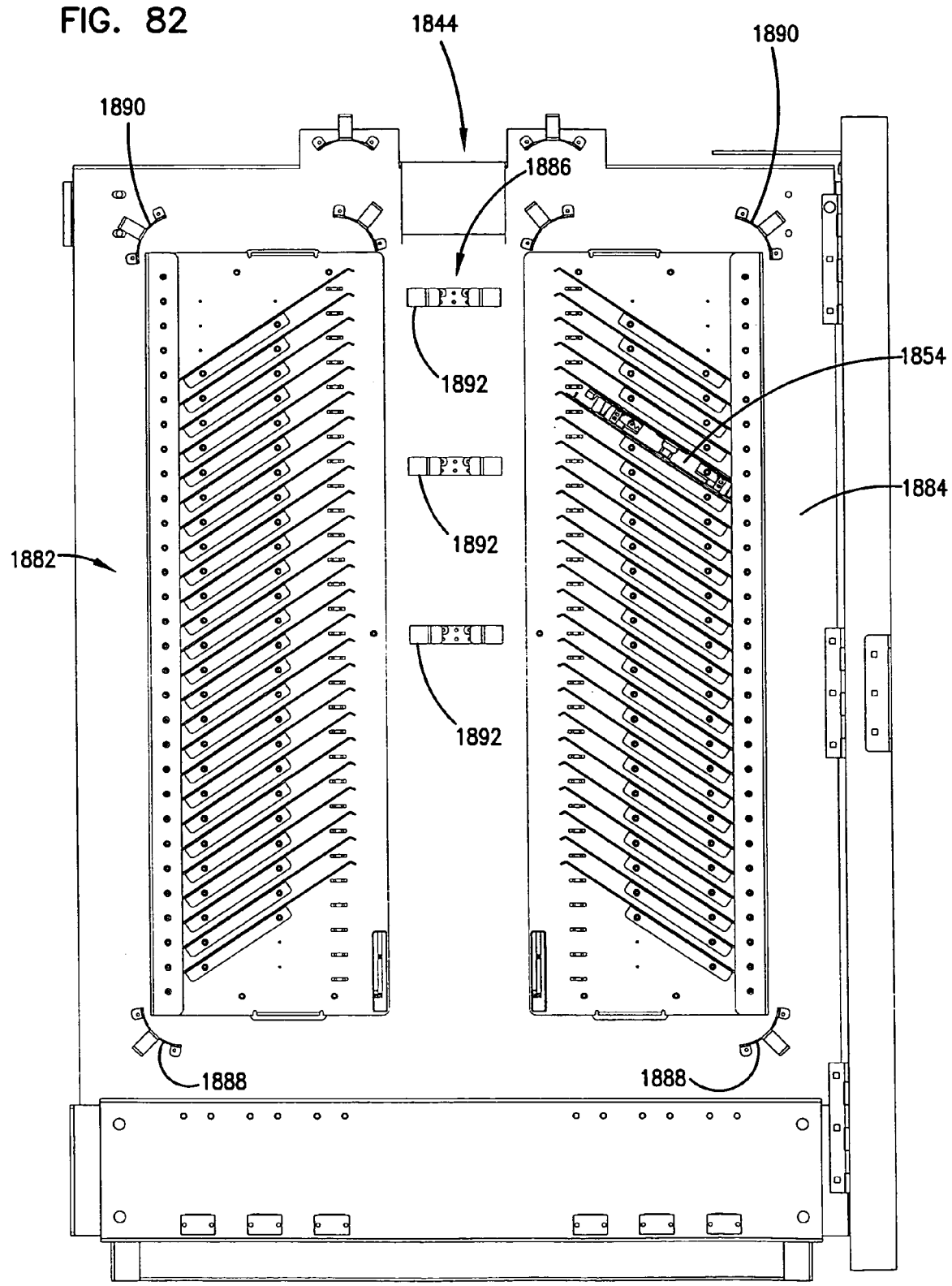
FIG. 82 is a rear view of the view of FIG. 81.
Figure 83:
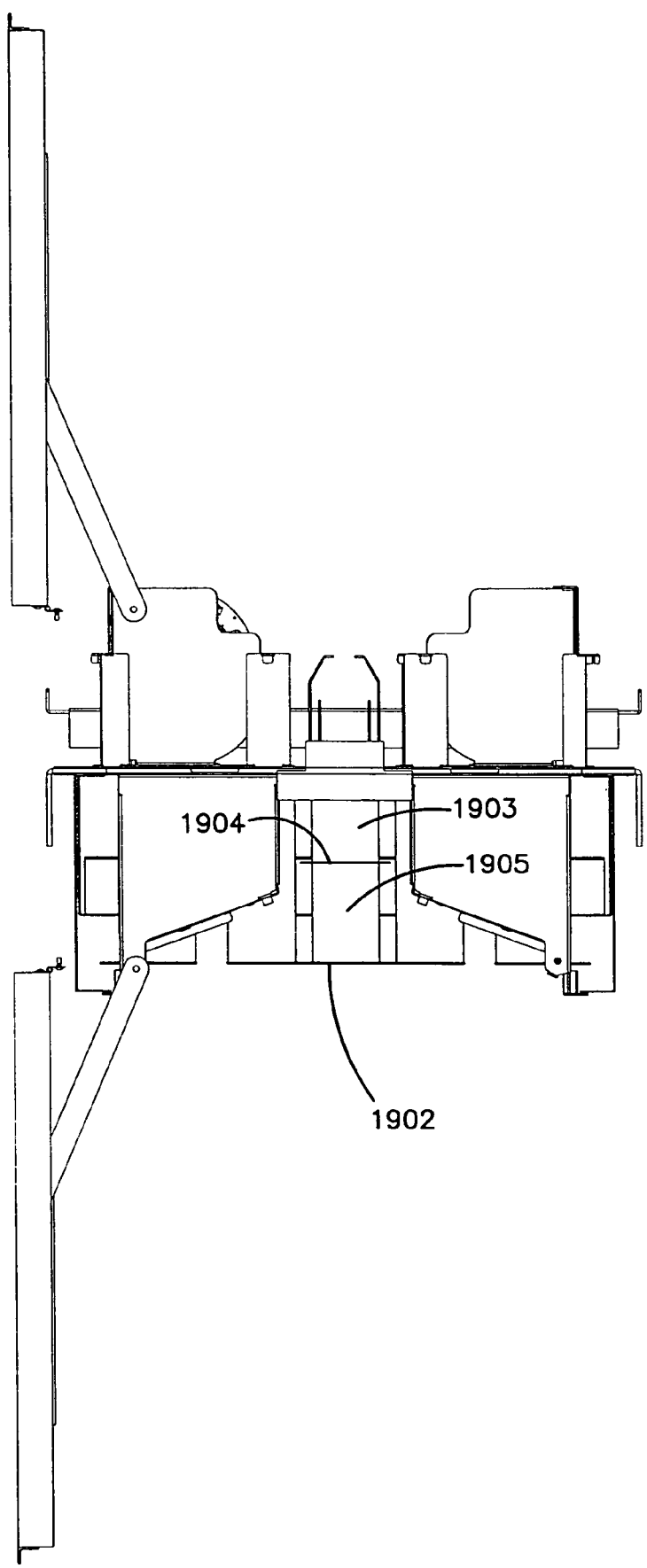
FIG. 83 is a top view of the views of FIGS. 79–81.

Referring now to FIGS. 59–61, a sixth preferred embodiment of a frame 1320 is shown with three termination modules 632 on left side, one termination module 940, a column of splice trays 244 with divider walls 292, and a column of cable management spools 86 and spaced-apart sides 82, 84. Further cable guides 1234 and walls 1236 of splice trays 244 are added to assist with cable management in vertical cable guides 960, 962. FIGS. 59–61 further illustrate the variety and versatility of the various frames of the present invention.

Referring now to FIGS. 62–65, a modified preferred embodiment of a frame 1420 is shown. Termination module 1440 includes room for less connector modules 1200 (10 instead of 12) over termination module 940. Only upper and lower guides 1056a, b are provided, allowing greater access to rear adapters 134a and rear connectors 142b. Also, module 1440 cannot be flipped to the left side of frame 1420. A mirror image of module 1440 with appropriately configured notches 1030 to receive flipped connector modules 1200 would have to be constructed, so as to fit on the left side of frame 1420.

Referring now to FIGS. 66–76, modified preferred embodiments for a termination module 1540 and connector modules 1600, 1700 are shown. Instead of planar shelves 1050 as in termination modules 940, 1440, a vertical array of longitudinal guides or rails 1560 is provided. Rails 1560 provide additional interior room within termination module 1540 over shelves 1050. Connector module 1660 is similar in many respects to connector module 1200. Side flange 1228 is received in one of notches 1030 in termination module 1540. A second side flange 1620 from major side 1618 is provided to slideably cooperate with one of rails 1560, to mount and hold connector module 1600 in termination module 1540.

By using longitudinal rails 1560, instead of the larger planar shelves 1050, connector modules of different heights can be conveniently used, if desired. For example, a modified connector module 1700 of FIGS. 73–76 can be utilized in termination module 1540 wherein two rows of openings 1703 are provided on front face 1702. Side flange 1720 is received in one of rails 1560 (1560a in FIG. 66). With the connector module 1700 having a double height, or triple, quadruple, etc., not all of rails 1560 are utilized. However, because of the low profile provided by rails 1560, the multi-heighted connector modules 1700 are easily utilized in termination module 1540.

Referring now to FIGS. 77–83, a further preferred embodiment of a frame 1820 is shown. Frame 1820 has particular application as an outside plant enclosure for use in cross-connecting outside plant cables. Frame 1820 includes an enclosure 1822 which fits over and protects the outside plant cables extending upwardly from the ground into enclosure 1822. Moveable panels or doors 1824, 1826 allow access to an interior of enclosure 1822.

Frame 1820 includes a rack 1830 which supports vertical cable guides 1840, splice tray holders 1850, termination modules 1832, and various cable management devices. Frame 1820 includes termination module 1832 with pivoting front panels 1834, which hold the fiber optic terminations similar to termination modules 632 described above. Other termination modules, such as modules 32, 232, 940, 1440, and 1540 described above may be used. The termination modules 1832 can include pass-through connections, or connector modules including various fiber optic components, as desired.

Termination modules 1832 communicate with vertical cable guides 1840 for patch cords linking the front termination locations between the left 1836 and right 1838 of rack 1830. Termination modules 1832 are positioned on a front side 1842 of rack 1830. Positioned on a rear side 1844 of rack 1830 are splice tray holders 1850. A plurality of angled divider walls 1852 or other walls define the individual splice tray holders, for holding individual splice trays 1854, in a similar manner as noted above. A cable pass-through 1870 links the front and rear sides of rack 1830.

The outside plant cables are clamped to rack 1830 at clamps 1880. From clamps 1880, the cables are positioned in one of left or right outer passages 1882 or 1884 and then enter rear central passage 1886 for splicing to cables at trays 1854. From trays 1854 the cables pass through pass-through 1870 to termination modules 1832. Lower radius limiters 1888 and upper radius limiters 1890 define outer passages 1882, 1884. Rings 1892 in central passage 1886 define cable pathways and cable tie locations for the cables extending to the individual splice trays, and from the splice trays to pass-through 1870.

Rack 1830 also includes storage radius limiters 1894 which are utilized for storage of cable at the rear side 1844 of rack 1830. In that situation, the cables are wound around radius limiters 1888, 1890, 1894 through outer passages 1882, 1884.

For cables passing from the rear side 1844 of rack 1830 to the front side 1842 through pass-through 1870, the cables enter front central passage 1896 for entry into one of termination modules 1832. Center spools 1900 assist with cable management of the cables linking splice trays 1854 to termination modules 1832. Patch cords extend from the front of termination modules 1832 into the nearest vertical cable guide 1840 and down to lower cable area 1898. Lower spools 1906 assist with cable management of the patch cables extending across lower area 1898. Excess lengths of the patch cords can be stored on center spools 1900. To further assist with cable management, center spools 1900 include an end plate 1902 and a mid plate 1904. Plates 1902, 1904 divide each spool 1900 into first and second areas 1903, 1905. First area 1903 is for guiding the cables, such as pigtails, from the rear side 1844 of the frame, before entry into one of modules 1832. Second area 1905 is for any patch cords wound around spools 1900. Lower spools 1906 also include a cable retention end plate 1908.

Frame 1820 has particular application in the outside plant situation. Separate access is provided for splicing and terminating, to allow field technicians to access only the required components, and further to help minimize fiber movement.

Figure 84:
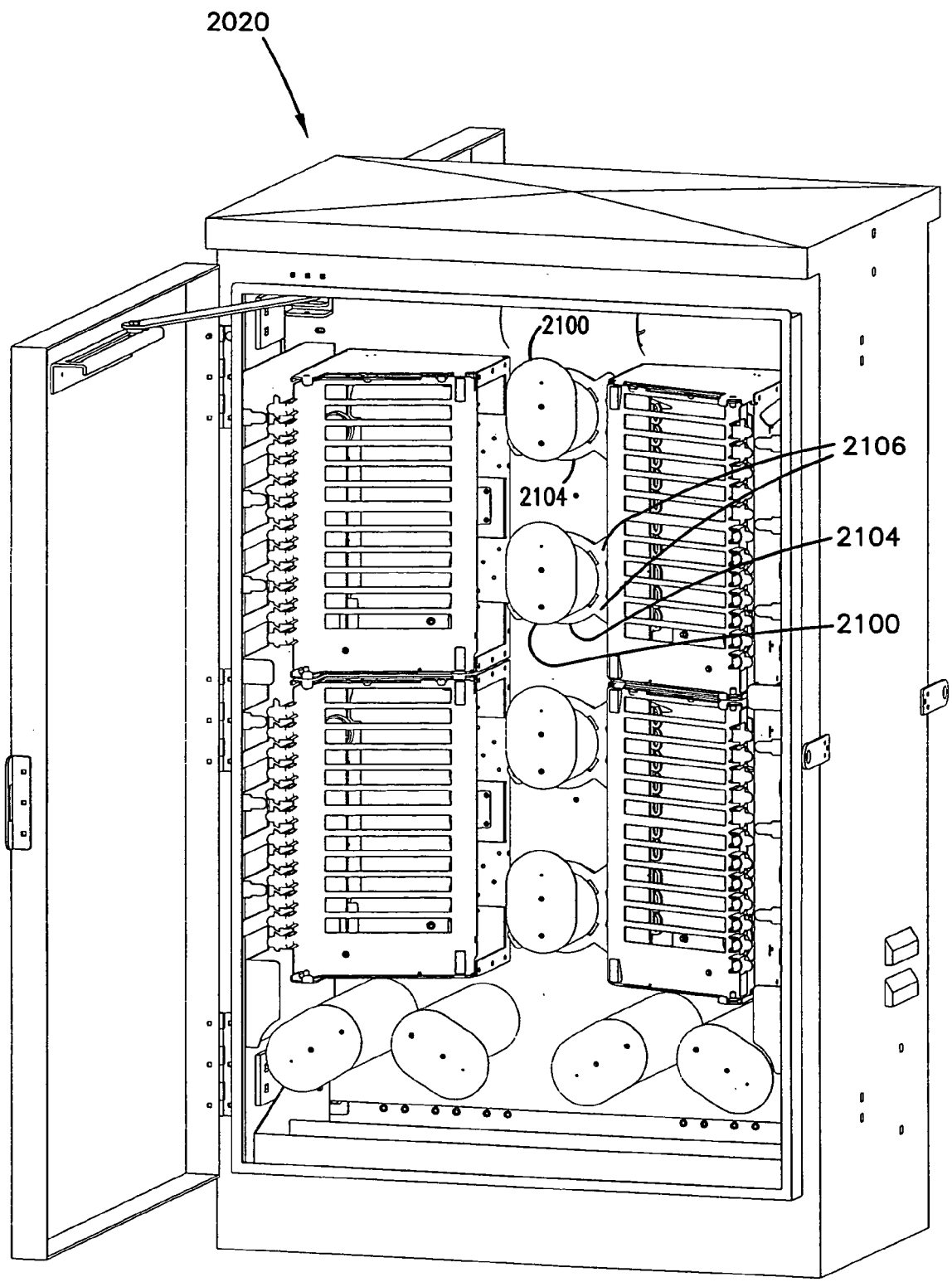
FIG. 84 is a front, top and right side perspective view of a ninth embodiment of a fiber distribution frame similar to the embodiment of FIGS. 77–83 with modified storage spools.
Figure 85:
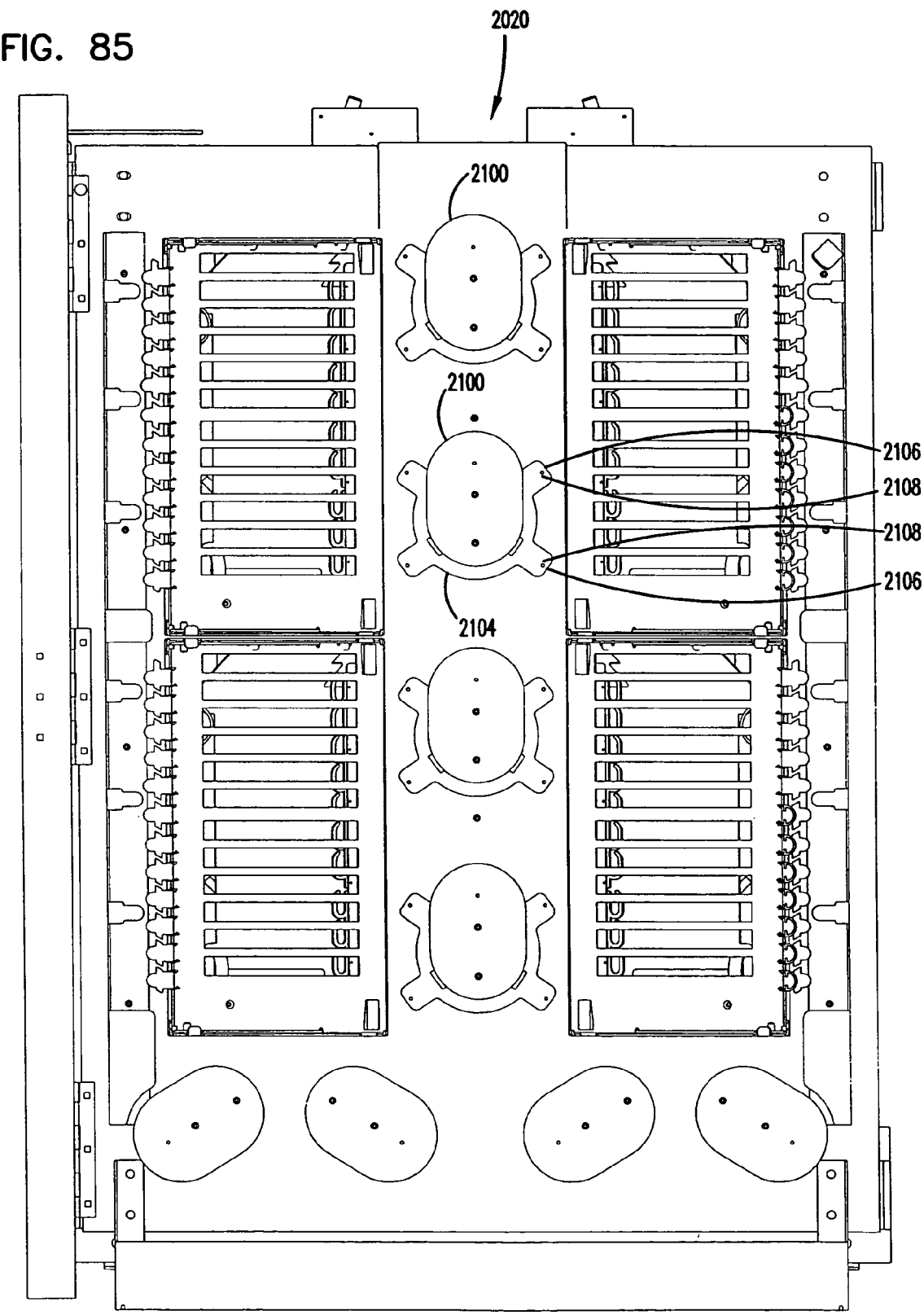
FIG. 85 is a front view of the frame of FIG. 84, with portions of the enclosure removed.

Frame 2020 of FIGS. 84 and 85 includes modified center spools 2100 including modified midplates 2104. Midplates 2104 are more circular in perimeter with projecting fingers 2106. Holes 2108 on each finger 2106 can be used to tie the cables in position to assist with cable management.

The above specification, examples and data provide a complete description of the manufacture and use of the invention. Since many embodiments of the invention can be made without departing from the spirit and scope of the invention, the invention resides in the claims hereinafter appended.

What is claimed is:

1. A fiber distribution frame comprising:
   (a) a rack extending vertically from a bottom to a top, the rack defining a left side, a right side, a front, and a rear;
   (b) a left vertical cable guide with a side access, the left vertical cable guide positioned on the left side of the rack, and a right vertical cable guide with a side access, the right vertical cable guide positioned on the right side of the rack;
   (c) a cable termination area positioned on the rack including:
      (1) a first panel defining an array of termination locations on a front portion and on a rear portion of the first panel, the first panel positioned on the left side of the rack adjacent to the left vertical cable guide, each array including a plurality of rows and columns of the termination locations;
      (2) a second panel defining an array of termination locations on a front portion and on a rear portion of the second panel, the second panel positioned on the right side of the rack adjacent to the right vertical cable guide, each array including a plurality of rows and columns of the termination locations;
      (3) a central cable passageway between the first and second panels;
      (4) side cable passageways from the central cable passageway to access an area between the rear of the rack and the rear portions of the first and second panels;
   (d) a cable splice area positioned on the rack, the cable splice area defining a plurality of splice tray holders;
   (e) a cable passageway from the splice tray holders to the central cable passageway of the first and second panels;
   (f) a horizontal passageway positioned on the rack extending between the right vertical cable guide, and the left vertical cable guide.

2. The frame of claim 1, wherein the cable termination area is positioned on the front of the rack, and wherein the cable splice area is positioned on the front of the rack.

3. The frame of claim 2, further comprising an enclosure at least partially surrounding the rack, the enclosure including first and second hingedly mounted access panels allowing selective access to an interior of the enclosure.

4. The frame of claim 2, wherein the first panel and the second panel are each positioned at a non-perpendicular angle relative to a vertical plane defined by the front of the rack, the first panel angled toward the left side of the rack, the second panel angled toward the right side of the rack.

5. The frame of claim 2, wherein the first panel includes a first vertical array of extensions positioned adjacent to the side access of the left vertical cable guide, and wherein the second panel includes a second vertical array of extensions positioned adjacent to the side access of the right vertical cable guide, an extension in each of the first and second vertical arrays of extensions being provided for each row of termination locations of the respective first and second panels.

6. The frame of claim 2, wherein the splice tray holder includes a plurality of spaced-apart angled divider walls each sized to receive a splice tray.

7. The frame of claim 2, further comprising a cable storage device extending vertically and mounted to the rack, the cable storage device including at least two cable storage spools extending in the direction faced by the front of the rack, wherein the cable storage device can communicate with the horizontal passageway for passage of a cable.

8. The frame of claim 2, wherein at least one of the first and second panels is defined by at least one termination module mounted to the rack, each termination module including:
   a housing having first and second spaced-apart ends, and first and second spaced-apart sides extending between the ends, the housing including a rear extending between the first and second ends and the first and second sides to define an interior, the housing defining an open front, with the first and second ends extending horizontally, the first and second sides extending generally vertically;
   a main panel mounted to the open front, the main panel including an array of openings arranged and sized for holding adapters to define the termination locations, the adapters being sized for mounting to cable connectors.

9. The frame of claim 8, wherein the main panel is mounted for rotational movement relative to the open front.

10. The frame of claim 8, wherein the main panel includes a plurality of sub-panels mounted so as to close the open front, each sub-panel including at least one opening arranged and sized for holding at least one adapter to define the termination locations.

11. The frame of claim 10, wherein the housing includes a plurality of sub-panel holders, and wherein each of the sub-panels further include a plurality of front adapters and a rear housing, each rear housing including a side panel including a plurality of adapters, a fiber optic coupler mounted within the rear housing, and cables connecting the front adapters to the side adapters.

12. The frame of claim 11, wherein the sub-panels each include a longitudinal guide, and wherein the sub-panel holders include a vertical array of longitudinal rails for receiving the longitudinal guides.

13. The frame of claim 11, wherein the sub-panel holders include a vertical array of planar shelves.

14. The frame of claim 11, further comprising an angled retainer mounting the adapters to the sub-panels.

15. The frame of claim 2, further comprising a plurality of adapters, each adapter mounted to one of the first and second panels.

16. The frame of claim 15, further comprising an angled retainer mounting the adapters to the respective first and second panels.

17. The frame of claim 2, further comprising a cable passageway surrounding a portion of the cable splice area.

18. A fiber distribution frame comprising:
   (a) a rack extending vertically from a bottom to a top, the rack defining a left side, a right side, a front, and a rear;
   (b) a left vertical cable guide with a side access, located on the left side of the rack, and a right vertical cable guide with a side access, located on the right side of the rack;
   (c) a cable termination area positioned on the rack including:
      (1) a first housing defining an array of termination locations on a front portion and on a rear portion of the first housing, the first housing positioned on the left side of the rack adjacent to the left vertical cable guide, each array of the front portion including a plurality of rows and columns of the termination locations;
      (2) a second housing defining an array of termination locations on a front portion and on a rear portion of the second housing, the second housing positioned on the right side of the rack adjacent to the right vertical cable guide, each array of the front portion including a plurality of rows and columns of the termination locations;

(3) a central cable passageway between the first and second housings;

(4) wherein the front portions of first housing and the second housing are each positioned at a non-perpendicular angle relative to a vertical plane defined by the front of the rack, the front portion of the first housing angled toward the left side of the rack, the front portion of the second housing angled toward the right side of the rack.

19. The frame of claim 18, further comprising:

(a) a cable storage device positioned on the rack, the cable storage device including at least two cable storage spools extending in the direction faced by the front of the rack;

(b) a horizontal passageway positioned on the rack extending between the right vertical cable guide, and the left vertical cable guide, the cable storage device in communication with at least one of the left and right vertical cable guides;

(c) a cable splice area positioned on the rack, the cable splice area defining a plurality of splice tray holders;

(d) a cable passageway from the splice tray holders to the rear portions of the first and second housings.

20. The frame of claim 19, wherein the cable termination area is positioned on the front of the rack, and wherein the cable splice area is positioned on the front of the rack, and further comprising an enclosure around the rack, the enclosure including first and second hingedly mounted panels, the first panel allowing access to the cable termination area, the second panel allowing access to the cable splice area.

21. The frame of claim 20, wherein each of the front portions of first and second housings are mounted for rotational movement relative to the rack.

22. The frame of claim 18, wherein the cable termination area is positioned on the front of the rack, and wherein the cable splice area is positioned on the front of the rack, and further comprising an enclosure around the rack, the enclosure including first and second hingedly mounted panels, the first panel allowing access to the cable termination area, the second panel allowing access to the cable splice area.

23. The frame of claim 22, wherein each of the front portions of first and second housings are mounted for rotational movement relative to the rack.

24. The fiber distribution frame of claim 1, wherein at least one of the first and second panels includes a plurality of sub-panels mounted so as to close an open front of the at least one panel, each sub-panel including at least one opening arranged and sized for holding at least one adapter to define the termination locations.

25. The fiber distribution frame of claim 24, wherein the at least one panel includes a plurality of spaced-apart interior shelves, and wherein each of the sub-panels further include a plurality of front adapters and a rear housing, each rear housing including a side panel including a plurality of adapters, a fiber optic coupler mounted within the rear housing, and cables connecting the front adapters to the side adapters.

26. The fiber distribution frame of claim 25, further comprising an angled retainer mounting the adapters to the sub-panels.

27. The fiber distribution frame of claim 18, wherein at least one of the first and second housings includes a plurality of sub-panels mounted so as to close an open front of the at least one housing, each sub-panel including at least one opening arranged and sized for holding at least one adapter to define the termination locations.

28. The fiber distribution frame of claim 27, wherein the at least one housing includes a plurality of spaced-apart interior shelves, and wherein each of the sub-panels further include a plurality of front adapters and a rear housing, each rear housing including a side panel including a plurality of adapters, a fiber optic coupler mounted within the rear housing, and cables connecting the front adapters to the side adapters.

29. The fiber distribution frame of claim 28, further comprising an angled retainer mounting the adapters to the sub-panels.

* * * * *